(12) United States Patent
Butler et al.

US011500160B2

(10) Patent No.: US 11,500,160 B2
(45) Date of Patent: Nov. 15, 2022

(54) MULTICORE OPTICAL FIBER FAN-OUT ASSEMBLIES AND APPARATUSES

(71) Applicant: CORNING RESEARCH & DEVELOPMENT CORPORATION, Corning, NY (US)

(72) Inventors: Douglas Llewellyn Butler, Painted Post, NY (US); James Scott Sutherland, Painted Post, NY (US); Aramais Robert Zakharian, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 1 day.

(21) Appl. No.: 17/321,840

(22) Filed: May 17, 2021

(65) Prior Publication Data

US 2021/0373245 A1    Dec. 2, 2021

Related U.S. Application Data

(60) Provisional application No. 63/042,111, filed on Jun. 22, 2020, provisional application No. 63/031,616, filed on May 29, 2020.

(51) Int. Cl.
*G02B 6/36* (2006.01)
*G02B 6/44* (2006.01)

(52) U.S. Cl.
CPC .......... *G02B 6/368* (2013.01); *G02B 6/3636* (2013.01); *G02B 6/4472* (2013.01)

(58) Field of Classification Search
CPC .. G02B 6/02042; G02B 6/368; G02B 6/3636; G02B 6/4472–4478; G02B 6/4471
See application file for complete search history.

(56) References Cited

U.S. PATENT DOCUMENTS 6,344,148 B1    2/2002  Park et al.
7,103,256 B2 *  9/2006  Song ..................... G02B 6/368
                                              385/83

(Continued)

FOREIGN PATENT DOCUMENTS

CN    106597612 A    4/2017
CN    108718534 A    10/2018

(Continued)

OTHER PUBLICATIONS

Abe et al., "Fan-in/fan-out device employing v-groove substrate for multicore fibre", In Optical communication, vol. 51, Issue 17, 2015, pp. 1347-1348.

(Continued)

*Primary Examiner* — Rhonda S Peace
(74) *Attorney, Agent, or Firm* — Adam R. Weeks

(57) ABSTRACT

A passively aligned fan-out apparatus for a multicore fiber (MCF) includes a fan-out assembly that comprises a fan-out substrate, small-clad fibers (SCFs) supported in SCF V-grooves of the fan-out substrate, and alignment rods disposed outboard alignment V-grooves of the fan-out substrate. The SCFs have a distal-end pitch P2D at a distal end of the fan-out substrate greater than the proximal-end pitch P2P of the SCFs at a proximal end of the fan-out substrate. An MCF assembly and/or single mode fiber (SMF) assembly may also be provided as part of the fan-out apparatus.

24 Claims, 31 Drawing Sheets

(56) References Cited

U.S. PATENT DOCUMENTS

| | | |
|---|---|---|
| 8,270,784 B2 | 9/2012 | Thomson et al. |
| 8,417,077 B2 | 4/2013 | Sasaoka et al. |
| 8,548,291 B2 | 10/2013 | Doerr et al. |
| 8,727,634 B2 | 5/2014 | Sasaki et al. |
| 9,069,116 B2 * | 6/2015 | Uemura ............ G02B 6/02004 |
| 9,250,399 B2 | 2/2016 | Margolin et al. |
| 9,703,035 B2 | 7/2017 | Imoto |
| 9,753,221 B2 | 9/2017 | Baerenklau et al. |
| 10,001,597 B2 | 6/2018 | Bennett et al. |
| 10,078,190 B2 | 9/2018 | Doerr et al. |
| 10,107,967 B1 | 10/2018 | Butler et al. |
| 2012/0321253 A1 | 12/2012 | Shimakawa et al. |
| 2017/0082797 A1 * | 3/2017 | Bennett ............... G02B 6/0281 |
| 2019/0235171 A1 * | 8/2019 | Brusberg ............ G02B 6/4291 |
| 2019/0331848 A1 | 10/2019 | Bennett et al. |
| 2020/0041724 A1 | 2/2020 | Kopp et al. |
| 2021/0096302 A1 | 4/2021 | Butler et al. |
| 2021/0157056 A1 | 5/2021 | Butler et al. |
| 2021/0373245 A1 * | 12/2021 | Butler ................. G02B 6/4472 |

FOREIGN PATENT DOCUMENTS

| | | | |
|---|---|---|---|
| FR | 2823859 A1 * | 10/2002 | ........... G02B 6/3636 |
| JP | 2002350650 A * | 12/2002 | ............ G02B 6/368 |
| JP | 2011-237573 A | 11/2011 | |
| JP | 2014-010403 A | 1/2014 | |
| JP | 5559258 B2 | 7/2014 | |
| JP | 2019-101152 A | 6/2019 | |
| KR | 10-2007-0023420 A | 2/2007 | |
| KR | 10-0681787 B1 | 2/2007 | |
| KR | 10-2018-0097889 A | 9/2018 | |
| WO | 2013/051656 A1 | 4/2013 | |
| WO | 2019/131441 A1 | 7/2019 | |

OTHER PUBLICATIONS

Abe et al., "Low-loss physical-contact-type fan-out device for 12-core multicore fiber", In 39th European Conference and Exhibition on Optical Communication, 2013, 3 pages.

Abe et al., "Multi-core Fiber Connector Technology for Low-loss Physical-contact Connection", In NTT Technical Review, vol. 15, No. 6, Jun. 2017, 6 pages.

Abe et al., "Physical-contact-type fan-out device for multicore fibre", In Optical communication, vol. 49, Issue 11, 2013, pp. 711-712.

Saito et al., "Compact fan-out for 19-core multicore fiber, with high manufacturability and good optical properties", In Opto-Electronics and Communications Conference (OECC), 2015, 3 pages.

Saito et al., "Confirmation of Core Pitch Accuracy of Fiber Bundle Type Fan-Out for MCF", In IEEE Photonics Society Summer Topical Meeting Series, 2014, 2 pages.

Saito et al., "Connectivity techniques of MCF, for deployment to practical use", In 21st OptoElectronics and Communications Conference (OECC), 2016, 3 pages.

Thomson et al., "Ultrafast laser inscription of a three dimensional fan-out device for multicore fiber coupling applications", In Conference on Lasers and Electro-Optics/Quantum Electronics and Laser Science Conference and Photonic Applications Systems Technologies, 2008, 7 pages.

* cited by examiner

MULTICORE OPTICAL FIBER FAN-OUT ASSEMBLIES AND APPARATUSES

CROSS REFERENCE TO RELATED APPLICATIONS

This application is related to U.S. Provisional Application No. 63/042,111, filed on Jun. 22, 2020, and to U.S. Provisional Application No. 63/031,616, filed on May 29, 2020, the content of which is relied upon and incorporated herein by reference in its entirety.

FIELD

The present disclosure relates to multicore optical fibers, and in particular to multicore fiber (MCF) fan-out assemblies and apparatus and methods employing passive optical alignment.

BACKGROUND

There is insatiable demand to increase the bandwidth density in fiber optic data transmission systems used in data centers to support rapidly expanding internet-based data transmission applications. This is reducing the length over which data can be transmitted over copper wires, so that the optical-to-electrical (OE) and electrical-to-optical (EO) conversions used in data centers will need to occur closer and closer to the photonic transceiver devices that perform the OE and EO signal conversions. It is also placing demands on the fiber density at the photonic transceiver devices.

At the same time, there is economic pressure to use the existing single-core fiber infrastructure in data centers to the greatest extent possible to keep the cost per link to a minimum, while also ensuring that any device changes made to the infrastructure meet optical loss tolerances.

SUMMARY

Aspects of the disclosure facilitate the cost-effective fabrication and passive alignment of the various assemblies and components thereof (such as optical fiber and cores of MCFs) and include one or more of the following:

MCF fibers with a mechanical reference feature, such as a D-shaped cross-section or a U-shaped cross-section, to facilitate orienting and positioning the MCF fiber in an MCF V-groove.

Fiber and alignment V-grooves formed using precision methods known in the art.

The use of glass for the substrates and caps and other components of the various assemblies to facilitate manufacturing the components using known glass fabrication techniques and to provide additional benefits such as having small coefficients of thermal expansion (CTE) and little or no difference between the CTEs of the various components.

The use of MCF caps where the mechanical reference feature of the MCF presses into the cap to cause the MCF fiber supported in an MCF V-groove to rotate into the correct azimuthal orientation passively, i.e., without need for high precision alignment stages and/or optical feedback needed in active alignment.

Alignment V-grooves and alignment rods that allow two or more components and assemblies to be passively aligned as they are combined, and the example use of glass alignment rods precision formed using known glass drawing techniques.

Use of an alignment cap to engage the alignment rods and cause them to be properly positioned within the alignment V-grooves.

Fabrication methods where the alignment rods are secured in the alignment V-grooves of the fan-out assembly and that extend axially therefrom to engage alignment V-grooves in the adjacent MCF assembly and the adjacent and optional single mode fiber (SMF) assembly to passively align the assemblies in the two lateral dimensions and in the axial rotation dimension.

The use of small clad fibers (SCFs) that enable the very close and geometrically accurate packing of these fibers beside each other to mate with the densely packed cores in an MCF, thereby maximizing core/fiber density for optical communication applications.

Utilizing low-cost processes of precision V-groove fabrication (e.g., diamond turning) to make complex, custom components and features such as fiber V-groove arrays and the alignment V-grooves, with different sizes, i.e., different depths and different widths. The V-grooves can be spaced non-uniformly, can be made in short sections (e.g., proximal and distal sections in proximal and distal sections of the fan-out substrate) can be curved (in the case of the fan-out array to change pitch between the proximal and distal ends), and can be made to handle non-standard diameter alignment rods.

Using a removable, high geometrical accuracy and precision alignment fixture to take the place of the otherwise permanent outboard alignment rods and alignment caps, wherein the alignment fixture can have a release layer to keep it from sticking to different V-grooved assemblies to facilitate removal.

Use of inexpensive, non-precision rigid structural elements to strengthen the MCF fan-out apparatus. These structural elements can be added after completing the precision portion of the assembly processes that accomplishes the passive alignment.

Added functionality includes joining separate V-groove arrays to make a 2×n array at the proximal end of the fan-out assembly to mate with a MCF with a 2×n array of cores and optionally form either a 2×n fiber configuration or a 1×2n fiber configuration of the SCFs at the distal (opposite) end of the fan-out assembly.

The ability to change pitch and geometrical form using S-bends of the SCFs in the central section of the fan-out substrate and optionally holding the SCFs in one or more places on the fan-out substrate using securing members or a securing material to keep stripped fibers from experiencing bending which can reduce reliability (e.g., by residing in V-groove sections), and to maintain the S-bend in coated sections of the SCFs, which need not reside in V-grooves and need not follow precise S-bending.

Employing S-bending of the SCFs while maintaining mechanical reliability and optical performance for relatively strong bends since SCFs have better reliability than standard SMFs when subjected to the same diameter bends, such difference being due to the smaller diameter of the SCFs making them more flexible.

The use of coated and uncoated (stripped) SCF sections in the fanout assembly to minimize reliability risks while using the precision glass cladding for precision passive alignment of fibers into SCF V-grooves, such as relatively short proximal and distal SCF V-groove sections at proximal and distal sections of the fan-out substrate.

The ability to form parallel fan-out arrays of SCFs on one fan-out substrate, either to be used together in the end state or to be fabricated cheaply and then singulated later.

The use of optional flow restrictors configured to keep uncured securing material used in an early fabrication step from contaminating the precision features to be used in subsequent precision alignment steps, including the proximal and/or distal ends of the MCF substrate, the fan-out substrate and the SMF substrate.

As an example of at least some of the above features, one embodiment of the disclosure is directed to a passively aligned fan-out assembly that comprises: a) a fan-out substrate having a main axis, a proximal end, a distal end, and a first surface that is substantially planar and includes a plurality of proximal fiber V-grooves, a plurality of distal fiber V-grooves, and at least two outboard alignment V-grooves between which the plurality of proximal fiber V-grooves and the plurality of distal fiber V-grooves reside. The proximal fiber V-grooves and the distal fiber V-grooves extend parallel to the main axis adjacent the proximal end and the distal end, respectively. The proximal fiber V-grooves have a proximal-end pitch P2P at the proximal end that is between 20 microns and 45 microns. The distal fiber V-grooves have a distal-end pitch P2D at the distal end that is greater than the proximal-end pitch P2P. The fan-out assembly also comprises: b) a plurality of small-clad fibers each having respective proximal bare glass sections supported in the proximal fiber V-grooves and distal bare glass sections supported in the distal fiber V-grooves, such that the plurality of small-clad fibers are arranged with the proximal-end pitch P2P at the proximal end and the distal-end pitch P2D at the distal end; c) at least two alignment rods respectively supported by the at least two outboard alignment V-grooves, wherein the at least two alignment rods extend beyond the proximal end of the fan-out substrate; and d) at least one cap disposed above the first surface of the fan-out substrate for securing the proximal bare glass sections and the distal bare glass sections into their respective proximal fiber V-grooves and distal fiber V-grooves and for securing the at least two alignment rods into their respective at least two outboard alignment V-grooves.

Another example of the disclosure is directed to a multicore fiber fan-out apparatus, comprising: the passively aligned fan-out assembly as described above; a multicore fiber that comprises a plurality of cores having a pitch P1 equal to the proximal-end pitch P2P of the proximal fiber V-grooves; and a multicore fiber substrate having a fiber V-groove that supports the multicore fiber, wherein the multicore fiber substrate also includes at least two alignment features configured to receive and support the at least two alignment rods to establish passive alignment between the plurality of cores of the multicore fiber and the proximal bare glass sections of the plurality of small-clad fibers.

Another example of the disclosure is directed to a passively aligned fan-out apparatus, comprising: a multicore fiber assembly that includes a multicore fiber supported in a multicore fiber V-groove of a multicore fiber substrate. The multicore fiber substrate has a first main axis and a distal end and further comprises a first pair of outboard alignment V-grooves on opposite sides of the first main axis. The multicore fiber comprises cores with a core pitch P1 at an end face of the multicore fiber, and the end face resides at the distal end of the multicore fiber substrate. The multicore fiber assembly also includes a fan-out assembly comprising small-clad fibers supported in small-clad fiber V-grooves of a fan-out substrate that has a second main axis and proximal and distal ends, the small-clad fiber V-grooves causing the small-clad fibers to have a proximal-end pitch P2P substantially the same as the core pitch P1 and a distal-end pitch P2D that is greater than the proximal-end pitch P2P. The fan-out substrate further comprises a second pair of outboard alignment V-grooves opposite sides of the second main axis, wherein the proximal end of the fan-out substrate is interfaced with the distal end of the multicore fiber substrate so that the first and second main axes are coaxial and so that the first pair of outboard alignment V-grooves are axially aligned with the second pair of outboard alignment V-grooves. The multicore fiber assembly also includes first and second alignment rods respectively supported in the axially aligned first and second pairs of outboard alignment V-grooves so that the cores of the multicore fiber are passively optically aligned with the small-clad fibers at the proximal end of the fan-out substrate.

Another example of the disclosure is directed to a passively aligned fan-out apparatus that comprises a multicore fiber assembly, a fan-out assembly, and a pair of alignment rods. The multicore fiber assembly includes a multicore fiber substrate having a multicore fiber V-groove supporting a multicore fiber, the multicore fiber comprising n cores in a 1×n configuration at an end face of the multicore fiber. The multicore fiber substrate also has a first pair of alignment V-grooves. The fan-out assembly comprises a fan-out substrate having a proximal section with a proximal end and a distal section with a distal end. The fan-out assembly also comprises n small-clad fibers supported in small-clad fiber V-grooves of the fan-out substrate in a 1×n configuration at the proximal end and in a 1×n configuration at the distal end. The n small-clad fibers have a proximal-end pitch P2P at the proximal end and a distal-end pitch P2D at the distal end that is greater than the proximal-end pitch P2P. The fan-out substrate further comprises a second pair of alignment V-grooves that reside outboard of the n small-clad fibers. The pair of alignment rods are disposed in the first and second pairs of alignment V-grooves to cause the n cores that have the 1×n configuration at the distal end of the multicore fiber substrate to be passively optically aligned with the small-clad fibers that have the 1×n configuration at the proximal end of the fan-out substrate.

Another example of the disclosure is directed to a passively aligned fan-out apparatus that comprises a multicore fiber assembly, a fan-out assembly, and a pair of alignment rods. The multicore fiber assembly includes a multicore fiber substrate having a multicore fiber V-groove supporting a multicore fiber, the multicore fiber comprising 2n cores that have a 2×n configuration at an end face of the multicore fiber. The multicore fiber substrate also has a first pair of alignment V-grooves. The fan-out assembly comprises a fan-out substrate having a proximal section with a proximal end and a distal section with a distal end. The fan-out assembly also comprises a small-clad fiber proximal cap, a small-clad fiber distal cap, and 2n small-clad fibers that are supported in: i) proximal small-clad fiber V-grooves of the fan-out substrate and small-clad fiber V-grooves of the small-clad fiber proximal cap in a 2×n configuration at the proximal end, and ii) either distal small-clad fiber V-grooves of the fan-out substrate or small-clad fiber V-grooves of the small-clad fiber distal cap in a 1×2n configuration at the distal end. The fan-out substrate also has a second pair of alignment V-grooves that reside outboard of the 2n small-clad fibers. The pair of alignment rods are disposed in the first and second pairs of alignment V-grooves to cause the 2n cores that have the 2×n configuration at the distal end of the multicore fiber substrate to be passively optically aligned with the small-clad fibers that have the 2×n configuration at the proximal end of the fan-out substrate.

Another example of the disclosure is directed to a method of forming a fan-out apparatus using passive optical alignment, comprising: supporting a multicore fiber in a multicore fiber V-groove of a multicore fiber substrate having a first main axis and a first pair of outboard alignment V-grooves, the multicore fiber comprising multiple cores having a pitch P1 at a distal end of the multicore fiber substrate; supporting small-clad fibers in respective small-clad fiber V-grooves of a fan-out substrate having a second main axis and a second pair of outboard alignment V-grooves so that the small-clad fibers have a proximal-end pitch P2P=P1 at a proximal end of the fan-out substrate and a distal-end pitch P2D>P2P at a distal end of the fan-out substrate; interfacing the distal end of the multicore fiber substrate with the proximal end of the fan-out substrate to axially align the first and second pairs of outboard alignment V-grooves; passively optically aligning the cores of the multicore fiber at the distal end of the multicore fiber substrate with the small-clad fibers at the proximal end of the fan-out substrate by supporting first and second alignment rods in the axially aligned first and second pairs of outboard alignment V-grooves; and after said passively optically aligning, securing the interfaced distal end of the multicore fiber substrate with the proximal end of the fan-out substrate using a securing material.

Another example of the disclosure is directed to a method of forming a fan-out apparatus using passive optical alignment, comprising: supporting a multicore fiber in a multicore fiber V-groove of a multicore fiber substrate having a first main axis and a first pair of outboard alignment V-grooves, the multicore fiber comprising 2n cores having a 2×n configuration at an end face of the multicore fiber, wherein the end face is located at a distal end of the multicore fiber substrate; supporting 2n small-clad fibers in a fan-out assembly that comprises a fan-out substrate having a proximal section with a proximal end and a distal section with a distal end, the fan-out assembly further comprising a small-clad fiber proximal cap disposed above the proximal section of the fan-out substrate, a small-clad fiber distal cap disposed above the distal section of the fan-out substrate, and a second pair of outboard alignment V-grooves, and wherein said supporting comprises: i) supporting proximal end sections of a first n of the 2n small-clad fibers in n proximal end small-clad fiber V-grooves of the fan-out substrate; ii) supporting proximal end sections of a second n of the 2n small-clad fibers inn proximal end small-clad fiber V-grooves in the small-clad fiber proximal cap, wherein the 2n small-clad fibers have at the proximal end of the fan-out substrate a 2×n configuration that matches the 2×n configuration of the 2n cores of the multicore fiber at the end face of the multicore fiber; and iii) supporting distal ends of the 2n small-clad fibers in distal end small-clad fiber V-grooves of the fan-out substrate to define a 1×2n configuration of the small-clad fibers at the distal end of the fan-out substrate; interfacing the distal end of the multicore fiber substrate with the proximal end of the fan-out substrate to axially align the first and second pairs of outboard alignment V-grooves; passively optically aligning the 2n cores of the multicore fiber at the distal end of the multicore fiber substrate with the 2n small-clad fibers at the proximal end of the fan-out substrate by supporting first and second alignment rods in the axially aligned first and second pairs of outboard alignment V-grooves; and after said passively optically aligning, securing the interfaced distal end of the multicore fiber substrate with the proximal end of the fan-out substrate.

Additional embodiments, features, and advantages are set out in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figure 1:
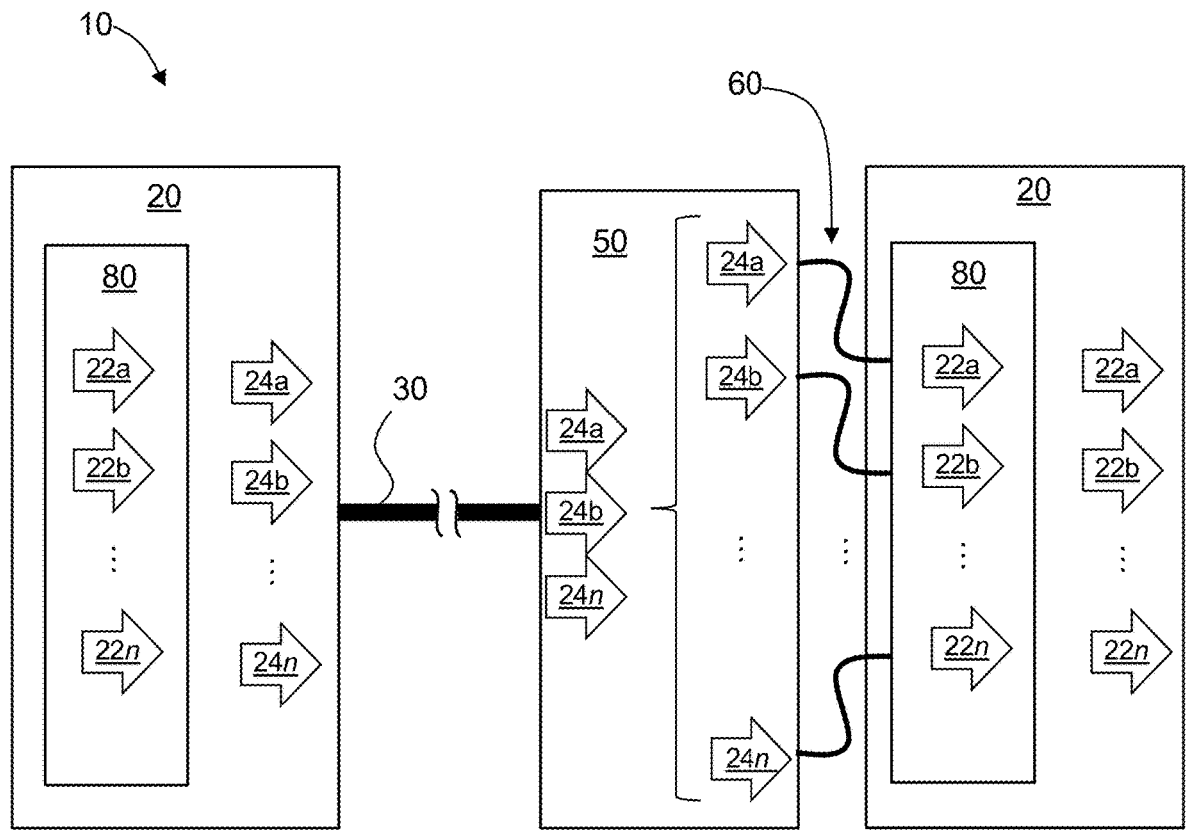
FIG. 1 is a schematic diagram of an example optical data transmission system of the type used in a data center and that employs the multicore fiber (MCF) fan-out apparatus disclosed herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Relative terms like front, back, side, top, bottom, etc., are used for convenience and are not intended to be limiting as to direction or orientation. In an example, a front end or front section constitutes a proximal end or proximal section, a back end or back section constitutes a distal end or distal section, and top and bottom surfaces constitute first and second surfaces, etc.

The "main axis" of a substrate means an axis that runs between a front or proximal end and a back or distal end. In an example, the main axis is perpendicular to the front/proximal end surface and the back/distal end surface and runs substantially down the geometric center of the substrate and in the z-direction as indicated by the local Cartesian coordinates used in the Figures.

The term "axially aligned" or "axial alignment" can mean aligned with an axis and can mean either along the axis or substantially parallel to the axis (to within manufacturing tolerances unless otherwise noted), and in the case of two optical fibers can mean that their respective fiber axes are co-axial and thus having no relative angular offset between the two fibers.

The term "laterally aligned" or "lateral alignment" with reference to two or more components means aligned in the two directions orthogonal to the respective axes of the two or more components.

The term "aligned" is understood to mean both axial alignment and lateral alignment unless stated otherwise.

The term "passive alignment" or "passively aligned" with respect to two components, assemblies, etc. refers to a final alignment that is within an alignment tolerance and achieved by virtue of alignment features on the two components, assemblies, etc., that operably engage so that the alignment process does not require further lateral or rotational adjustment using what is known in the art as active alignment, which includes feedback mechanisms, precision translation/rotation stages, etc. to direct and control the further adjustment to achieve final alignment. Passive alignment between optical components can also be referred to as "passive optical alignment" or "passively optically aligned."

The term "substantially constant" as used herein is understood to mean "constant to within manufacturing limitations or to within manufacturing tolerances."

The term "equal to" and "substantially equal to" as used herein are understood to mean "intended to be equal within manufacturing tolerances."

The term "kinematic support" or "kinematically support" when referring to an optical fiber or an alignment rod supported in a V-groove means that the fiber or rod is supported by two (first and second) axial lines of contact with respective walls of the V-groove and optionally one or two more axial lines of contact with a cap, which can be planar to provide one more line of contact or can include a V-groove to provide two more lines of contact. In cross-sectional view, the lines of contact are points of contact.

Ranges that are expressed in this disclosure are intended to the include the end points of the range (e.g., "between A and B" includes end points A and B).

An MCF is an optical fiber that includes two or more cores within a single cladding matrix. The two or more cores can be multimode or single mode.

An SMF is considered herein as being a single core fiber that supports a single spatial mode at its operating wavelength unless otherwise stated.

In the discussion below, a securing material may be used to secure the various components of a given assembly, e.g., the fiber(s), substrate and cap. In an example, the securing material substantially fills in any gaps or voids between the given substrate and cap in the region where the fiber or fibers reside within fiber V-grooves. Some of the Figures show only partial fill of securing material or no securing material for ease of illustration. In an example, the securing material fills substantially all voids where the securing material is applied. In an example, the securing material is curable using actinic light.

The term "micron" as used herein is the same as a micrometer.

Optical Data Transmission System

FIG. 1 is a schematic diagram of an example optical data transmission system ("system") 10 of the type used in a data center. The optical data transmission system 10 includes two servers 20, referred to as the left-side and right-side servers. The left-side and right-side servers 20 can be servers in a data center that reside in different buildings. The system 10 also includes multicore fiber (MCF) fan-out apparatus 50 as disclosed herein and discussed in greater detail below. Each server 20 includes a photonic transceiver device 80.

The left-side server 20 is optically coupled to the MFC fan-out apparatus 50 by an MCF 30. The MCF fan-out apparatus 50 is optically connected to the photonic transceiver device 80 in the right-side server 20 using optical interconnectors 60, which can be short connectorized optical fiber cables or "jumpers."

A number n of electrical signals $22a, 22b, \ldots 22n$ in the left-side server 20 are converted by the photonic transceiver device 80 therein into corresponding optical signals $24a, 24b, \ldots 24n$, which are coupled into the MCF 30 and transmitted to the MCF fan-out apparatus 50. The MCF fan-out apparatus 50 is configured to spatially fan out (i.e., break/spread out) the inputted optical signals $24a, 24b \ldots 24n$ so that these signals are accessible by the optical interconnectors 60 and transmitted to the photonic transceiver device 80 in the right-side server 20. This photonic transceiver device 80 then converts the outputs the received optical signals $24a, 24b, \ldots 24n$ into corresponding electrical data signals $22a, 22b, \ldots 22n$.

Figure 2A:
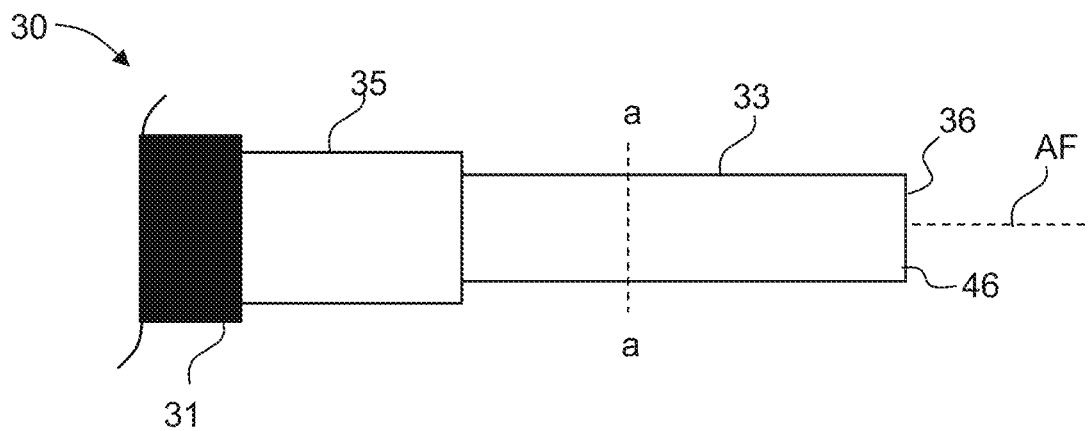
FIG. 2A is a side view and FIGS. 2B and 2C are cross-sectional views taken along the line a-a in FIG. 2A of example multicore fibers.
Figure 2B:
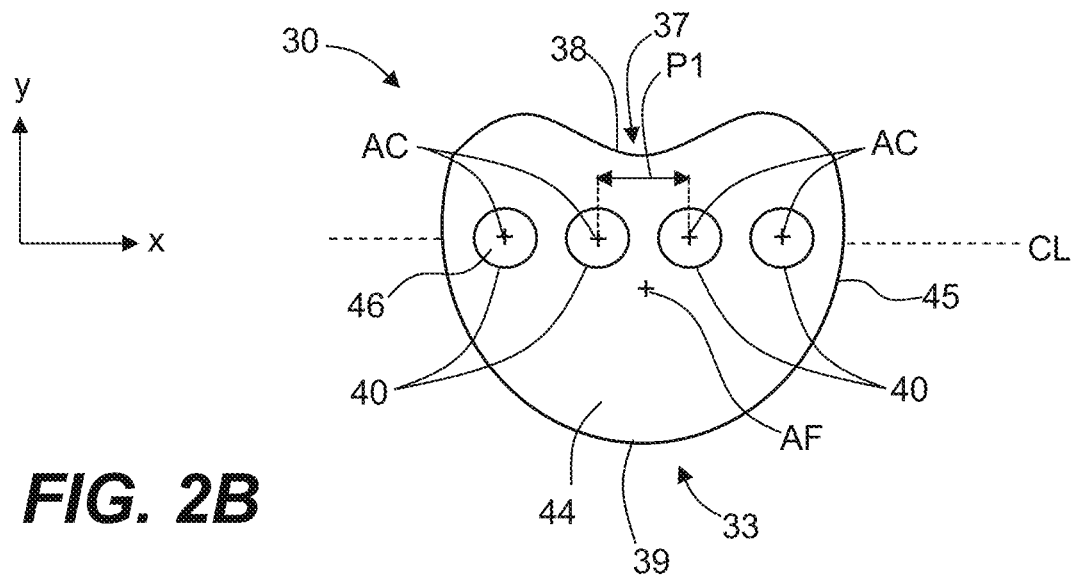
Figure 2C:
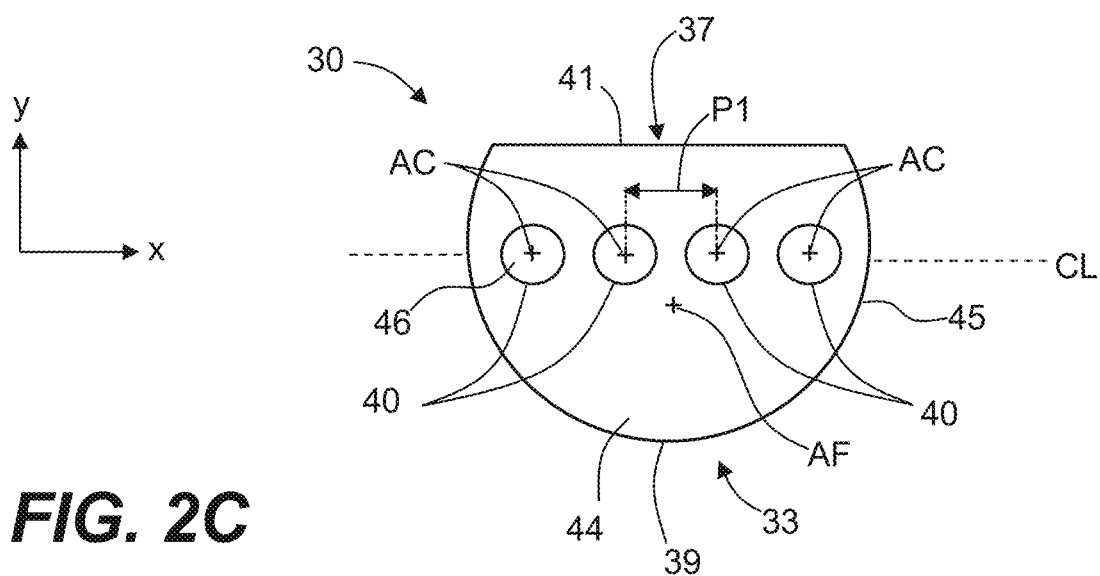

FIG. 2A is a side view and FIGS. 2B and 2C are cross-sectional views (taken along the line a-a in FIG. 2A) of an example MCF 30 of the system 10. The MCF 30 can be included as part of a cable having a protective outer jacket 31. The MCF 30 has an MCF axis AF and includes an inner or central glass section 33 and an outer coated section 35 that immediately surrounds the glass section 33. The outer coated section 35 comprises a non-glass protective coating, which can be a polymer material (e.g., acrylate). The MCF 30 terminates at a fiber end face 36. When the coated section 35 is removed to expose the glass section 33, the latter is also referred to as a bare glass section.

With reference to FIGS. 2B and 2C, the glass section 33 comprises multiple spaced apart cores 40 embedded within a cladding 44 that defines an outer surface 45 of the glass section 33. Each core 40 has a core end face 46 and a core axis AC that runs parallel to the MCF axis AF. The cores 40 and the cladding 44 are made of glass, albeit with different refractive indices to establish waveguiding properties as is known in the art. The cores 40 are spaced apart and have a center-to-center spacing (i.e., pitch) P1. Example pitches P1 are in the range from 15 microns to 35 microns, or 20 microns to 32 microns. The relatively small core pitch P1 illustrates an advantage of using an MCF to increase the fiber density compared to single core fibers placed side-by-side.

In an example, the core axes AC of the cores 40 reside in a common line CL (or common plane taking into account the z-direction) that runs perpendicular to the core axes AC and so has a single row or a "1×n" configuration for n cores. Other configurations for the cores 40 are described below. For convenience, the portion of the outer surface 45 of the MCF 30 centered at 90 degrees as measured from the x-axis is referred to as the top or proximal edge 37 when viewed in cross section, while the portion of the outer surface centered at 270 degrees as measured counterclockwise from the x-axis is referred to as the bottom or distal edge 39 when viewed in cross section.

An example MCF 30 can have a standard circular cross-sectional shape or profile. FIGS. 2B and 2C illustrate two other types of cross-sectional shapes/profiles that are useful in the MCF fan-out apparatus 50 disclosed herein. FIG. 2B shows what can be referred to as a recessed profile that can have for example "U" cross-sectional shape or profile (also called a "W" shaped profile), wherein the proximal edge 37 of the MCF 30 includes a mechanical reference in the form of a recess 38 that defines the U shape or the inverted W shape. FIG. 2C shows what is called a flat profile that can have for example a "D" cross-sectional shape or profile, wherein the example shown the proximal edge 37 of the MCF 30 has a mechanical reference in the form of a flat surface 41. A MCF 30 having a mechanical reference has the advantage of providing a reference for establishing the orientation of the common line CL and the core axes AC and can facilitate the alignment process.

In general, photonic transceivers devices 80 and optical interconnects 60 are bi-directional. Thus, the optical signals 24a, 24b . . . 24n can be bidirectional in system 10 and in particular can be bidirectional in the same MCF core 40, between cores in a MCF or between MCFs. A common case in data center applications is to have unidirectional traffic within one MCF 30 and have a second complementary MCF handle unidirectional traffic in the opposite direction.

MCF Fan-Out Apparatus

Figure 3A:
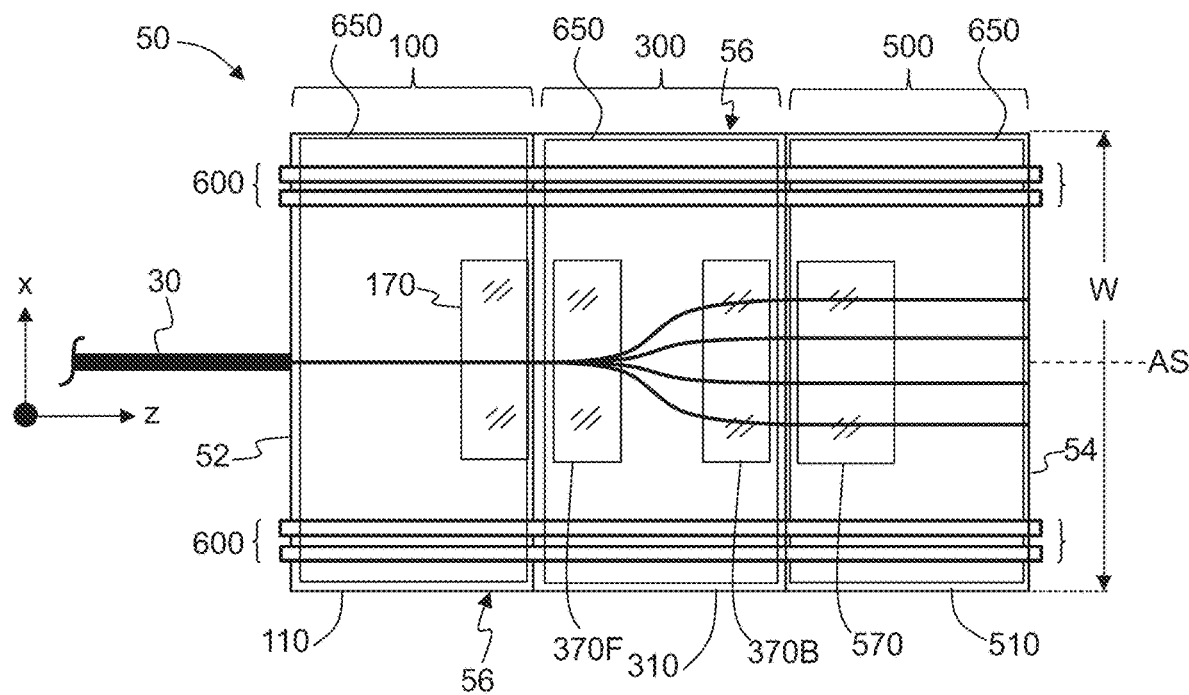
FIG. 3A is a top-down view of an example MCF fan-out apparatus that includes an MCF assembly, a fan-out assembly, and a single mode fiber (SMF) assembly.

FIG. 3A is a top-down view of an example MCF fan-out apparatus ("assembly") 50 as disclosed herein. The apparatus 50 has an input or proximal end 52 and an output or distal end 54, opposite sides 56, and a system axis AS that runs in the z-direction. In the discussion below, light in the form of optical signals is assumed for convenience and ease of discussion to travel from left to right, and it will be understood that the assembly 50 can operate with light traveling in the opposite direction.

Figure 3B:
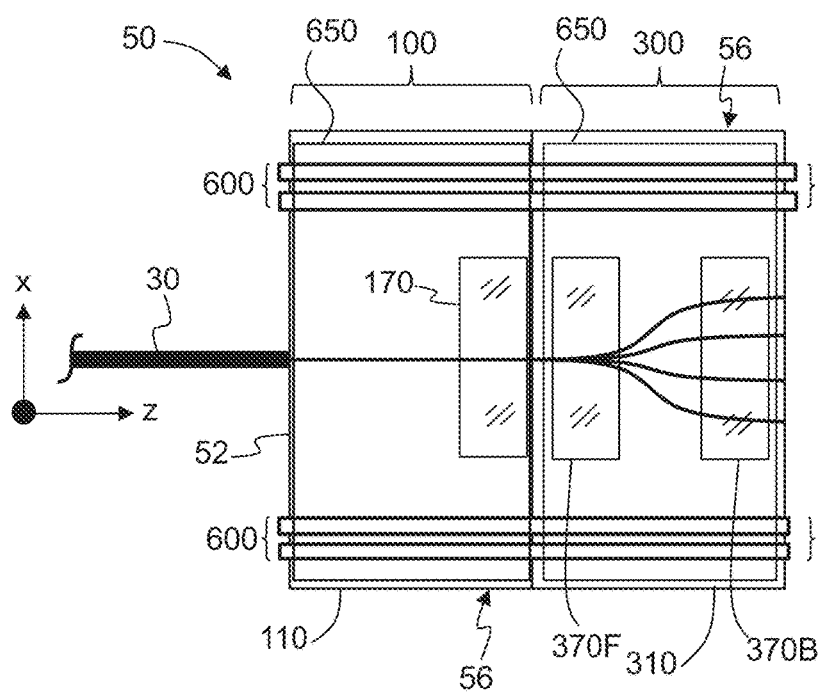
FIG. 3B is a top-down view of an example MCF fan-out apparatus that includes just the MCF assembly and the fan-out assembly.

FIG. 3A shows an example MCF apparatus 50 that includes three main assemblies, namely an MCF assembly 100, a fan-out assembly 300, and a single mode fiber (SMF) apparatus 500 arranged in order along the system axis AS from left to right. These assemblies can be considered different sections of the MCF apparatus 50 (and thus can be referred to as sections 100, 300, and 500 or simply assemblies 100, 300, and 500). In some examples, the apparatus 50 includes just the MCF assembly 100 and the fan-out assembly 300, such as shown in the example of FIG. 3B. The discussion below focuses on the three-assembly embodiment for completeness.

The apparatus 50 includes kinematically supported alignment rods 600 that run in the axial direction (i.e., longitudinally) between the three assemblies 100, 300, and 500 and that act to passively optically align the three assemblies 100, 300, and 500 so that each can be in proper optical communication with their adjacent assembly as discussed below. The three assemblies 100, 300, and 500 respectively include generally planar support substrates 110, 310, and 510 (each referred to simply as "substrate", or respectively referred to specifically as "MCF substrate 110", "fan-out substrate 310", and "SMF substrate 510"). Example materials for the support substrates 110, 310, and 510 include glass, glass-ceramics, crystalline glass, ceramics, metal (e.g., stainless steel, brass, nickel, etc.), polymers, as well as other rigid and machinable materials with relatively low coefficients of expansions (CTEs). In an example, V-grooves discussed herein are formed by diamond turning and like techniques known in the art.

An example MCF assembly 100 includes a cover sheet or cap 170, an example fan-out assembly 300 includes two cover sheets or caps 370F and 370B, and an example SMF apparatus 500 includes a cover sheet or cap 570. The caps 170, 370F, 370B, and 570 can be made of the same material as their respective substrates 110, 310, and 510 or can be made of different materials. The various caps can be used to provide additional kinematic contact with their corresponding fibers (discussed below) and optionally the alignment rods 600. A separate alignment rod cap 650 can also be used for providing kinematic contact with the alignment rods 600. In an example, the caps 370F and 370B can be different sections (e.g., a front or proximal section and a back or distal section) of a single cap. Also in an example, the given "fiber" caps 170, 370F, 370B, and 570 can extend laterally to engage the alignment rods 600 so that the caps can be both "fiber" caps and "alignment" caps. In the examples shown in FIGS. 3A and 3B and in some of the other Figures discussed below, the "fiber" caps and the "alignment" caps are shown as separate caps as one example configuration (see also FIGS. 13A through 13C as well as FIGS. 19B and 20A through 20E).

Figure 3C:
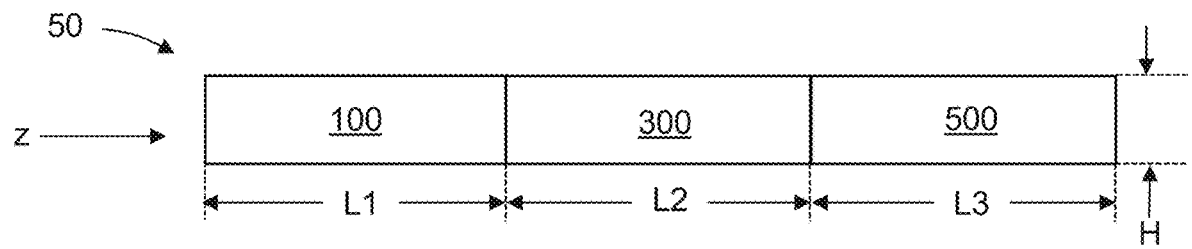
FIG. 3C is a schematic side view of the MCF fan-out apparatus that shows the axial lengths L1, L2, and L3 of the MCF, fan-out, and SMF assemblies, respectively, and the height H of the apparatus.

FIG. 3C is a schematic side view of the apparatus 50 showing the axial length L1 of the MCF assembly 100, the axial length L2 of the fan-out assembly 300, and the axial length L3 of the SMF assembly 500, along with the height H. In an example, the lengths L1, L2, and L3 can be in the range from 10 mm to 20 mm, the height H can be in the range from 1 mm to 10 mm and the width W (see FIG. 3A) can be in the range from 5 mm to 25 mm.

Figure 3D:
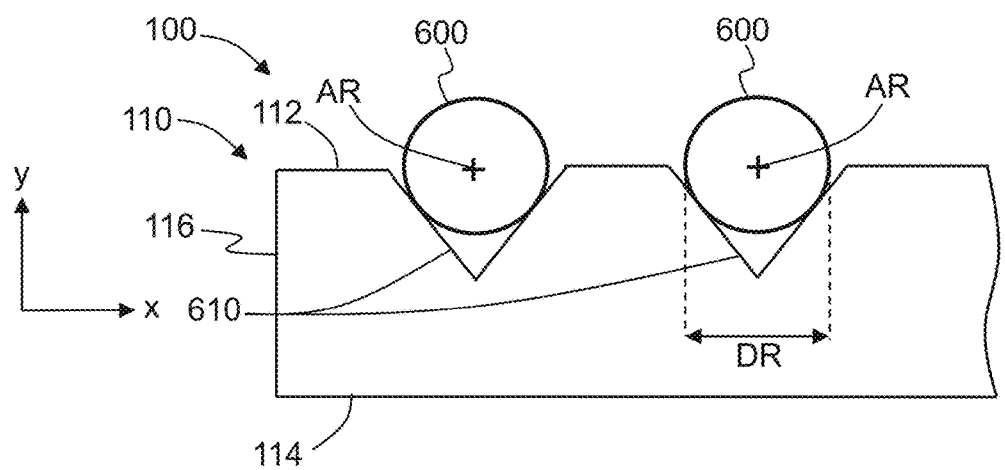
FIG. 3D is a close-up cross-sectional view of a portion of the MCF fan-out apparatus near one of its sides, and which can be taken in any of the three assemblies showing how outboard alignment rods reside in alignment V-grooves near the sides of the assembly.
Figure 4A:
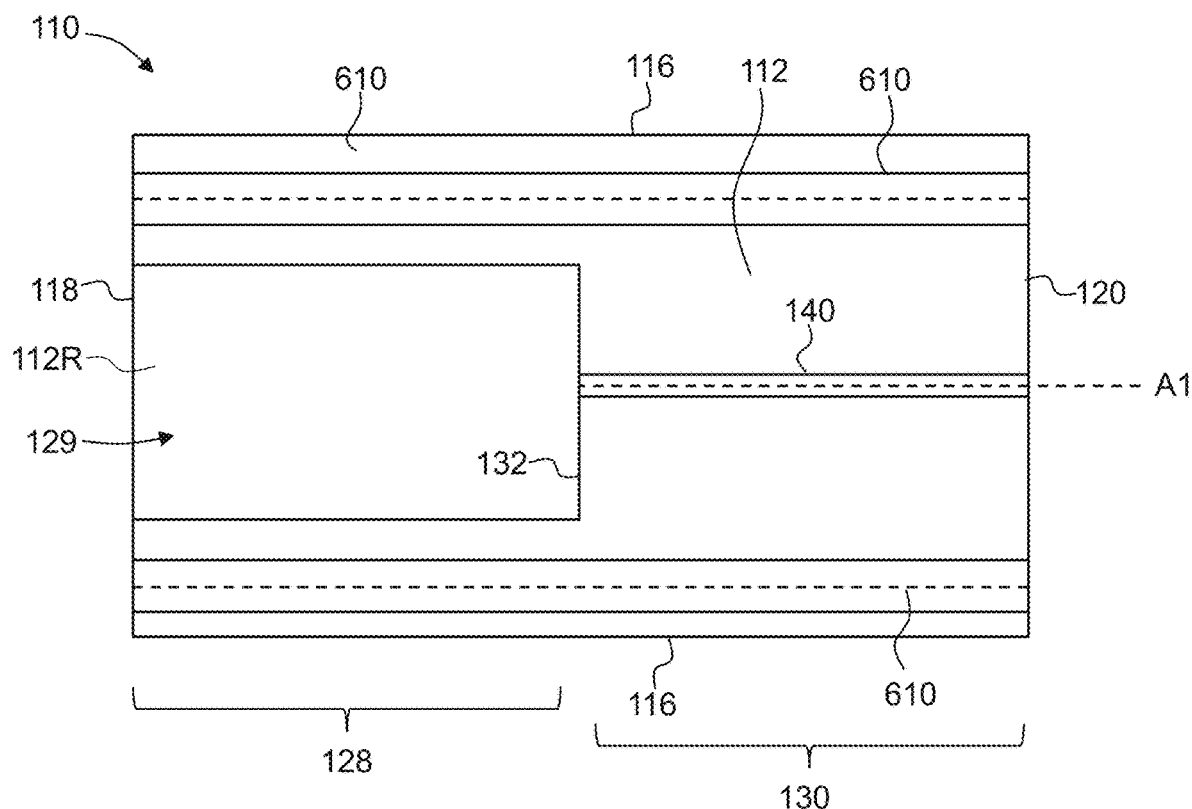
FIG. 4A is a top-down view of an example MCF substrate used in the MCF assembly of the MCF fan-out apparatus.

FIG. 3D is a close-up cross-sectional view of a portion of the apparatus 50 near one of its sides. The MCF assembly 100 and its MCF substrate 110 is shown by way of example, but corresponding views for the fan-out assembly 300 and the SMF assembly 500 would appear the same. With reference to FIGS. 3D and 4A, the MCF substrate 110 has a main axis A1, a top surface 112, a bottom surface 114, opposite sides 116, an input or front/proximal end 118, and an output or back/distal end 120.

In an example, the top surface 112 includes, proximate to each side 116, at least one outboard alignment V-groove 610. In the example of FIG. 3D, two alignment V-grooves 610 are shown proximate one of the sides 116, with the opposite side 116 (not shown in FIG. 3D) also having two alignment V-grooves. The alignment V-grooves 610 are sized to support respective alignment rods 600 having respective central rod axes AR so that the rod axes AR run parallel to the MCF substrate axis A1. The alignment rods 600 can be larger than a typical optical fiber and have a diameter DR, which in an example is in the range from 500 microns to 1000 microns. In an example, the alignment rods 600 are made of glass and are precision formed using for example glass drawing processes known in the art. In an example, the alignment rods 600 have circular cross-sectional shapes to facilitate the aforementioned kinematic contact with the alignment V-grooves 610 and with the optional alignment rod cap. In an example, the alignment V-grooves are substantially larger than the fiber V-grooves.

The alignment V-grooves 610, like the fiber V-grooves introduced and discussed below, may be precision formed using precision machining processes known in the art. In the discussion below, the alignment V-grooves 610 and/or the alignment rods 600 are omitted from some of the Figures for ease of illustration and discussion. The use of V-grooves for supporting the alignment rods 600 and the various fibers used herein is advantageous because it provides kinematic engagement of the alignment rods 610 and fibers and the corresponding caps, which in turn facilitates the passive optical alignment of the components when fabricating each assembly 100, 300, and 500 and when interfacing one assembly with another to form the MCF apparatus 50.

MCF Assembly

Figure 4B:
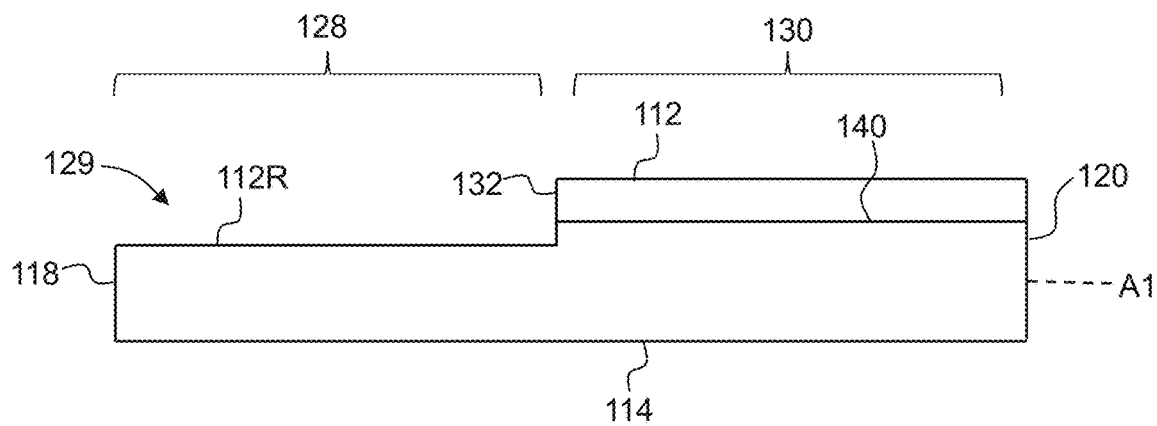
FIG. 4B is a cross-sectional view of the MCF substrate of FIG. 4A.

FIG. 4A is a top-down view and FIG. 4B is a cross-sectional view (along the MCF axis A1) of an example substrate 110 of the MCF assembly 100. The substrate 110 is generally planar includes the aforementioned top and bottom opposite surfaces 112 and 114, the opposite sides 116, the front/proximal end 118, and the back/distal end 120. First and second outboard alignment V-grooves 610 are shown residing adjacent respective sides 116.

The MCF substrate 110 includes a front (proximal) section 128 that includes the front end 118 and a back (distal) section 130 that includes the back end 120. In an example, the front section 128 includes a recessed portion 129 centered on the MCF axis A1 so that at least a corresponding axial portion of the back section 130 is elevated relative to the recessed portion 129. The recessed portion 129 defines a transition 132 between the front and back section 128 and 130, wherein the transition 132 can be step-like or gradual. In an example, the width of the recessed portion 129 can be relatively narrow, e.g., just wide enough to accommodate the MCF 30. The substrate surface within the recessed portion 129 is denoted 112R and is referred to herein as the recessed surface 112R.

The alignment V-grooves 610 run through the front and back sections 128 and 130 on either side of the recessed portion 129 in the front section 128. The role of the recessed portion 129 is explained below. The back section 130 includes an MCF V-groove 140 that runs along the MCF axis A1 or parallel thereto and is open at the transition 132.

Figure 5A:
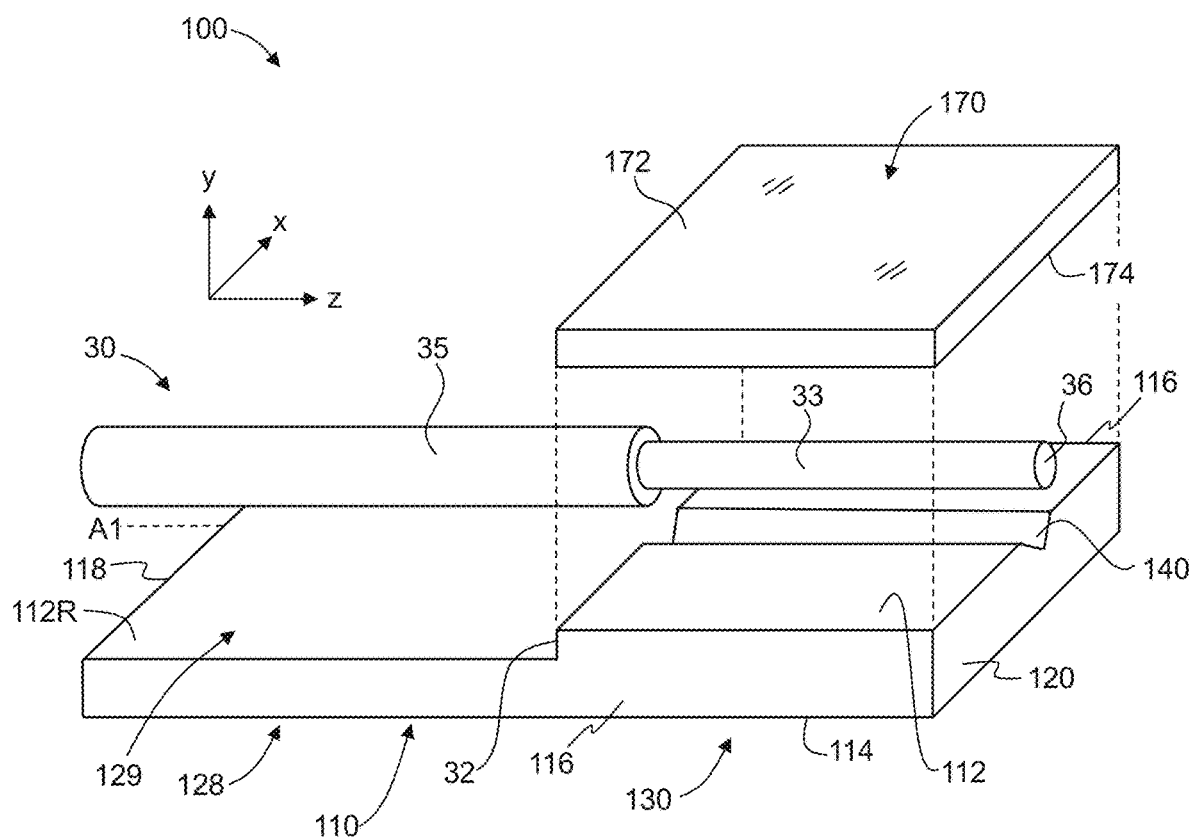
FIG. 5A is a close-up elevated and exploded view of the central portion of the MCF substrate showing the MCF and a fiber cap arranged over a back section of the MCF substrate.

FIG. 5A is a close-up elevated and exploded view of a central portion of the MCF substrate 110 showing the MCF 30 and an MCF cap 170 arranged over the back section 130. The cross-sectional shape of the MCF 30 is shown in FIG. 5A and in some of the other Figures that follow as being round, but it can also be U-shaped or D-shaped or have some other non-circular shape to enable passive azimuthal alignment of the MCF within the MCF V-groove. The MCF cap 170 has a top surface 172 and a bottom surface 174. In an example, the bottom surface 174 is formed as a precision surface. The MCF 30 is shown with a bare glass section 33 residing above the MCF V-groove 140 at the back section 130 and a coated section 35 residing above the recessed surface 112R at the front section 128.

Figure 5B:
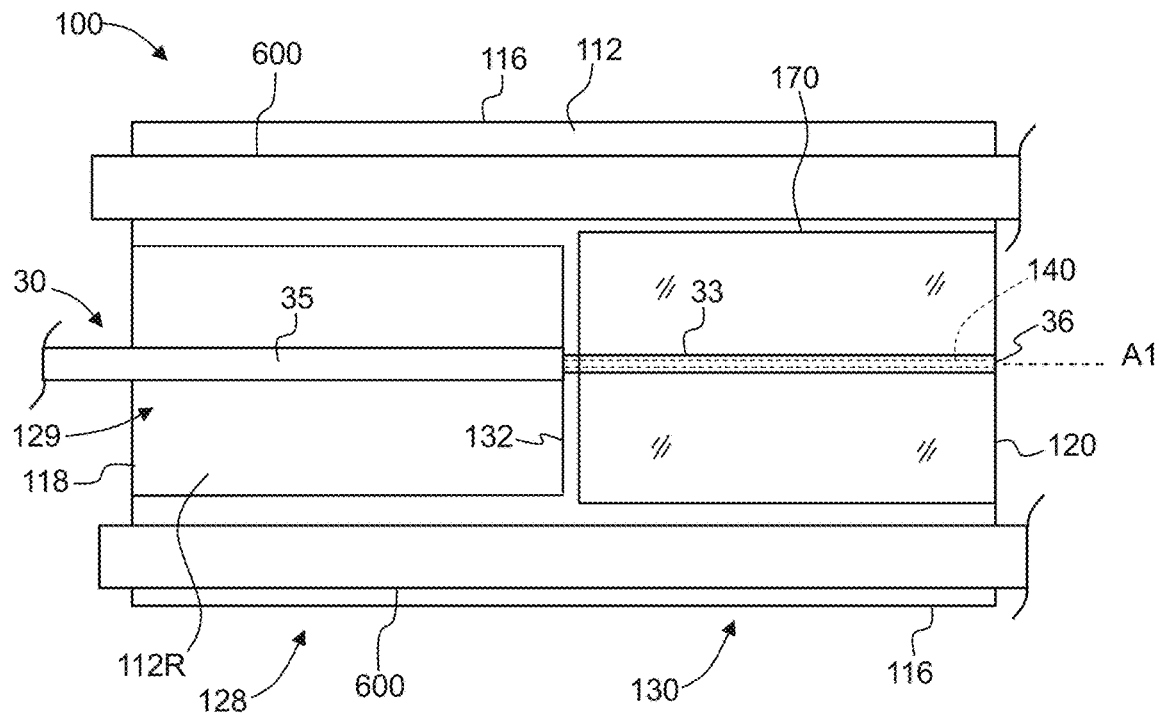
FIG. 5B is similar to FIG. 5A but shows the MCF in place on the MCF substrate and the fiber cap in place over the MCF at the back section of the MCF substrate to form the MCF assembly.
Figure 5C:
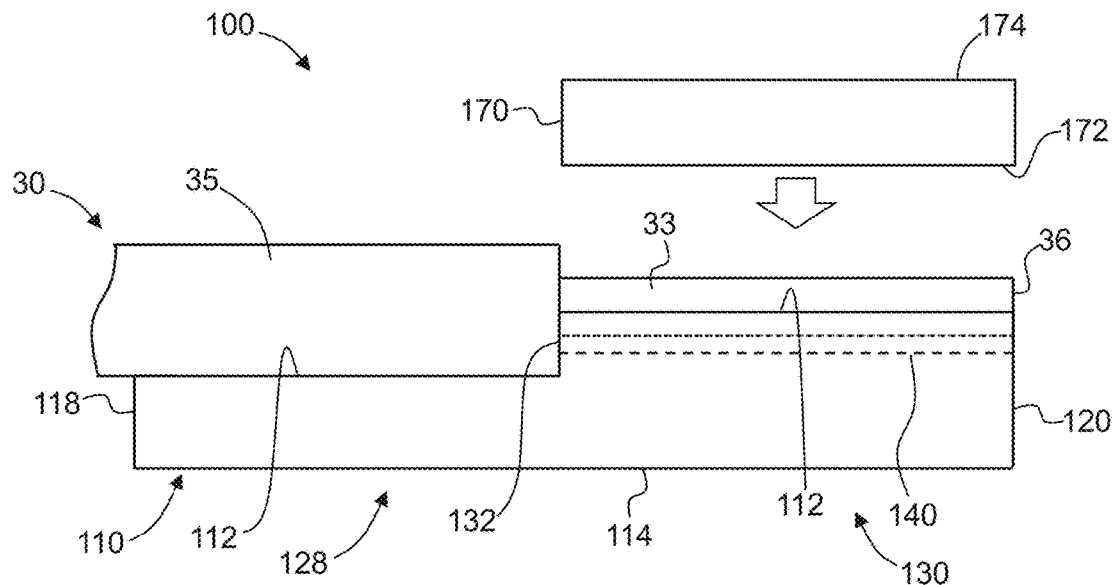
FIG. 5C is a cross-sectional view of the MCF assembly of FIG. 5B showing how the fiber cap is placed on the back section of the MCF substrate and a bare glass section of the MCF supported therein.

FIG. 5B is a top-down view and FIG. 5C is a side view of the MCF assembly 100 showing the MCF 30 and alignment rods 600 in place on the MCF substrate 110. The bare glass section 33 of the MCF 30 resides in the MCF V-groove 140 (shown as a dashed line since it is hidden by the bare glass section 33), with its fiber end face 36 at the back end 120 of the MCF substrate 110. The MCF cap 170 resides atop the back section 130 and the bare glass section 33 of the MCF 30. Note that the recessed portion 129 at the front section 128 of the MCF substrate 110 is configured to accommodate the transition of the MCF 30 from the coated section 35 to the glass section 33, which allows for the glass section 33 to set directly into the MCF V-groove 140 without bending.

Figure 5D:
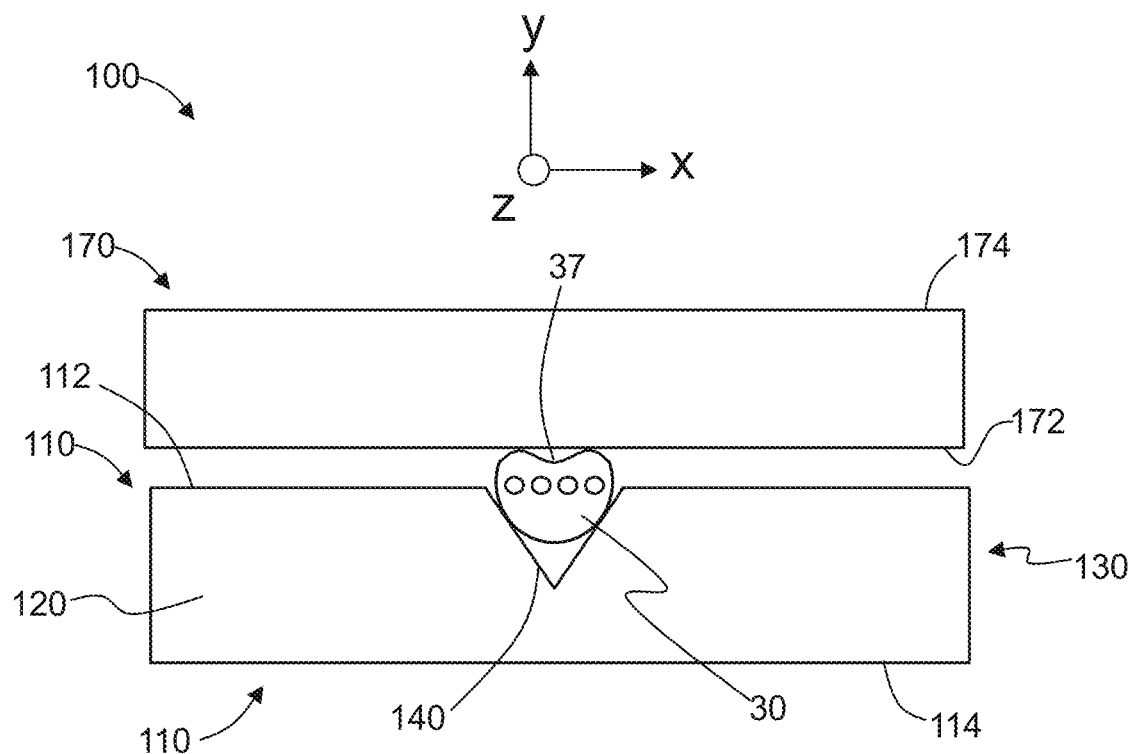
FIG. 5D is a close-up end-on view of a back end of the MCF assembly showing an end face of the MCF and a linear array of cores supported by the MCF.
Figure 5E:
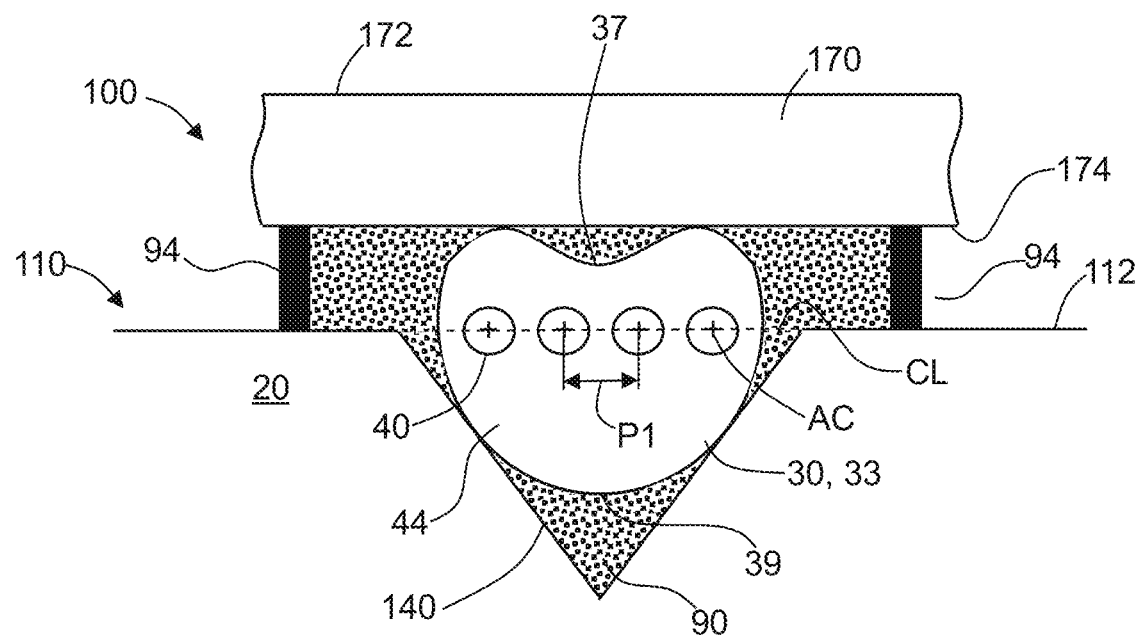
FIG. 5E is an even more close-up view of the back end of the MCF assembly showing a securing material in a fiber V-groove and flow restrictors that restrict the flow of the securing material before it is cured.

FIG. 5D is a close-up end-on view of the back end 120 of the MCF assembly 100 at the MCF V-groove 140 showing the MCF 30 residing in the MCF V-groove 140. The bottom surface 172 of the MCF cap 170 contacts the proximal edge 37 of the MCF 30. In the example, and as more clearly shown in the close-up end view of FIG. 5E, the common line CL of the core axes AC of the cores 40 of the MCF 30 nominally reside in the plane of the top surface 112 at the back section 130 (FIG. 4B). FIG. 5E also shows a securing material 90 residing in the MCF V-groove 140 to secure the MCF 30 within the fiber V-groove. Securing material 90 can also be added in the space between the MCF cap 170 and the MCF substrate 110 to secure the MCF cap 170 to the MCF substrate 110. In an example, flow restrictors 94 are disposed or formed on either side of the MCF 30 and extend between the cap 170 and the MCF substrate 110 to prevent the flow of the securing material 90 from beyond the vicinity of the MCF 30 to avoid contaminating other areas of the MCF assembly 100. In another example, portions of the securing material 90 can be cured to form a flow restrictor 94. Or flow restrictors can be formed by adding two V-grooves on either side of the MCF V-groove 140.

Figure 5F:
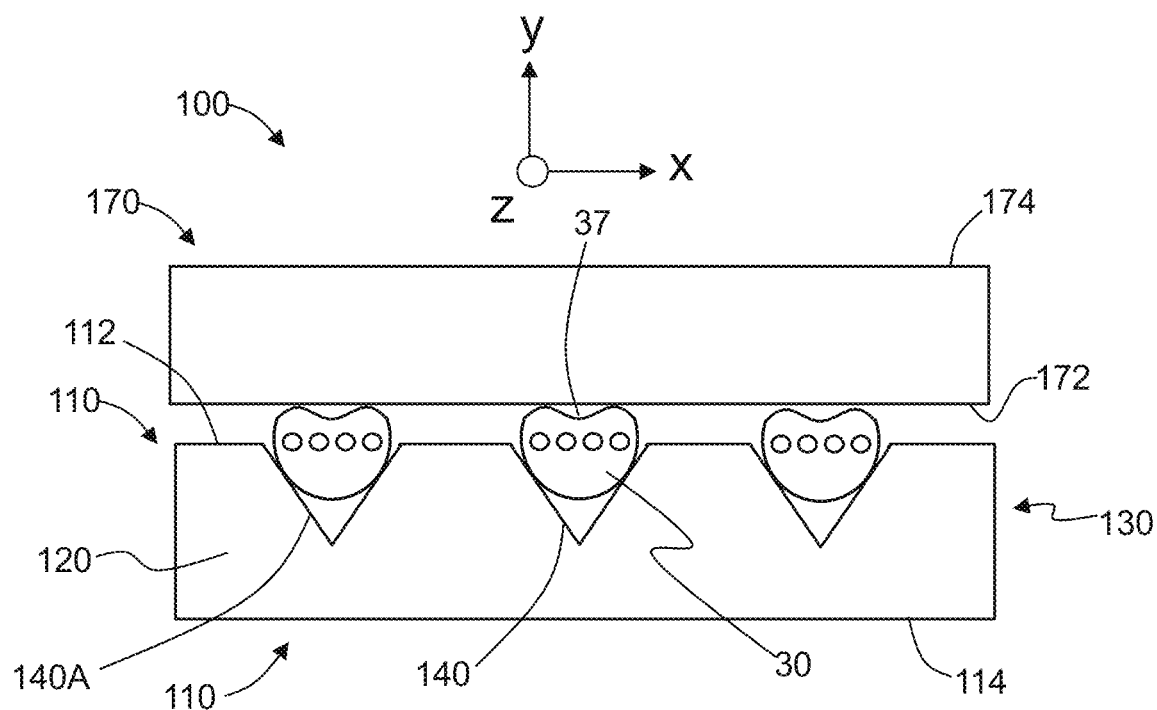
FIGS. 5F and 5G are similar to FIG. 5D and illustrate an example configuration for the MCF assembly that includes auxiliary V-grooves in the MCF substrate to support auxiliary (and inactive) MCFs or support rods to provide stability for the MCF cap.
Figure 5G:
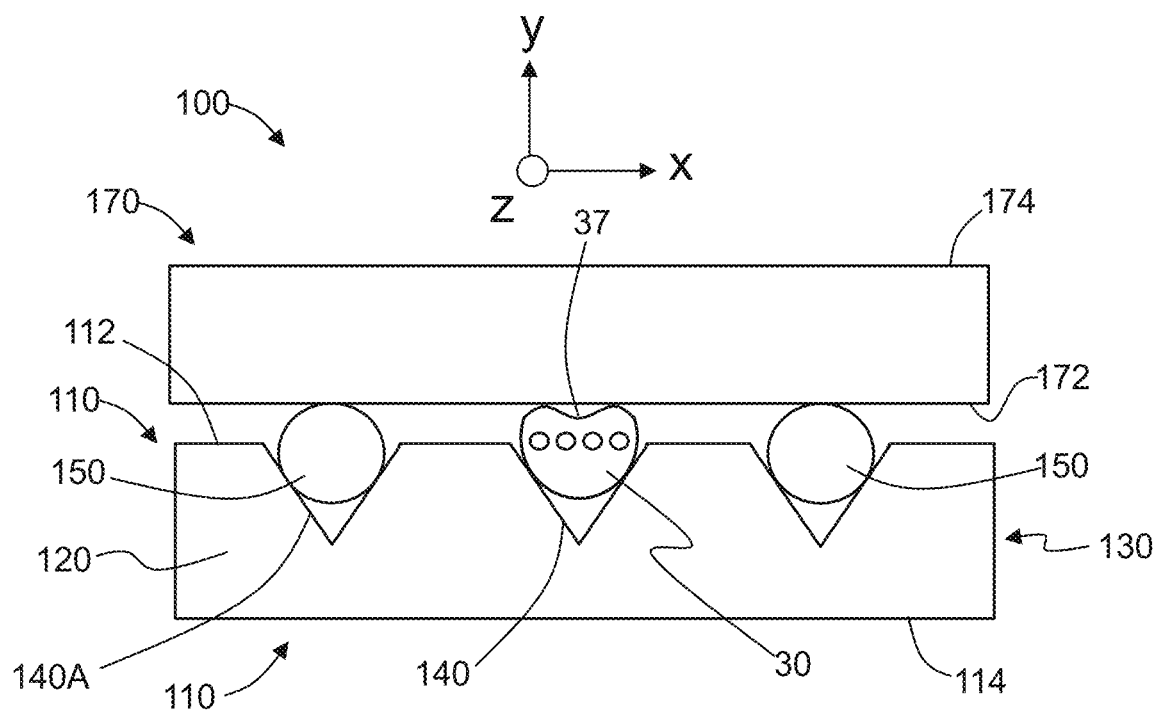

FIGS. 5F and 5G are similar to FIG. 5D and shows an example configuration MCF assembly 100 that includes additional or auxiliary V-grooves 140A on opposite sides of a central MCF V-groove 140. In the example of FIG. 5F, the auxiliary V-grooves 140A respectively support MCFs 30 that are not used for optical communication and are used to provide additional support and stability for the MCF cap 170 so that it does not rotate around the central MCF 140 used for optical communication.

FIG. 5G is similar to FIG. 5F but shows support rods 150 supported in the auxiliary V-grooves sized to provide the additional support and stability for the MCF cap 170.

A role of the MCF cap 170 is to push the MCF 30 into position within the MCF V-groove 140 so that it rotates into the correct azimuthal orientation passively, i.e., without the need for high precision alignment stages and/or optical feedback use to perform active alignment.

In an example, the top surface 112 need not be a precision surface and there may be advantages to forming the top surface 112 as a non-precision surface. To obtain the precise alignment of the MCF assembly 100 with the fan-out assembly 300, the MCF V-groove 140 is formed at a precise depth relative to the depths of alignment V-grooves 610. So when the MCF and alignment V-grooves 140 and 610 are formed, they may not be at precise depths relative to the top surface 112 (due to, for example, wedge in the substrate 120), but the V-groove sidewall surfaces will all be precisely located relative to one another. This allows the MCF 30 to be precisely located relative to the alignment rods 600 (i.e., the axis AF of the MCF to be aligned with the axes AR of the alignment rods), thereby enabling passive alignment of the MCF assembly 100 to the fan-out assembly 300. This same principle allows for passive alignment between the fan-out assembly 300 and the SMF assembly 500.

Fan-Out Assembly

Figure 6A:
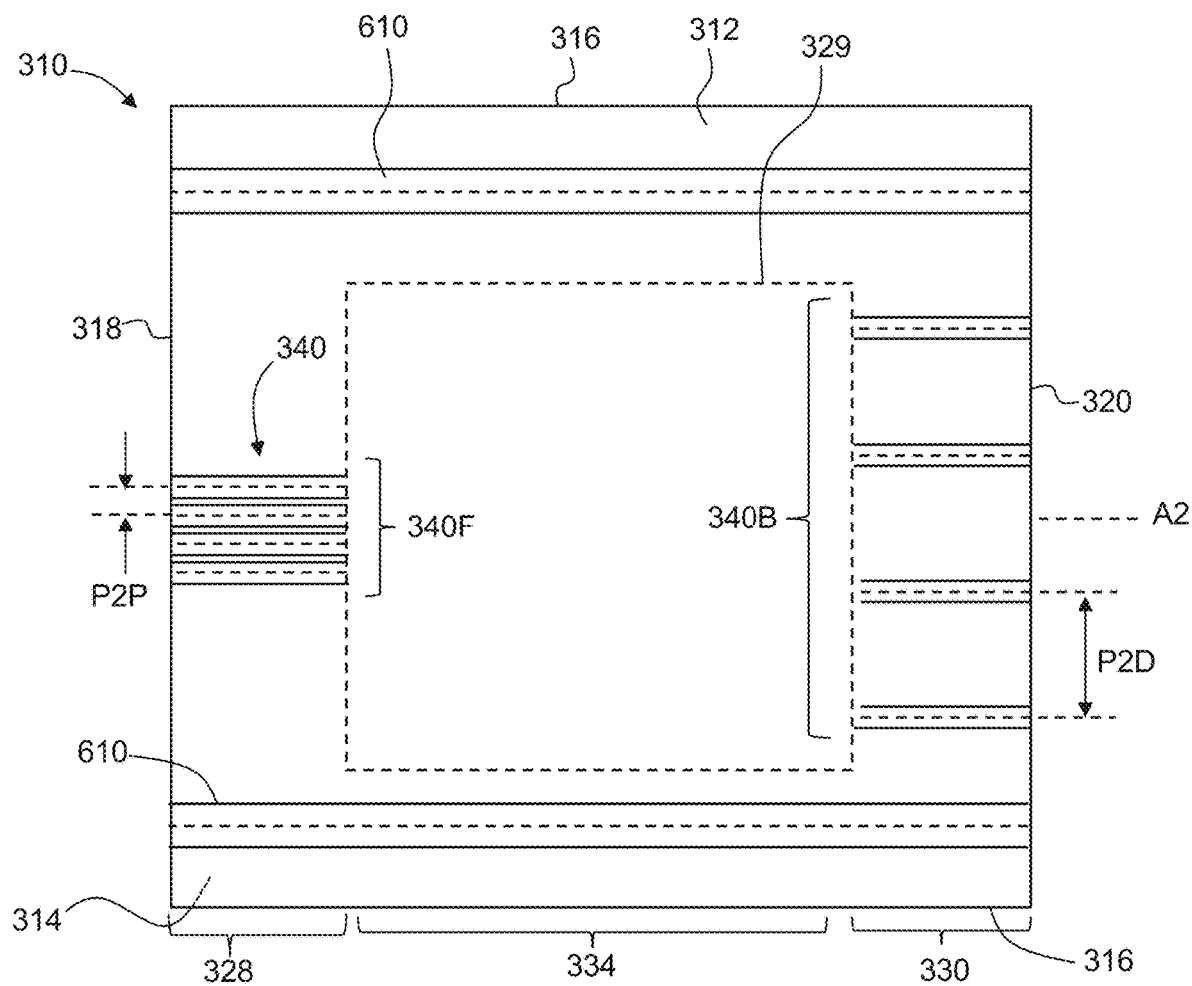
FIG. 6A is a top-down view of an example fan-out substrate used in the fan-out assembly of the MCF fan-out apparatus.

FIG. 6A is a top-down view of an example fan-out substrate 310 for the fan-out assembly 300. The fan-out substrate 310 is generally planar and has a main axis A2, opposite top and bottom surfaces 312 and 314 (see FIG. 8B), opposite sides 316, a front or proximal end 318, and a back or distal end 320. The fan-out substrate 310 includes a front (proximal) section 328 that includes the front end 318, and a back (distal) section 330 that includes the back end 320. The fan-out substrate 310 also includes a central section 334 sandwiched by (i.e., between and adjacent) the front and back sections 328 and 330.

Figure 6B:
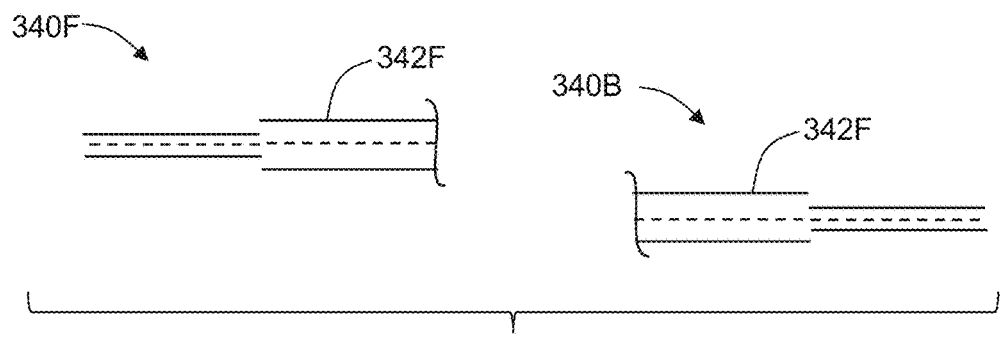
FIG. 6B is a close-up top-down view of example small clad fiber (SCF) fiber V-grooves that have an enlarged end section to accommodate a portion of the coated section of an SCF.

The example fan-out substrate 310 of FIG. 6 includes small-clad fiber (SCF) V-grooves 340. In one example, the SCF V-grooves 340 comprise relatively short front (proximal) V-grooves 340F at the front end 318 and relative short back (distal) V-grooves 340B at the back end 320. The front V-grooves 340F are tightly configured to have a front-end (proximal-end) pitch P2P that matches the 1×n configuration and core pitch P1 of the cores 40 of the MCF 30. The back V-grooves 340B are more spaced apart and are configured to have a 1×n configuration with back-end (distal-end) pitch P2D that matches a pitch P3 of SMF V-grooves 540 of the SMF assembly 500, as discussed below. In an example, the distal-end pitch P2D is greater than the proximal-end pitch P2F, i.e., P2D>P2P. In other examples, the distal-end pitch P2D is at least 1.5 times the proximal end pitch P2P, i.e., P2D≥(1.5)·P2P. In another example, the distal-end pitch P2D is at least twice as large as the proximal-end pitch P2P, i.e., P2D≥2·P2P.

In an example, the distal end pitch is in the range from 30 microns to 600 microns, or in the range from 60 microns to 500 microns, or in the range from 127 microns to 250 microns, with these example ranges being consistent with at least one of the above conditions on the relative size of the proximal-end pitch P2P to the distal-end pitch P2D so that there is at least some degree of fan-out between the proximal and distal ends 318 and 320 of the fan-out substrate 310 of fan-out assembly 300.

The fan-out substrate 310 also includes outboard alignment V-grooves 610 proximate the sides 316. The alignment V-grooves 610 run in the axial direction between the front and back ends 318 and 320 and thus parallel to and on opposite sides of the main axis A2. The alignment V-grooves 610 are sized to accommodate the alignment rods 600 as described above and are configured to align with the alignment V-grooves 610 of the MCF substrate 110 when their respective main axes A1 and A2 are co-axial.

FIG. 6 also illustrates an example wherein the fan-out substrate 310 includes a recessed portion 329 between the front and back sets of SCF V-grooves 340F and 340B. The recessed portion 329, whose purpose is explained below, is shown using dashed lines to illustrate that it is an optional feature.

Figure 7A:
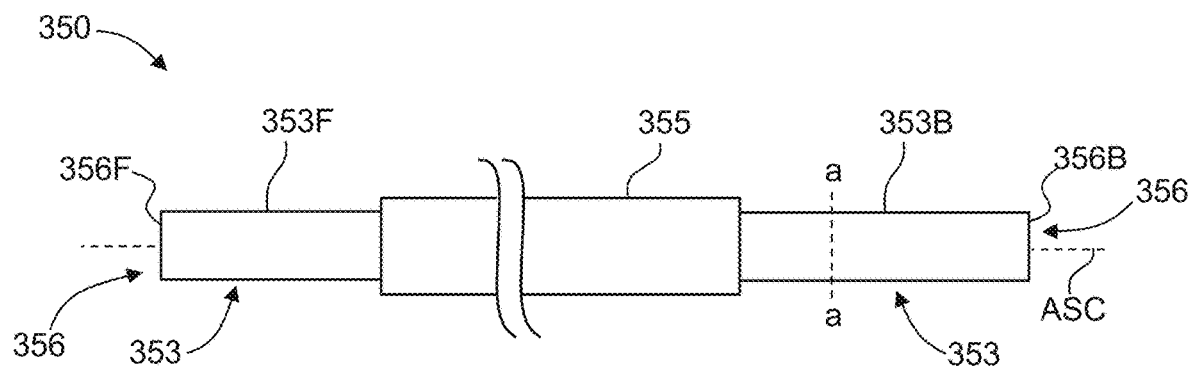
FIG. 7A is a side view of an example SCF and FIG. 7B is a cross-sectional view taken along the line a-a of FIG. 7A.
Figure 7B:
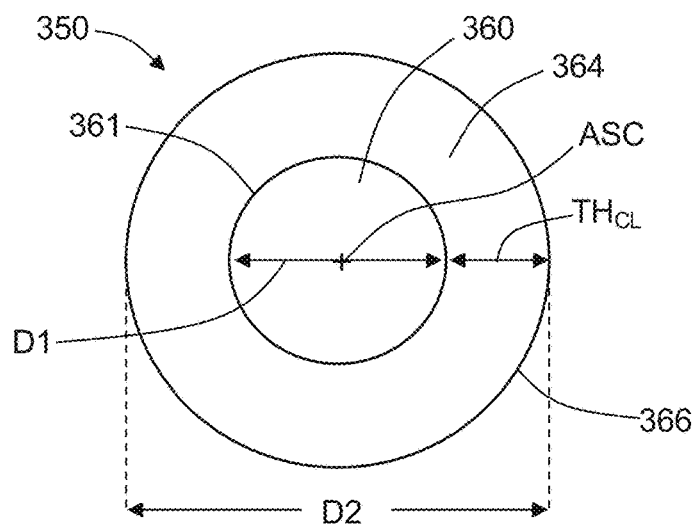

The SCF V-grooves 340 are each sized to kinematically support a respective small-clad fiber (SCF). Example SCFs are described in U.S. Patent Application Publication No. 2019/0331848, entitled "Small diameter low attenuation optical fiber," and which is incorporated by reference herein. FIG. 7A is a side view and FIG. 7B is a cross-sectional view of an example SCF 350 taken along the line a-a in FIG. 7A. The SCF 350 has a main axis ASC, a glass section 353, and a coated section 355 that immediately surrounds the glass section 353. The coated section 355 comprises a non-glass coating that can be removed (stripped) to expose the glass section 353, in which case the latter is also referred to as a bare glass section 353. The SCF 350 terminates with a fiber end face 356. In an example, the coated section 355 can comprise multiple coating layers. In the example shown in FIG. 7A, the SCF 350 has a proximal or front bare glass section 353F with a proximal or front end face 356F, and a distal or back bare glass section 353B with a distal end face 356B.

With reference to FIG. 7B, the SCF 350 has a glass core 360 with an outer surface 361, and a glass cladding 364 immediately surrounding the core 360 and having an outer surface 366. The core 360 has a diameter D1 while the cladding 364 has a diameter D2. The cladding 364 has a thickness $TH_{CL}$ as measured radially out from the outer surface 361 of the core 360. In an example, the core 360 and cladding 364 are configured to make the SCF 350 bend resistant or bend insensitive, meaning that optical loss due to bending the SCF is less than that of standard SMFs. In an example, the bending of the SCFs 350 is minimized to the extent possible, e.g., by using a gradual S-bend shape to the SCFs. In an example, the axial length of the fan-out substrate 310 can be selected to keep the bending of the SCFs 350 to within a given bend tolerance associated with a given optical loss tolerance.

In an example, the SCF 350 is a single mode fiber and the core diameter D1 is in the range from about 7 microns (e.g., 7.2 microns) to about 11 microns (e.g., 10.8 microns) and in various examples the cladding diameter D2 is in the range from about 8 microns to 63 microns, or 20 microns to 45 microns, or 23 microns to 45 microns or from 23 to 31 microns. In some examples, the cladding 364 can be removed from an end section of a SCF 350 to leave just the core 360, so that D1=D2. The SCF V-grooves 340 are sized to accommodate the bare glass section 355 and so are relatively narrow as compared to V-grooves used to accommodate a standard SMF, which typically has a cladding diameter of 125 microns and a fiber pitch of 127 microns. The use of SCFs 350 allow for a greater fiber density (i.e., small pitch P2P) at the front end 318 of the fan-out substrate 310.

Figure 8A:
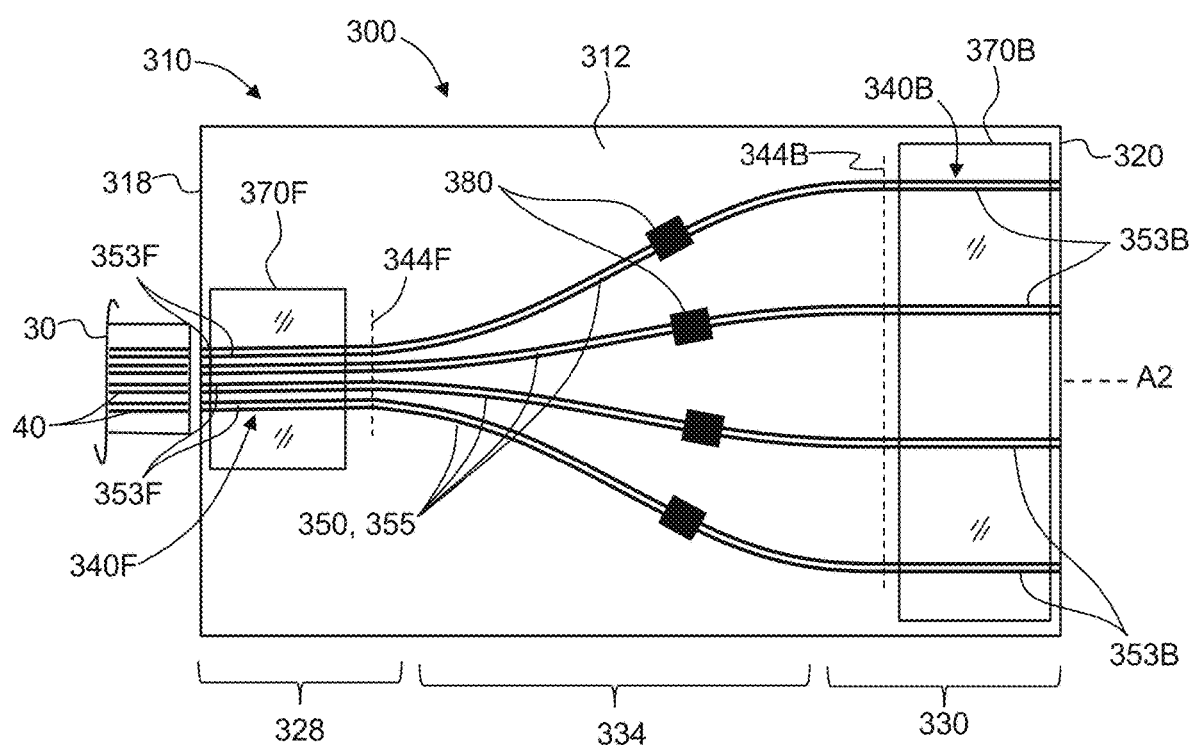
FIG. 8A is a top-down view similar to FIG. 6A and showing the SCFs operably disposed in front and back V-grooves of the fan-out substrate and showing the fan out from densely arranged fiber ends at a front section to the spaced apart fiber ends at a back section.

FIG. 8A is similar to FIG. 6A and shows the fan-out substrate 310 with an array of SMFs 350 operably arranged within the fiber V-grooves 340 (see FIG. 6A), and in particular with front bare glass sections 353F supported by the front set of SCF V-grooves 340F and with back bare glass sections 353B supported by the back set of SCF V-grooves 340B. FIG. 8A shows with dashed lines the location of inner terminal ends 344F and 344B of the front and back sets of SCF V-grooves 340F and 340B, with the outer terminal ends of these V-grooves respectively defined by the front and back ends 318 and 320 of the fan-out substrate 310.

FIG. 8A also shows front (proximal) and back (distal) fiber caps or SCF caps 370F and 370B respectively disposed on the front and back bare glass sections 353F and 353B of the SCFs 350 at the front and back sections 328 and 330 of the fan-out substrate 310. In an example, the bending of the SCFs 350 takes place only in the coated sections 355. Further in the example, a portion of the coated sections 355 immediately adjacent the corresponding front and back bare glass sections 353F and 353B of the SCFs 350 are kept straight and supported in respective enlarged portions 342F and 342B of the front and back SCF V-grooves 340F and 340B, as shown in the close-up top-down view of FIG. 6B.

Figure 8B:
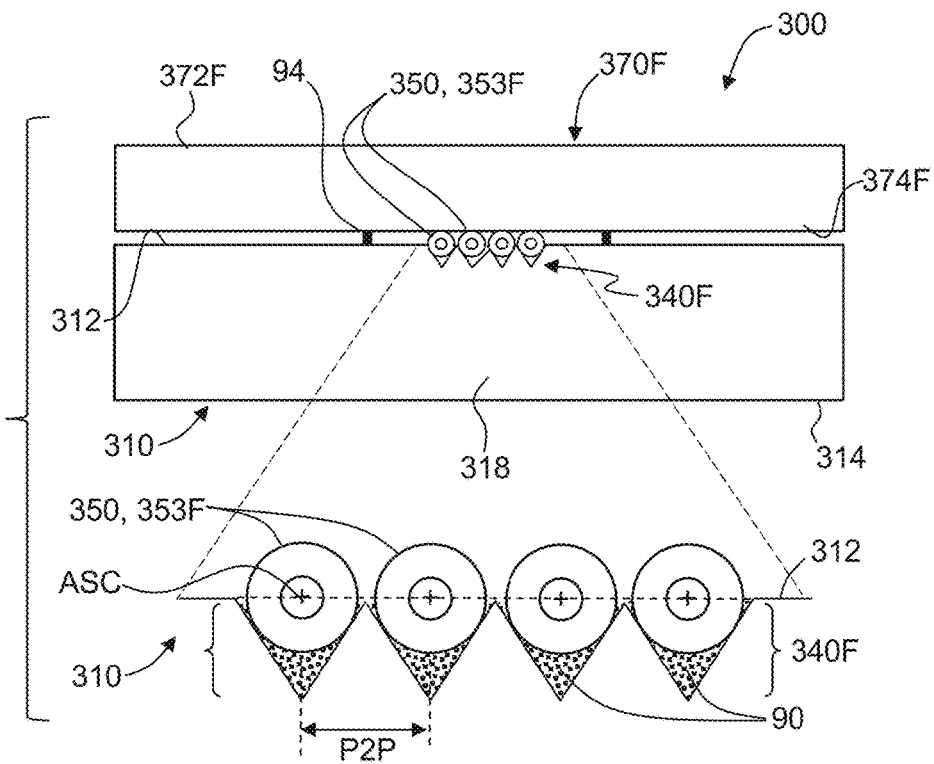
FIGS. 8B and 8C are close-up end-on views of a central portion of the front and back ends of the fan-out assembly.
Figure 8C:
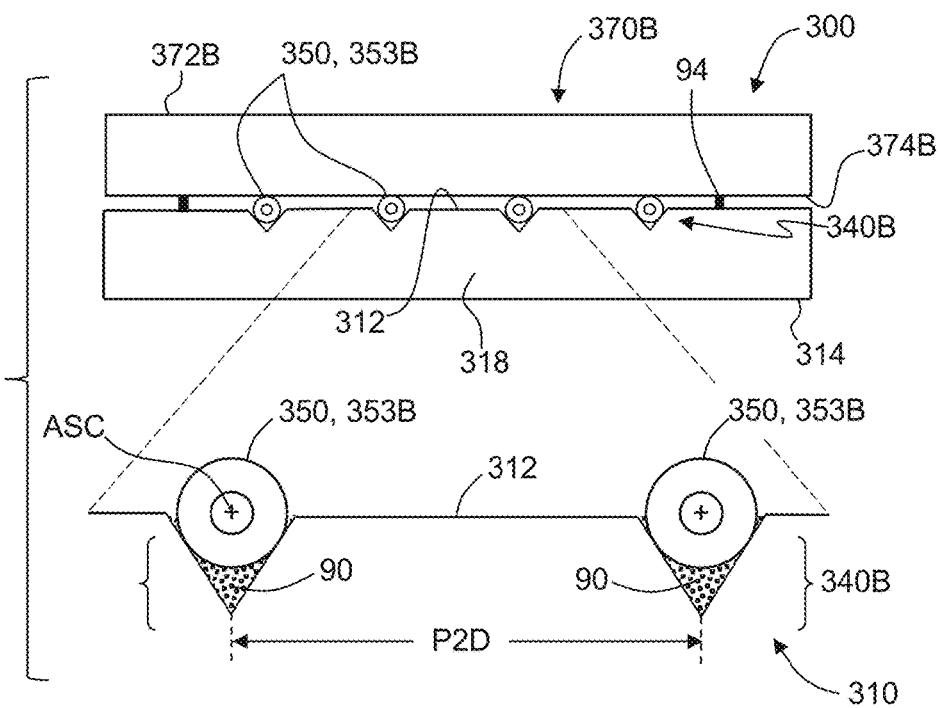

FIGS. 8B and 8C are front-end and back-end views, respectively, of the fan-out assembly 300 of FIG. 8A showing the respective configurations of the SMFs 350 at the front and back ends 318 and 320 of the fan-out substrate 310. The front and back SCF caps 370F and 370B respectively have top surfaces 372F and 372B and bottom surfaces 374F and 374B. The bottom surface 374F of the front SCF cap 370F presses against the front bare glass sections 353F, while the bottom surface 374B of the back SCF cap 370B presses against the back bare glass sections 353B. A securing material 90 is used to keep the front and back bare glass sections 353F and 353B in their respective SCF V-grooves 340F and 340B, as shown in the close-up portions of FIGS. 8B and 8C, respectively.

In an example shown in FIGS. 8B and 8C, flow restrictors 94 are disposed or formed on either side of the SCF V-grooves 340F and 340B that extend between the cap 350 and the fan-out substrate 310 to prevent the flow of the securing material 90 from beyond the vicinity of the SMFs 350 to avoid contaminating other areas of the fan-out assembly 300.

The SCF V-grooves 340 are precision formed in the same manner as other V-grooves used in the system 10. The short-length example configuration of the SCF V-grooves 340 allows for the front and back bare glass sections 353F and 353B of the SMFs 350 to be respectively secured within the front and back sets of the SCF V-grooves 340F and 340B at the front and back sections 328 and 330 of the fan-out substrate 310 to define the respective front-end (proximal) and back-end (distal) fiber pitches P2P and P2D, as shown in FIGS. 8A and 8B. On the other hand, the center portions of the SMFs 350 traverse the central section 334 of the fan-out substrate 310 need not follow a precise path, and can optionally be secured to the top surface 312 (e.g., using securing material, not shown) or by securing features 380, which need not be positioned with high precision (see FIG. 8A). In an example, the center portions of the SCFs 350 can also be bare glass sections 353 or can be coated sections 355. In an example, the central recess 329 (FIG. 6) can be used to accommodate the thicker coated sections 355 that traverse the center section 334.

Figure 8D:
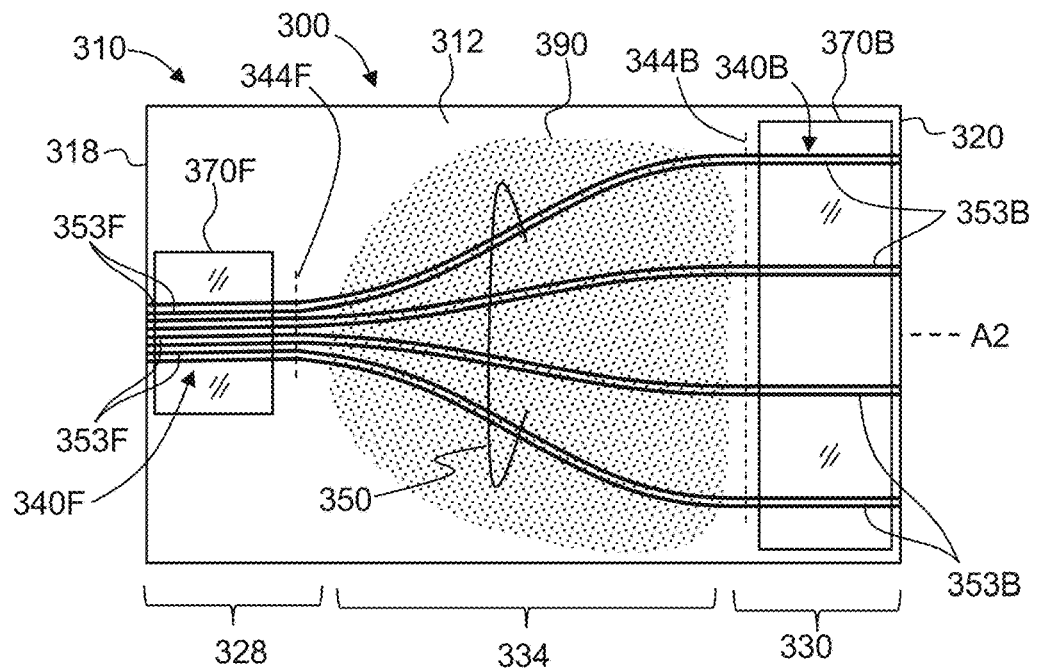
FIG. 8D is similar to FIG. 8A and shows an optional coating material over the SCFs in the central section of the fan-out substrate.

FIG. 8D is similar to FIG. 8A and shows a protective coating 390 over the SCFs 350 in the central section 334 to protect the otherwise exposed SCFs. The protective coating 390 can comprise a curable securing material that also keeps the SCFs 350 in place or can be in addition to other securing means such as the aforementioned securing features 380. The coating material 390 can also comprise a polymer material or glass material compatible with the SCFs 350 and the underlying fan-out substrate 310.

Figure 9:
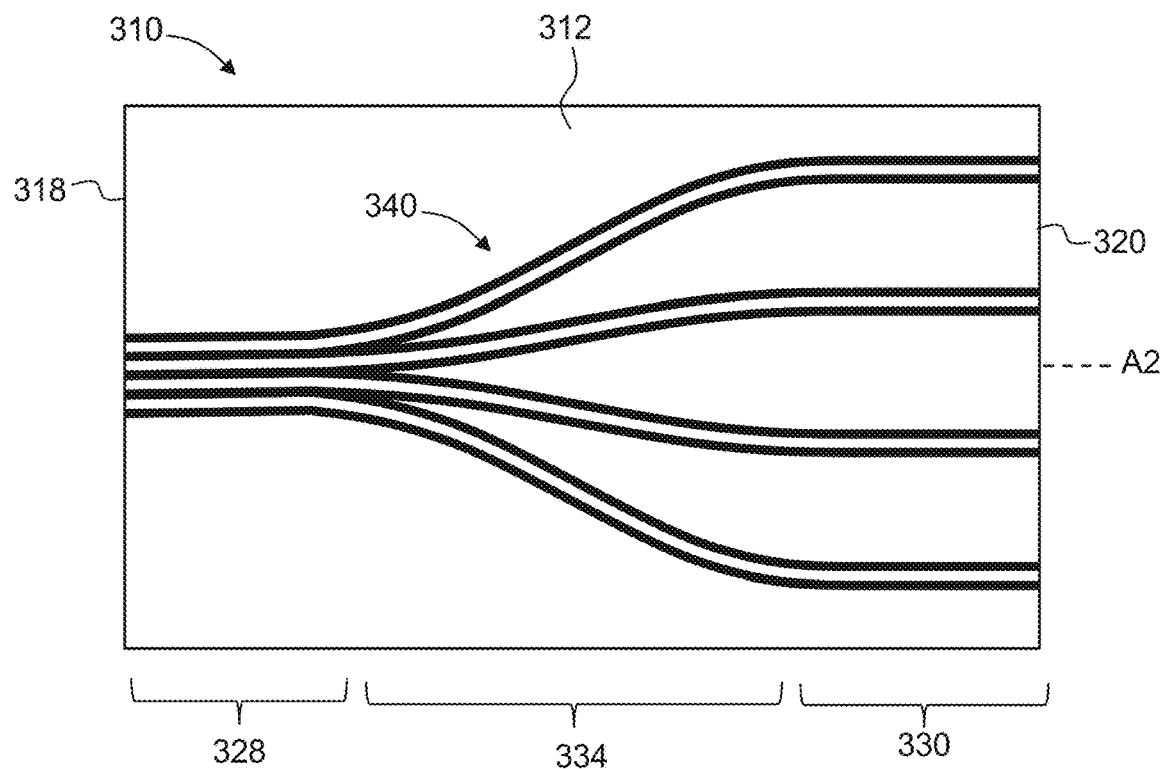
FIG. 9 is a top-down view of an example fan-out substrate wherein the fiber V-grooves run from the front end to the back end of the fan-out substrate.

FIG. 9 is similar to FIG. 8A and shows an example fan-out substrate 310 wherein the SCF V-grooves 340 run from the front end 318 to the back end 320 over one or more curved paths to transition from the front-end pitch P2P (FIG. 8B) of between 23 to 50 microns (e.g., 23 to 31 microns) to the back-end pitch P2D (FIG. 8C) of between about 127 to 250 microns. In an example of this embodiment, the SCFs 350 (not shown) would be stripped, i.e., would comprise bare fiber sections 353 to match the size of the SCF V-grooves 340 and to ensure matching the front-end pitch PF2 with the MCF core pitch P1 of the MCF assembly 100. Alternatively, the V-grooves could be widened in the central section 223 to accommodate fiber coated section 355.

SMF Assembly

Figure 10A:
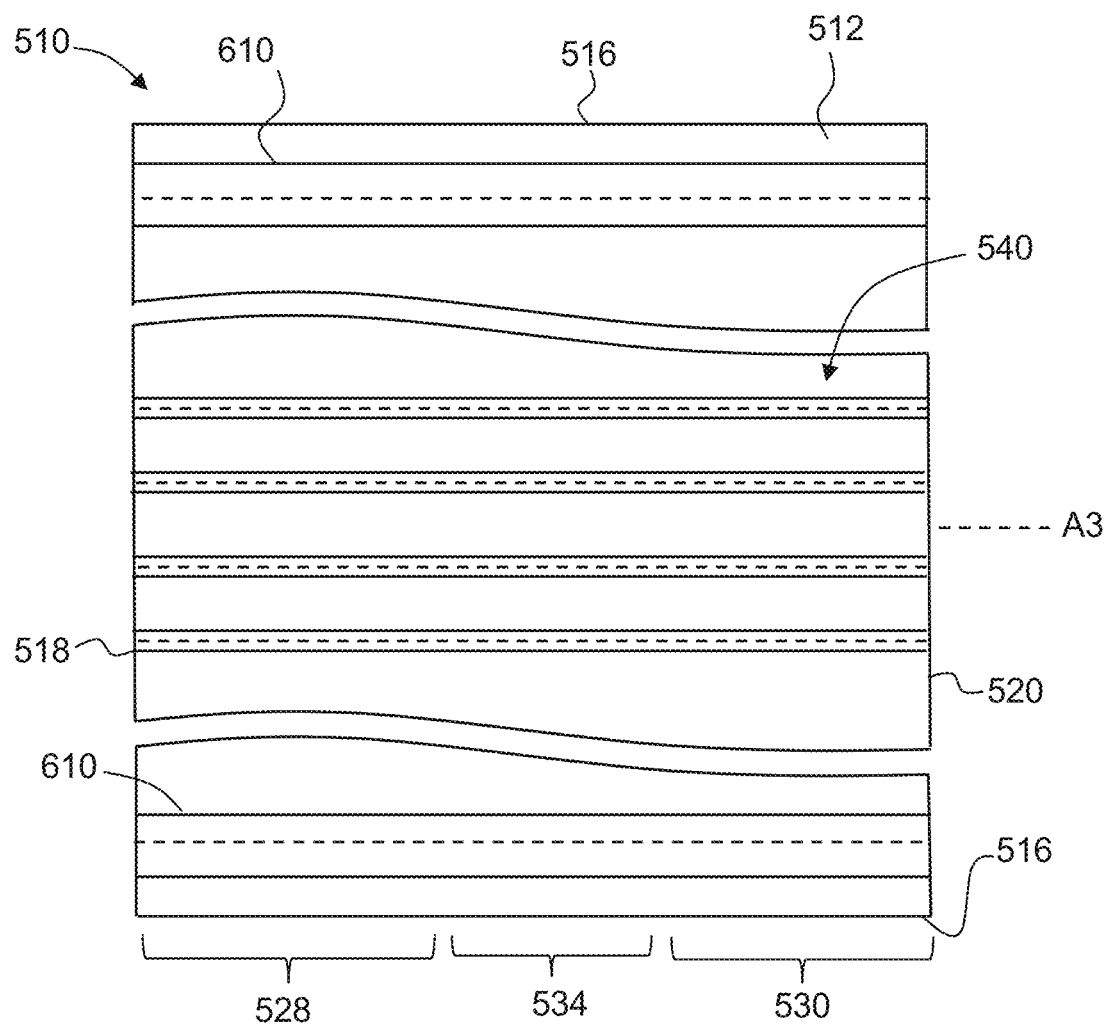
FIG. 10A is a top-down view of an example SMF substrate used in the SMF assembly of an example MCF fan-out apparatus.

FIG. 10A is a top-down view of an example SMF substrate 510 used in the SMF assembly 500 in an embodiment of the MCF fan-out apparatus 50 that includes the SMF assembly 500. The SMF substrate 510 is generally planar and has a main axis A3, opposite top and bottom surfaces 512 and 514 (see FIG. 12D), opposite sides 516, a front or proximal end 518, and a back or distal end 520. The SMF substrate 510 includes a front or proximal section 528 that includes the front end 518, and a back or distal section 530 that includes the back end 520. The SMF substrate 510 also includes a central section 534 sandwiched by the front and back sections 528 and 530.

The example SMF substrate 510 of FIG. 10A includes SMF V-grooves 540 that run axially from the front end 518 to the back end 520 in a direction generally parallel to the main axis A3. The SMF V-grooves 540 are sized to kinematically support standard SMFs.

The SMF substrate 510 also includes outboard alignment V-grooves 610 proximate the sides 516. The alignment V-grooves 610 run axially (extend in the axial direction) between the front and back ends 518 and 520 and thus extend parallel to and on opposite sides of the main axis A3. The alignment V-grooves 610 are sized to kinematically support the alignment rods 600 as described above and are configured to align with the alignment V-grooves 610 of the fan-out substrate 310.

Figure 10B:
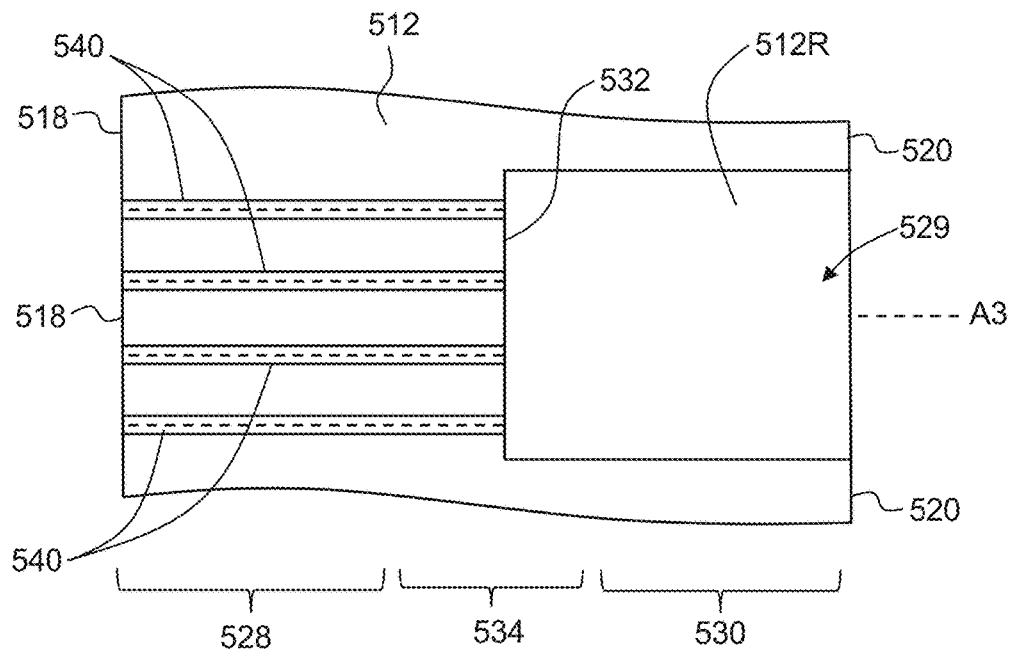
FIG. 10B is a top-down view of a central portion of an example SMF substrate that includes a recessed portion in a back section of the SMF substrate.

FIG. 10B is a close-up view of the middle portion of the SMF substrate 510 and illustrates an embodiment that includes a recessed portion 529 open at the back section 530 and that can terminate in the front section 528 or the central section 534, as shown. The recessed portion 529 defines a recessed top surface 512R and a transition 532 where the SMF V-grooves 540 terminate, i.e., are open to the recessed portion 529. Similar to the previously described recessed portions of the other substrates, the recessed portion 529 is configured to support on the recessed top surface 512R coated portions of a fiber (in this case a SMF 550) so that bare glass sections of the SMF 550 can be kinematically supported directly in the SMF V-grooves 540 and transition thereto without substantial bending.

Figure 11A:
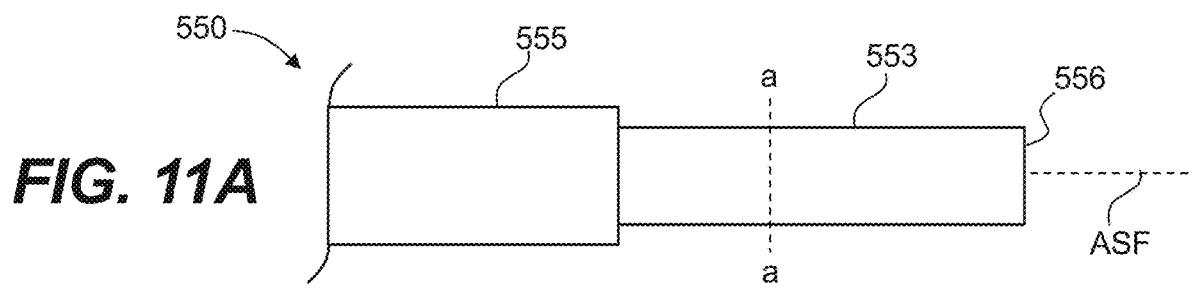
FIG. 11A is a side view of a SMF and FIG. 11B is a cross-sectional view taken along the line a-a of FIG. 11A.
Figure 11B:
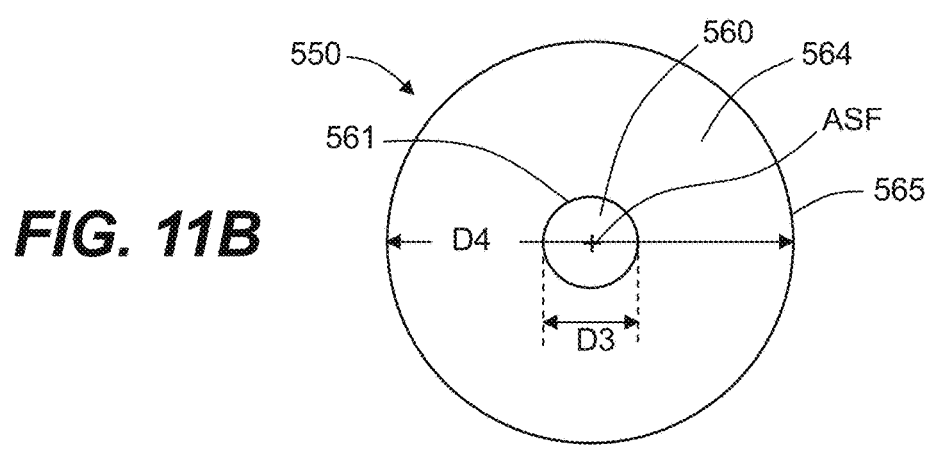

FIG. 11A is a side view and FIG. 11B is a cross-sectional view of an example SMF 550 as taken along the line a-a in FIG. 11A. The SMF 550 has a main axis ASF, a glass section 553, and a coated section 555 that immediately surrounds the glass section 553. The coated section 555 comprises a non-glass coating that can be removed (stripped) to expose the glass section 553, in which case the latter is also referred to as a bare glass section 553. The SMF 550 terminates with a fiber end face 556.

With reference to FIG. 11B, the SMF 550 has a glass core 560 with an outer surface 561, and a glass cladding 564 immediately surrounding the core 560 and having an outer surface 565. The core 560 has a diameter D3, while the cladding 564 has a diameter D4.

In an example, the core diameter D3 is about 10 microns while the cladding diameter D4 is 125 microns (with an example tolerance of +/− 0.07 microns). The SMF V-grooves 340 are sized to accommodate the bare glass section 553 and so are much wider than the SCF V-grooves used to accommodate the bare glass section 353 of the SCF 350.

Figure 12A:
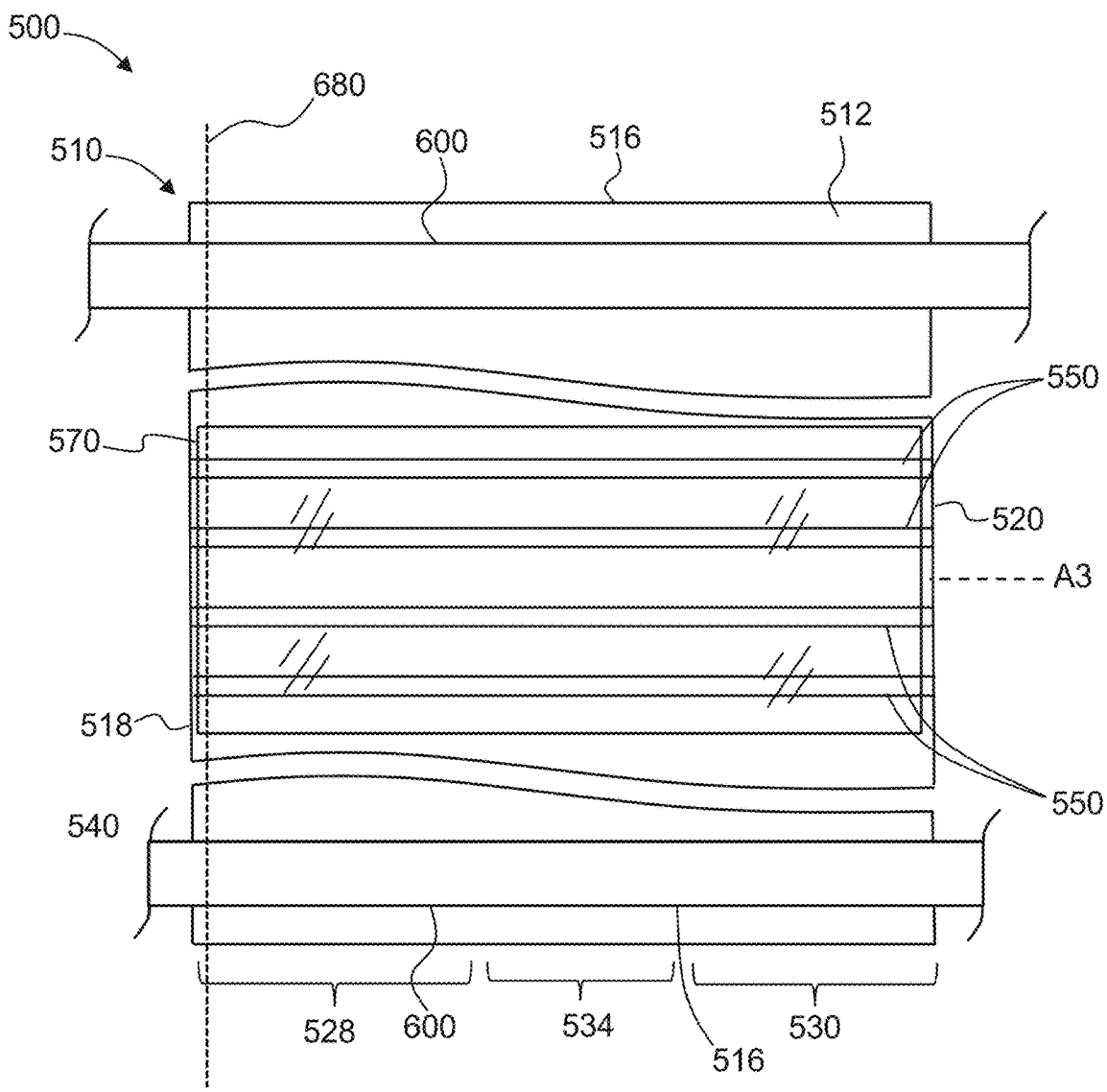
FIG. 12A is similar to FIG. 10A and shows the SMFs in place in the fiber V-grooves of the SMF substrate, and shows the alignment rods in the alignment V-grooves, and the fiber cap over the SMFs to form the SMF assembly.

FIG. 12A is similar to FIG. 10A and includes the SMFs 550 kinematically supported in the SMF V-grooves 540 and the alignment rods 600 kinematically supported in the alignment V-grooves 610. A SMF cap 570 is disposed over the SMFs 550 to complete the SMF assembly 500 of the MCF fan-out apparatus 50. In an example, the SMF cap 570 extends from the front end 518 to the back end 520 of the SMF substrate 510 and provides a third point of contact for the SMFs 550 residing in the SMF V-grooves 540.

Figure 12B:
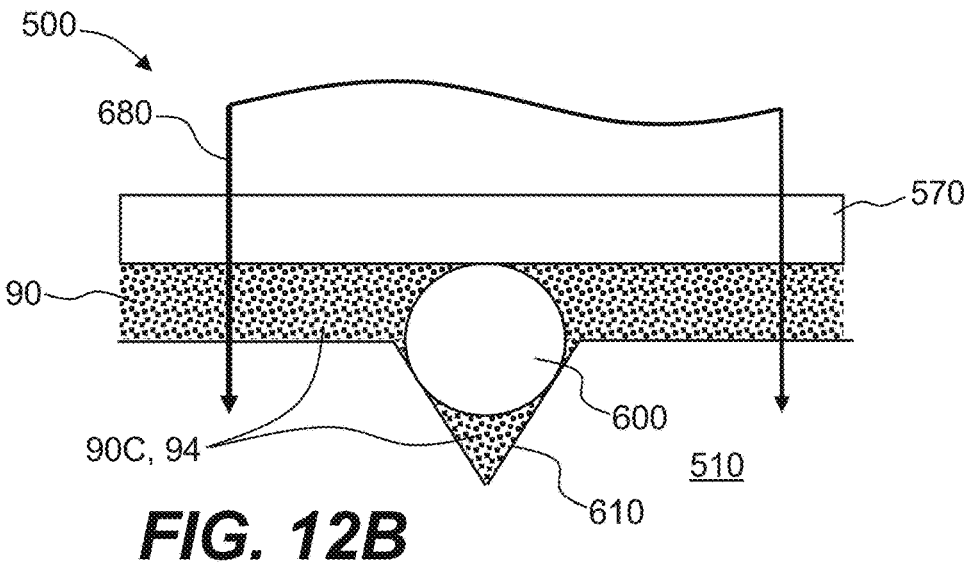
FIG. 12B is a close-up view showing how a light knife can be used to selectively cure the securing material to form a flow restrictor.

FIG. 12A shows a light knife 680 irradiating the SMF assembly close to the proximal end 518 of the SMF substrate 510. FIG. 12B is a close-up end-on view of the light knife 680 formed by a light source (not shown) and irradiating the area around an alignment rod 600 supported in an alignment V-groove 610 of the SMF substrate. Securing material 90 is shown in the alignment V-groove and in the space around the alignment rod 600 between the SMF substrate 510 and the SMF cap 570. In the example where the SMF cap 570 is transparent to the light knife 680 and the securing material is light curable, the light knife can be directed through the SMF cap 570 (or the SMF substrate 510, if transparent) to the securing material to selectively cure a relatively small (e.g., narrow) portion of the securing material at or near the proximal end 518 of the SMF substrate 510. The cured portion 90C of the securing material 90 defines a flow restrictor 94 that restricts the flow of securing material that resides behind the cured portion. This flow restrictor 94 restricts/prevents the uncured securing material 90 from flowing and reaching the proximal end 518 of the SMF substrate 510. This same flow restrictor formation method can be used for the other substrates, including for the MCF 30, the SCF fibers 3450 and the SMF fibers 550, as well as for the alignment rods 600 that extend between the substrates. In other examples, more disperse illumination of actinic light (e.g., flood illumination) can be employed if the flow of the securing material 90 is well controlled prior to curing.

Figure 12C:
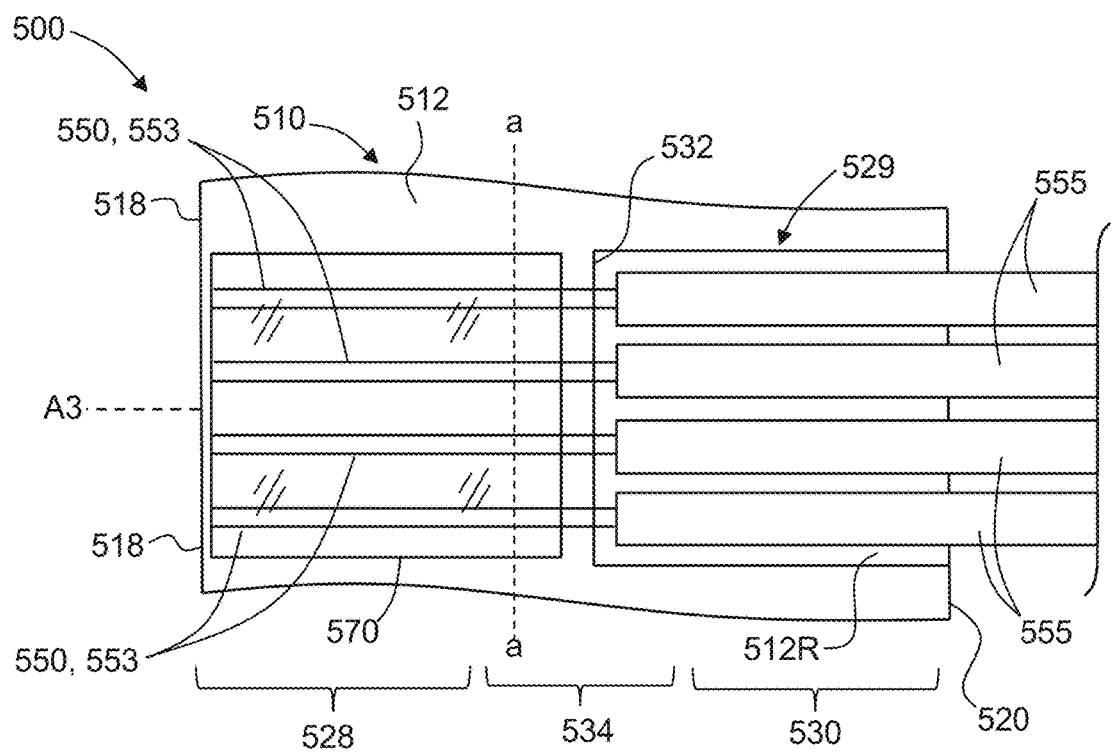
FIG. 12C is similar to FIG. 10B and shows the SMFs in place on the SMF substrate, with bare glass sections of the SMFs in the fiber V-grooves and coated sections in a recessed portion.

FIG. 12C is similar to FIG. 10B and shows the SMFs 550 operably disposed on the SMF substrate 510, with the bare glass sections 553 residing in the SMF V-grooves 540 and the coated sections 555 residing in the recessed portion 529 and supported by the recessed surface 512R. The SMF cap 570 is disposed on the bare fiber sections 553 and in an example extends from the front end 518 of the SMF substrate 510 to the transition 532 or proximate thereto. In an example, a portion of the bare glass sections 553 can reside in the recessed portion 529, as shown.

Figure 12D:
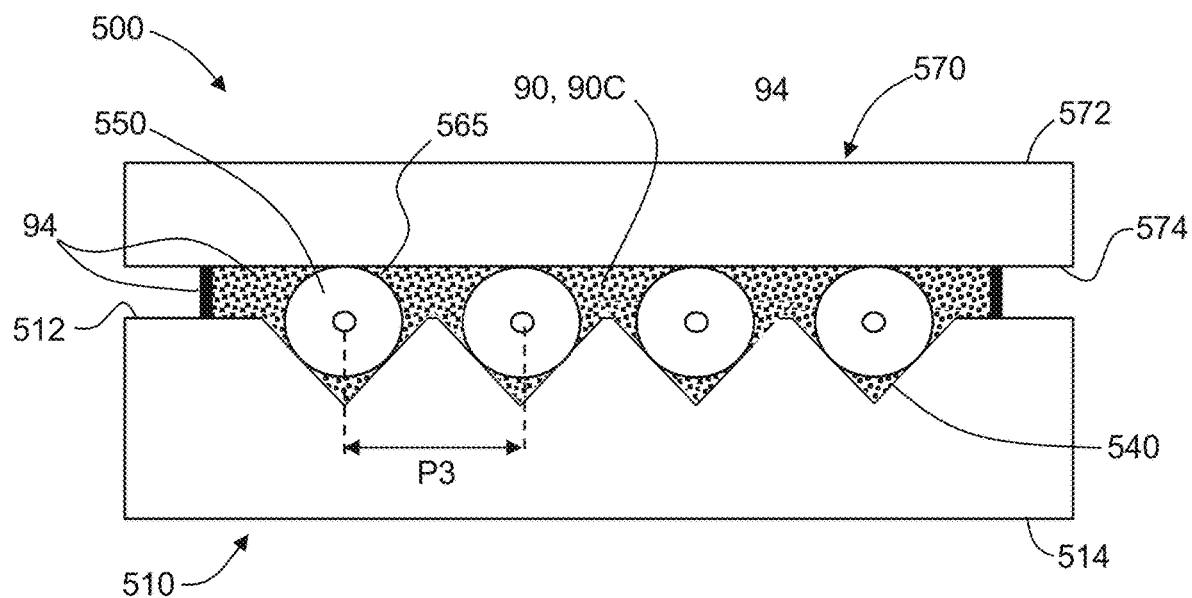
FIG. 12D is an end-on view of a central portion of the front end of the SMF assembly.

FIG. 12D is a cross-sectional view of the central portion 534 of the SMF assembly 500 taken along the line a-a in FIG. 12C. The SMF cap 570 has opposite top and bottom surfaces 572 and 574, with the bottom surface 574 of the SMF cap 570 contacting the outer surfaces 565 of the bare glass sections 553 to provide another point line of contact for the SMFs 550.

FIG. 12D also shows a securing material 90 residing in the SMF V-grooves 540, as well as in the space between the top surface 512 of the SMF substrate 510 and the bottom surface 574 of the SMF cap 570. In the example shown, flow restrictors 94 are formed as described above and used to limit the flow of the securing material 90 to avoid surface contamination.

Alignment Cap

In the discussion above, each of the MCF assembly 100, the fan-out assembly 300, and the SMF assembly 500 had their own caps used to press their respective fibers into the corresponding fiber V-grooves and to optionally provide an additional point of contact. In an example, each section 100, 300, and/or 500 can include its own alignment rod cap ("alignment cap").

Figure 13A:
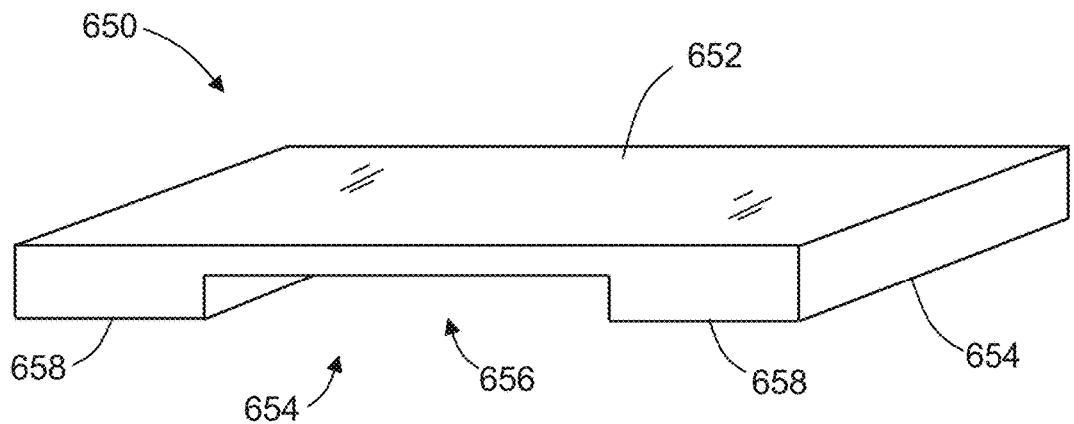
FIG. 13A is an elevated view of an example alignment cap.
Figure 13B:
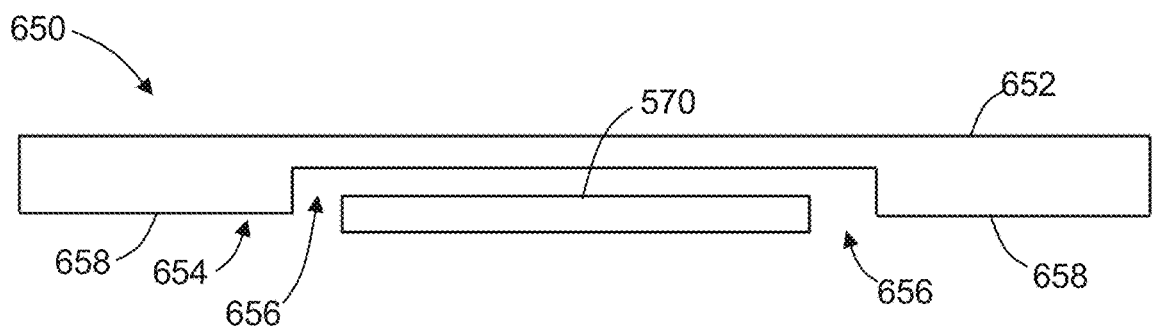
FIG. 13B is an end-on view of the example alignment cap of FIG. 13A showing how the recess is sized to accommodate the presence of another cap (e.g., the fiber cap as shown)
Figure 13C:
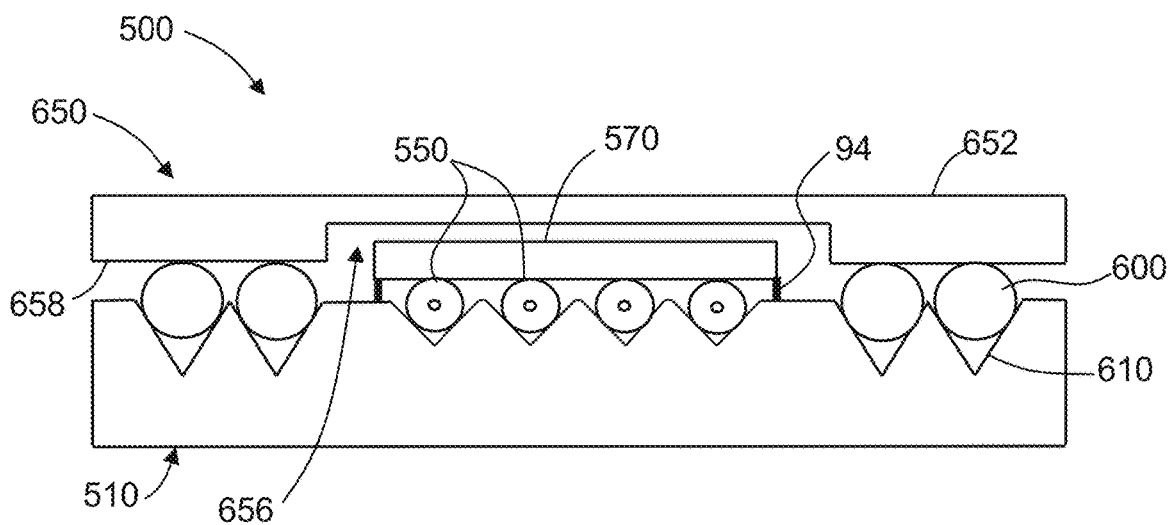
FIG. 13C is an end-on view of an example SMF assembly showing how the fiber cap resides over the SMFs while the alignment cap spans the SMFs and engages the outboard alignment rods.

FIG. 13A is an elevated view and FIG. 13B is an end-on view of an example alignment cap 650 having a top surface 652, a bottom surface 654, and a recess 656 in the bottom surface 654 that runs the length of the cap 650 and that defines outer portions 658 of the bottom surface 654. With reference to FIG. 13B, the recess 656 is sized to accommodate another cap, which is identified as the SMF cap 570 by way of example. The recess 656 allows the alignment cap 650 to engage the alignment rods 600 without interfering with the SMF cap 570 (or the SCF cap 370 or the MCF cap 170). FIG. 13C shows an example alignment cap 650 on the SMF assembly 500, with the outer portions 658 of the bottom surface 654 of the alignment cap 650 contacting the outboard alignment rods 600 supported in the alignment V-grooves 610. In an example, the outer portions 658 of the alignment cap 650 can include alignment V-grooves 610 (see FIG. 16) that engage the corresponding alignment rod 600.

Figure 15:
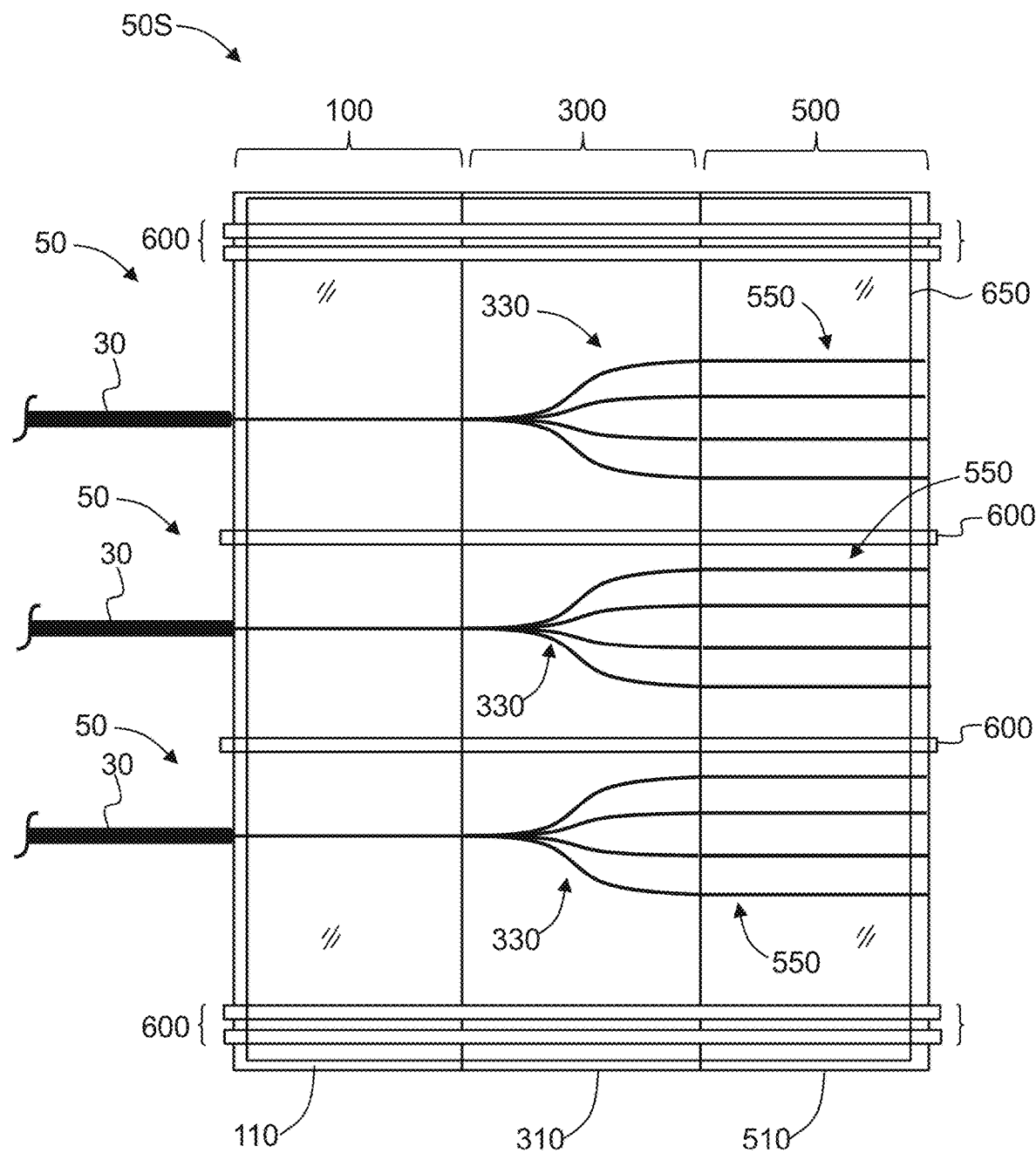
FIG. 15 is a top-down view of an embodiment of the MCF fan-out apparatus that includes multiple MCFs and optional inboard alignment rods.

In an example, the MCF fan-out apparatus 50 includes a single alignment cap 650 that covers all three assemblies 100, 300 and 500, such as shown in FIG. 15, which is introduced and discussed below.

Figure 14A:
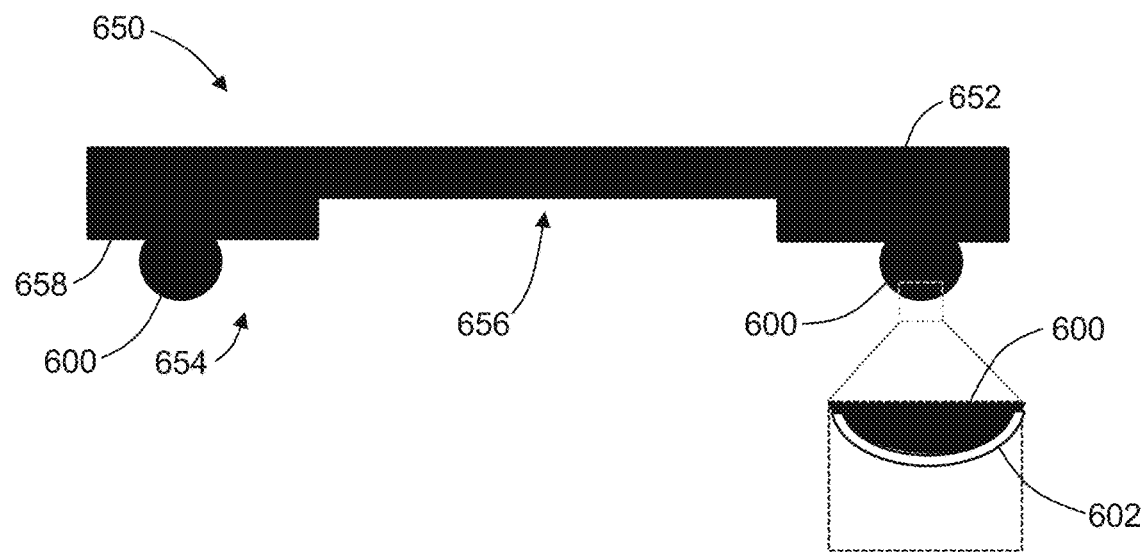
FIG. 14A is an end-on view of an example alignment cap that includes integrated alignment rods and that can be used as a removable alignment fixture.

FIG. 14A is a cross-sectional view of an example alignment cap 650 similar to that shown in FIGS. 13A and 13B but that include fixed alignment rods 600, which can be attached to or integrally formed with the main body of the alignment cap 650 at the outer portions 658 of the bottom surface 646. In an example, at least a portion of the alignment rod 600 includes a release layer 602 to facilitate the release of the alignment cap/fixture 650 from the rest of the structure and in particular from the securing material 90 used to secure the various components of the given assembly and the MCF fan-out apparatus 50. The release layer 602 may be a separate sheet of material (i.e., not integral to the alignment cap 650) in alternative embodiments.

Figure 14B:
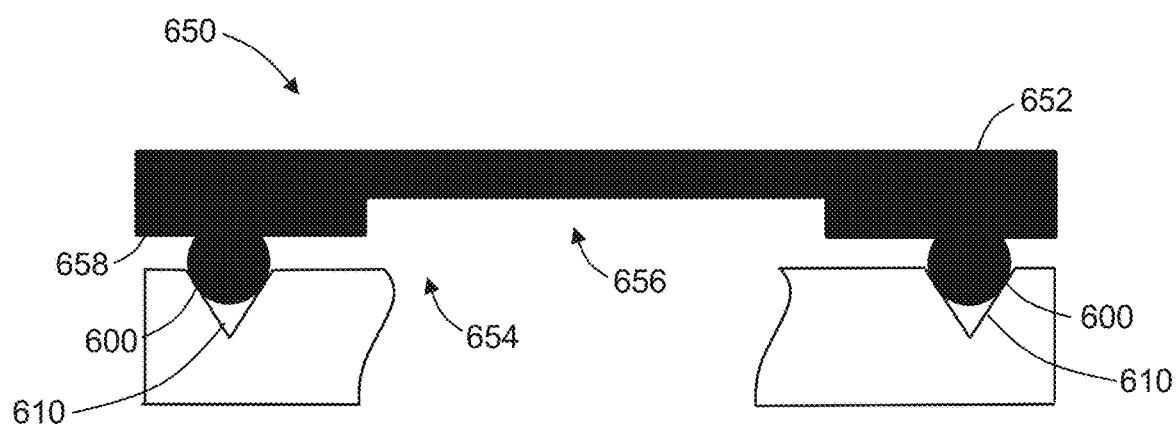
FIG. 14B is similar to FIG. 14A and shows the integrated alignment rods engaging the alignment V-grooves in a support substrate.

FIG. 14B is similar to FIG. 14A and shows how the fixed alignment rods 600 reside within the alignment V-grooves 610 of the given substrate.

Figure 14C:
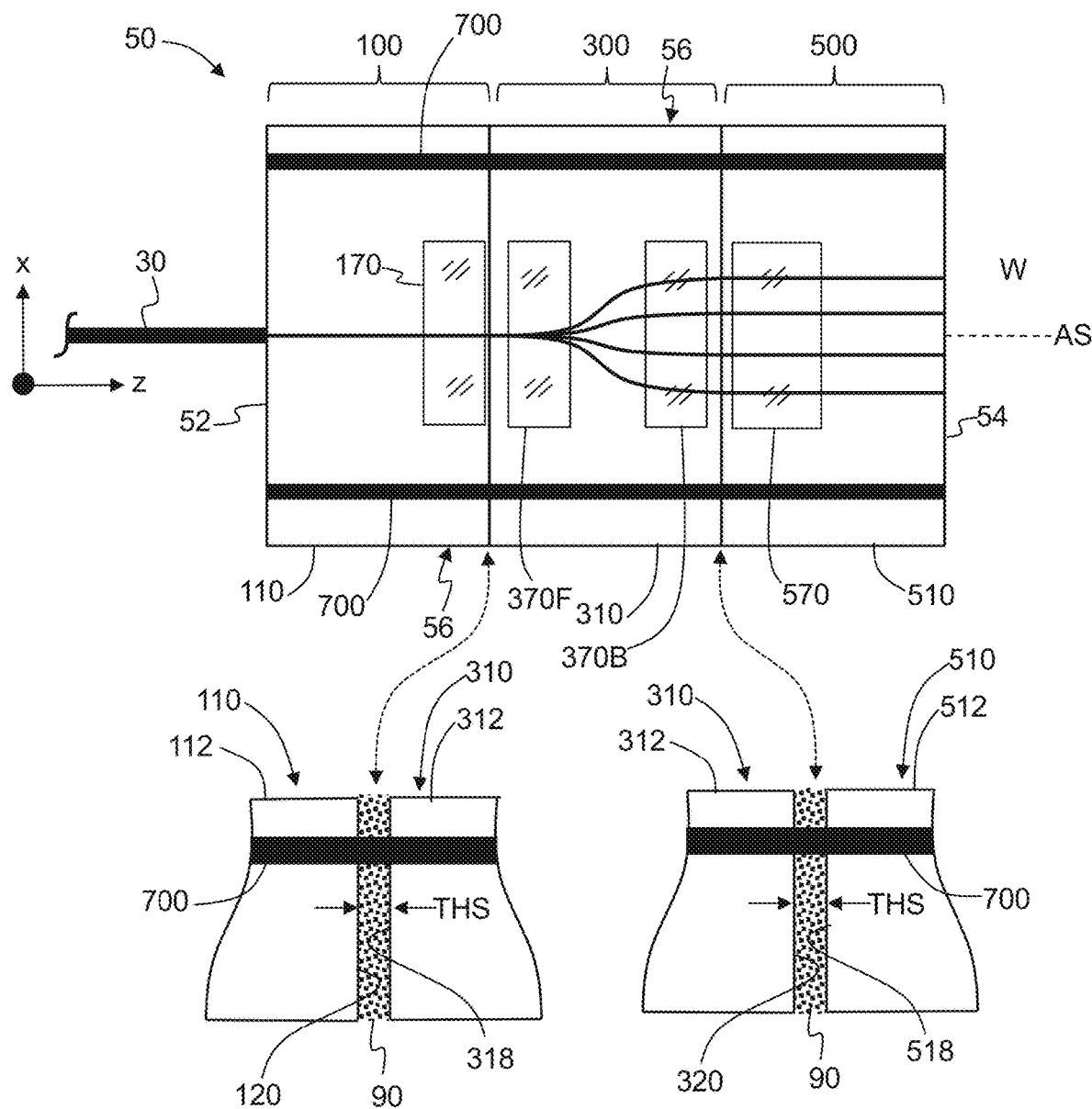
FIG. 14C shows an example MCF fan-out apparatus after the removable alignment fixture has been removed.

FIG. 14C is similar to FIG. 3C and illustrates an embodiment of the MCF fan-out apparatus formed using the removable alignment cap 650 as an alignment fixture and after the alignment cap 650 has been removed. The close-up insets are side views show the securing material 90 is used to secure adjacent assemblies 100 to 300 and 300 to 500. The use of the securing material 90 in the fabrication process is discussed in greater detail below in connection with FIG. 17.

Example rigid structural elements 700 are also shown to provide structural support and are added and secured to the MCF substrates 110 and the fan-out substrate 310 prior to or after removing the alignment cap 650. In an example, rigid structural elements 700 can be placed in available (unoccupied) alignment V-grooves 610 after assembly. In an example, the fixed alignment rods 600 can reside at the very edge of the top portion of the cap to leave room for adding the outboard rigid structural elements 700. Rigid structural elements 700 can also be added to run down the respective sides of the different substrates 110 and 310, as shown in phantom in the close-up insets. In an example that includes the SMF assembly 500, the rigid structural elements 700 that run between the MCF assembly 100 and the fan-out assembly 300 can also run and be attached to the SMF assembly, and in particular can be secured to the SMF substrate 510.

Multiple MCF Embodiment

FIG. 15 is a top-down view of an example MCF fan-out structure 50S that includes multiple fan-out apparatus 50 (three are shown by way of example) and in particular comprises multiple MCFs 30, with each MCF associated with a given set (array) of fan-out SCFs 330 and an array of SMFs 550 respectively supported by an MCF substrate 110, a fan-out substrate 310, and an SMF substrate 510. In an example not shown, the outboard alignment rods 600 can be supplemented by one or more inboard alignment rods that reside in corresponding inboard alignment V-grooves.

The MCF fan-out structure 50S can be singulated using known techniques to obtain separate individual MCF fan-out apparatuses 50. Alternatively, the different MCF fan-out apparatuses 50 can be used directly as part of the MCF fan-out structure 50S. It is also preferably to arrange multiple FCF fan-outs on a common substrate to enable gang polishing of fiber end faces after assembly of the MCF, fan-out, and SMF assemblies.

Structural Support Members

Figure 16:
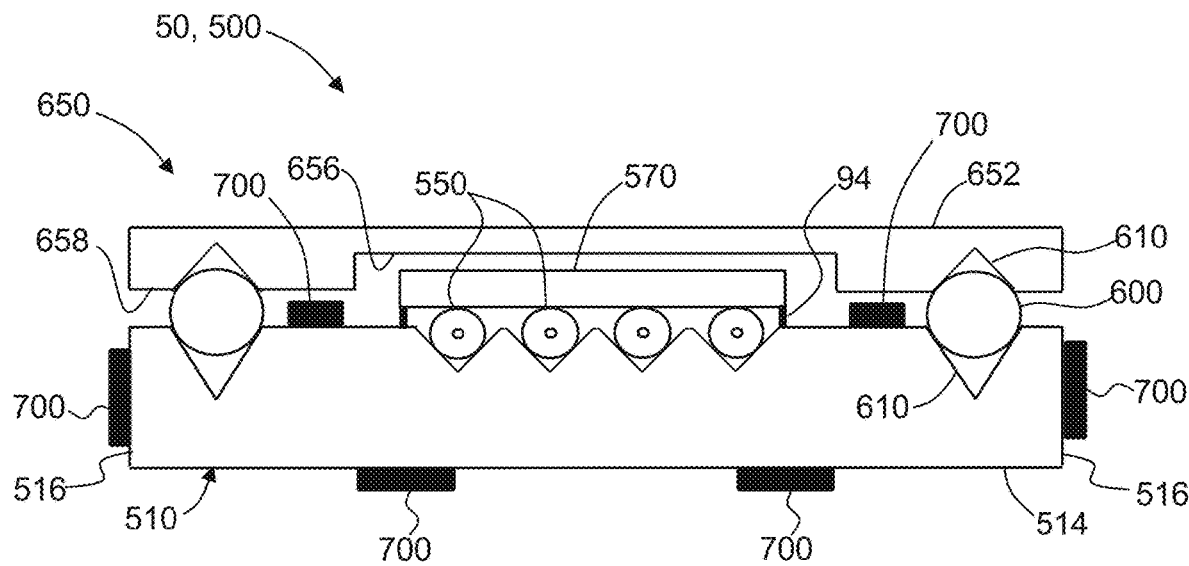
FIG. 16 is similar to FIG. 13C and shows an embodiment of the MCF fan-out apparatus that includes structural support members that run in the axial direction through the different assemblies to provide additional structural support for the apparatus.

FIG. 16 is similar to FIG. 13C and illustrates an embodiment wherein the MCF fan-out apparatus 50 includes one or more structural support members 700 that run axially down the MCF fan-out apparatus 50 to provide additional structural support, i.e., they act to strengthen the apparatus. The structural support members 700 can be attached to the sides 116, 316, and 516 of the corresponding support substrates 110, 310, and 510, and/or to the top surfaces 112, 312, and 512 of the corresponding support substrates 110, 310, and 510, and/or to the bottom surfaces 114, 314, and 514 of the corresponding support substrates 110, 310, and 510.

The structural support members 700 need not be precision fabricated and can be attached to the substrates 110, 310, and 510 using the aforementioned securing material. In an example, the structural support members 700 are made of a rigid material such as glass, ceramic, metal, polymer, etc.

The use of rigid structural elements 700 is particularly useful when the alignment cap 650 is employed as an alignment fixture and is removable after fabrication, as described below.

Securing Adjacent Assemblies

Figure 17:
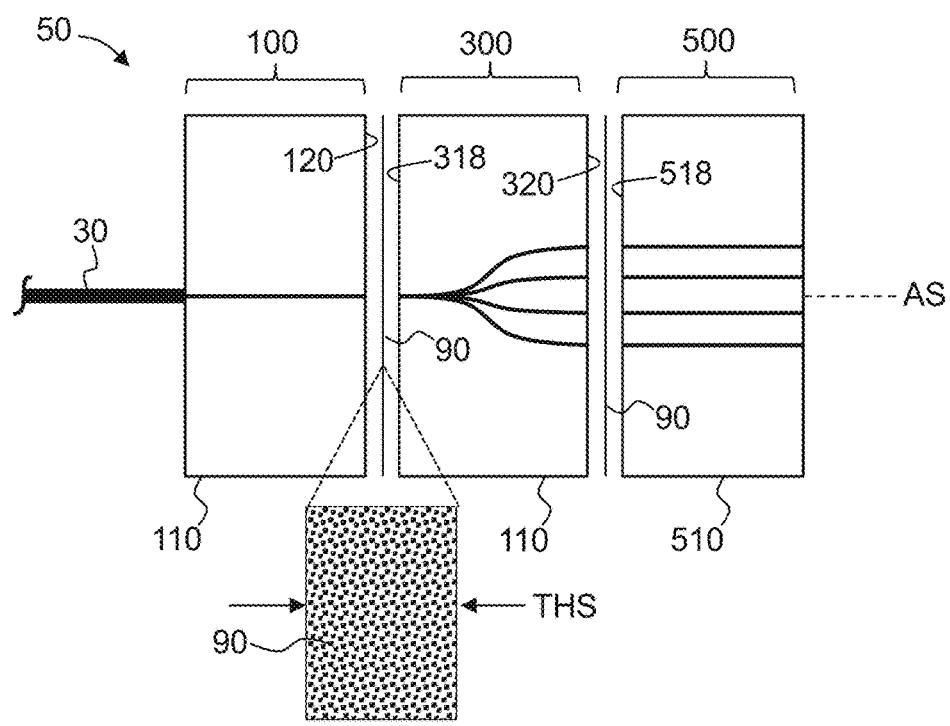
FIG. 17 is a top-down view of an example MCF fan-out apparatus illustrating how a thin layer of a securing material between adjacent assemblies is used to secure adjacent assemblies to one another.

FIG. 17 is a schematic top-down diagram of the MCF fan-out apparatus 50 showing the basic features of the MCF assembly 100, the fan-out assembly 300, and the SMF assembly 500, including their respective support substrates, namely the MCF substrate 110, the fan-out substrate 310, and the SMF substrate 500. The alignment rods 600 are omitted for ease of illustration.

The back surface 120 of the MCF substrate 110 confronts the front surface 318 of the fan-out substrate 310. Likewise, the back surface 320 of the fan-out substrate 310 confronts the front surface 518 of the SMF substrate 520. These front and back surfaces are precision formed and have a smooth finish (formed by, for example, mechanical or laser polishing) to ensure proper optical alignment of the three assemblies 100, 300 and 500.

Methods of fabricating and assembling the various components of MCF fan-out apparatus 50 are discussed in greater detail below. One aspect of the methods of assembly includes interfacing and securing adjacent ones of the three assemblies to each other. This includes providing a thin layer of securing material 90, as shown in the close-up inset of FIG. 17 as having a thickness THS, which in an example is in the range from 1 micron to 10 microns, and in another example is less than 1 micron. In an example, the securing material 90 is transparent to the wavelengths of light used in the various optical fibers employed and further in an example is ultraviolet (UV) curable. Only a very thin layer of the securing material 90 is needed to provide adequate adhesion, and in fact the thinner the layer, the better the adhesion and the less risk of void formation. The thinnest layer of securing material 90 is also preferred so that it does not substantially interfere with optical communication between adjacent assemblies of the MCF fan-out apparatus 50. When the securing material 90 is added to at least one of the two confronting substrate surfaces, the substrates are interfaced by urging them together to provide a uniform layer of the securing material 90. The securing material 90 is cured, e.g., irradiated by UV light, to secure the adjacent assemblies to each other.

2×n to 1×2n Fan-Out

There are a number of optical fiber applications wherein the optical fibers are arranged in more than one row to increase the fiber density. The example MCF fan-out apparatuses 50 discussed above are shown by way of example where the fiber cores 40, the SCFs 250, and the SMFs 550 are arranged in arrays having a single row or a 1×n configuration, where n is the number of fibers and where n=4 is used by way of example and for ease of illustration. In other examples, the MCF fan-out apparatus 50 can include m×n fiber arrays, where m is the number of rows and n is the number of fibers in each row. In an example described below, a 2×n core configuration for an example MCF 30 of an MCF assembly is used in combination with a fan-out assembly configured to have a 2×n to 1×2n fan out.

Figure 18A:
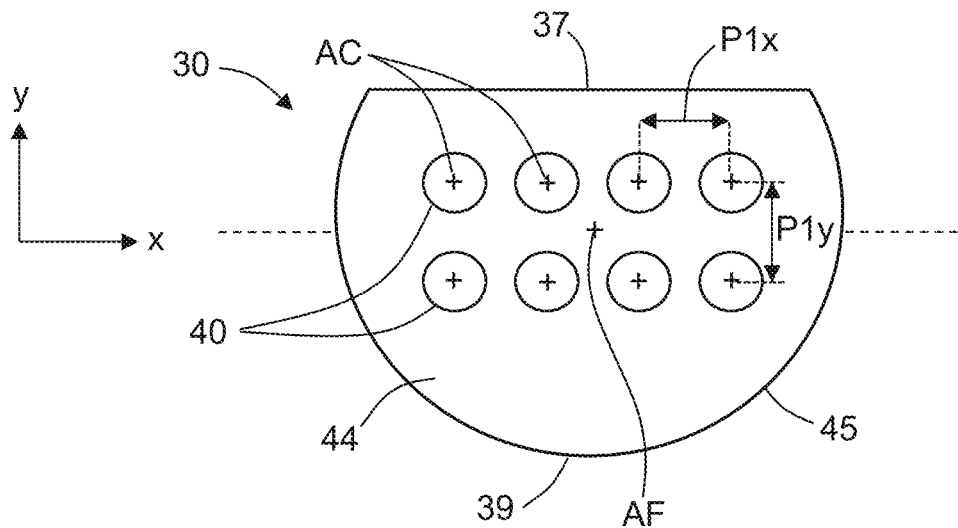
FIG. 18A is similar to FIG. 2C and is a cross-sectional view of an example MCF that has a 2×n core configuration and a "D" cross-sectional shape.

To this end, FIG. 18A is similar to FIG. 2C and is a cross-sectional view of an example MCF 30 that has a 2×n configuration for the cores 40 and a "D" shaped cross-section. In the example of FIG. 18A, n=4, and it will be appreciated that n can take on other integer values. Also, the pitch P1$x$ for the cores 40 in a given row (x-direction) is the same as the pitch P1$y$ for the cores in adjacent rows (i.e., within a given column) in the y-direction as by way of example to maximize core density. In other examples, the core pitch P1$x$ in the x-direction can be different than the core pitch P1$y$ that in the y-direction.

Figure 18B:
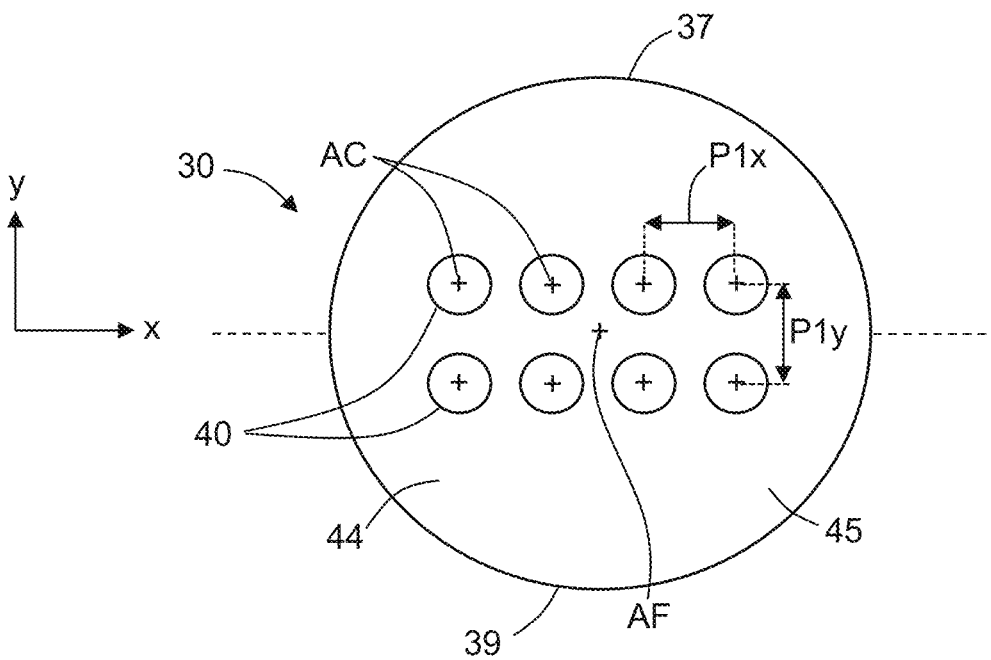
FIG. 18B is similar to FIG. 18A and shows an example MCF that has a 2×n core configuration and a circular cross-sectional shape.

FIG. 18B is similar to FIG. 18A and shows an example MCF 30 that has a 2×n configuration for the cores 40 and a circular cross-sectional shape. These and other types of 2×n MCFs 30 can be used for the example 2×n to 1×2n fan-out assembly 300 disclosed herein.

Figure 19A:
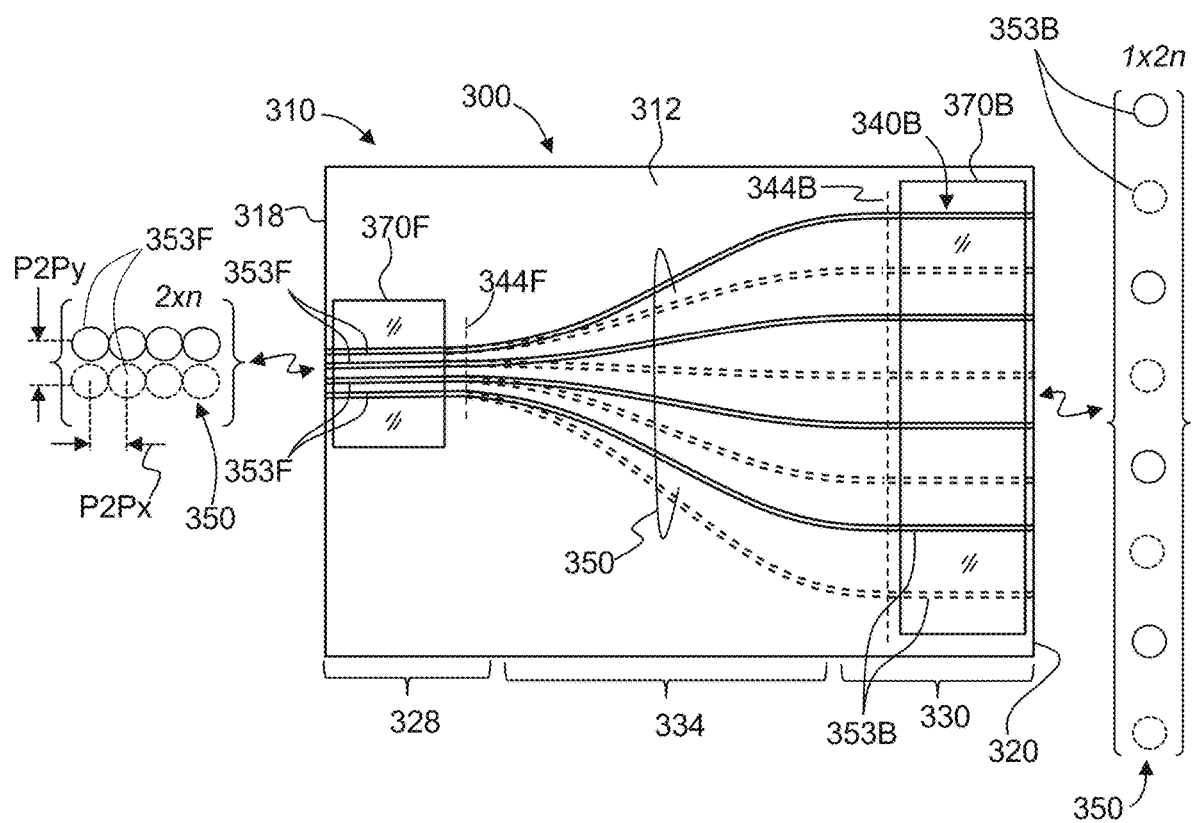
FIG. 19A is similar to FIG. 8A and is a top-down view of an example fan-out assembly with a 2×n SCF configuration at the front end as shown in the left close-up inset of the front end and a 1×2n SCF configuration at the back end as shown in the right close-up inset of the back end.

FIG. 19A is similar to FIG. 8A and is a top-down view of an example fan-out assembly 300 with a 2×n SCF configuration at the front end 318 as shown in the left close-up inset of the front end 318, and a 1×2n SCF configuration at the back end 320 as shown in the right close-up inset of the back end 320. The SCFs 350 in the bottom row in the front section 328 are shown using dashed lines so that the path of these SCFs can be traced through the central section 334 and to the back section 330. The SCFs 350 in the two rows can be interdigitated in the back section 330 as shown or can have any other 1×2n configuration useful for the given application. The x-direction (row) pitch at the front end 318 is denoted P2P$x$ and the y-direction (column) pitch is P2P$y$, and these two pitches can be the same or different, depending on the given application. In an example, the SCF V-grooves 340 define the row or x-direction pitch P2P$x$ for the 2n SCF fibers 350 and the diameter DR of the alignment rods 600 (see FIG. 3D) and the size (i.e., width and depth) of the alignment V-grooves 610 define the column or y-direction pitch P2P$y$ for the 2n SCFs 350.

Figure 19B:
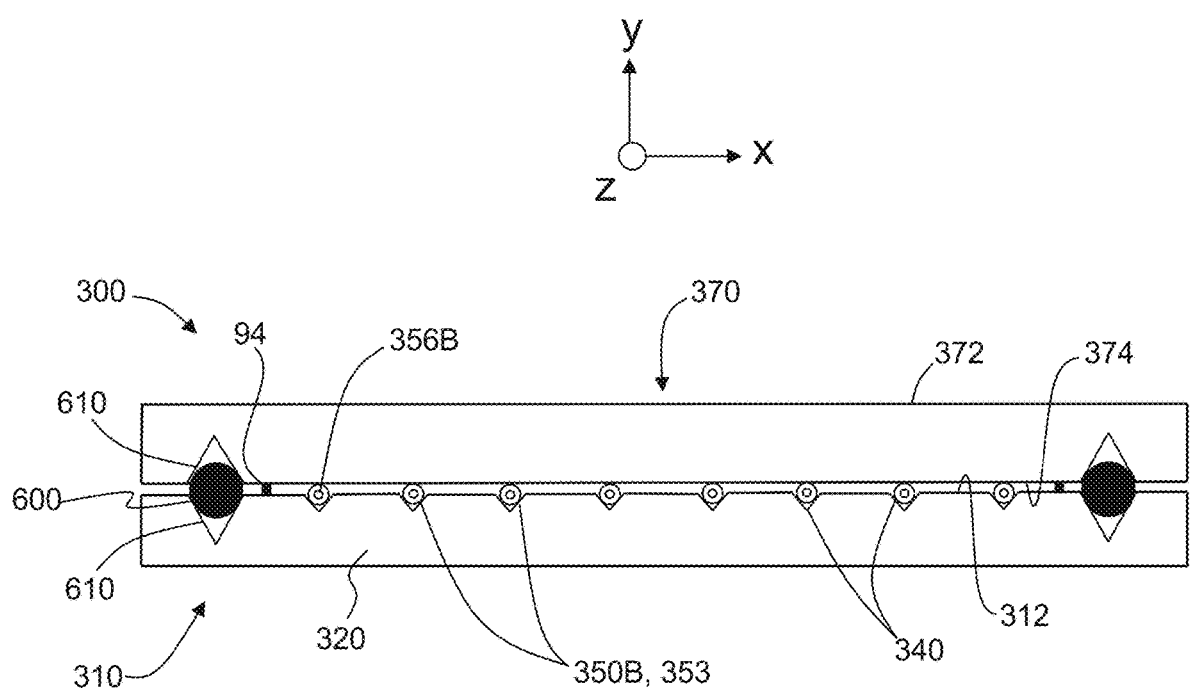
FIG. 19B is a back-end view of the fan-out assembly of FIG. 19A and showing the 1×2n configuration of the SCFs.

FIG. 19B is a back-end view of the fan-out assembly 300 of FIG. 19A showing the eight example SCFs 350 and in particular, the end faces 356B of their bare glass sections 353, in the 1×2n configuration after passive alignment.

Figure 20A:
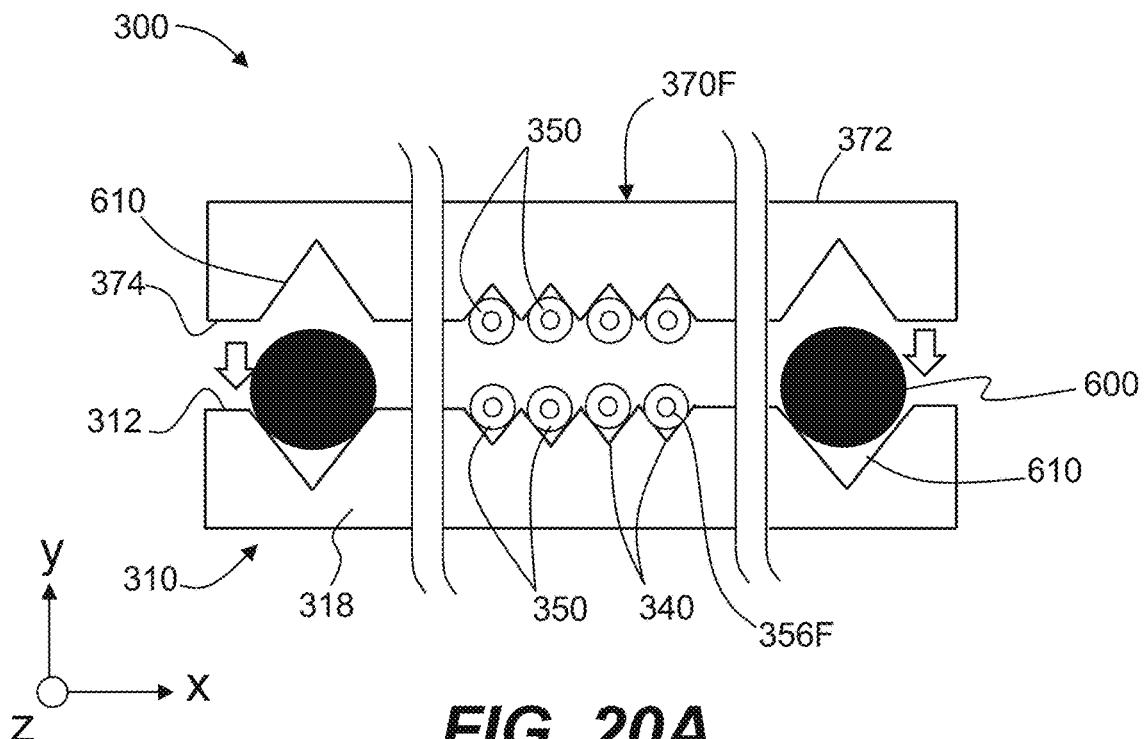
FIGS. 20A is a partially exploded front-end view and FIG. 20B is an assembled front-end view of an example of the fan-out assembly of FIG. 19A, illustrating an example configuration of SCFs in the front section of the fan-out assembly.
Figure 20B:
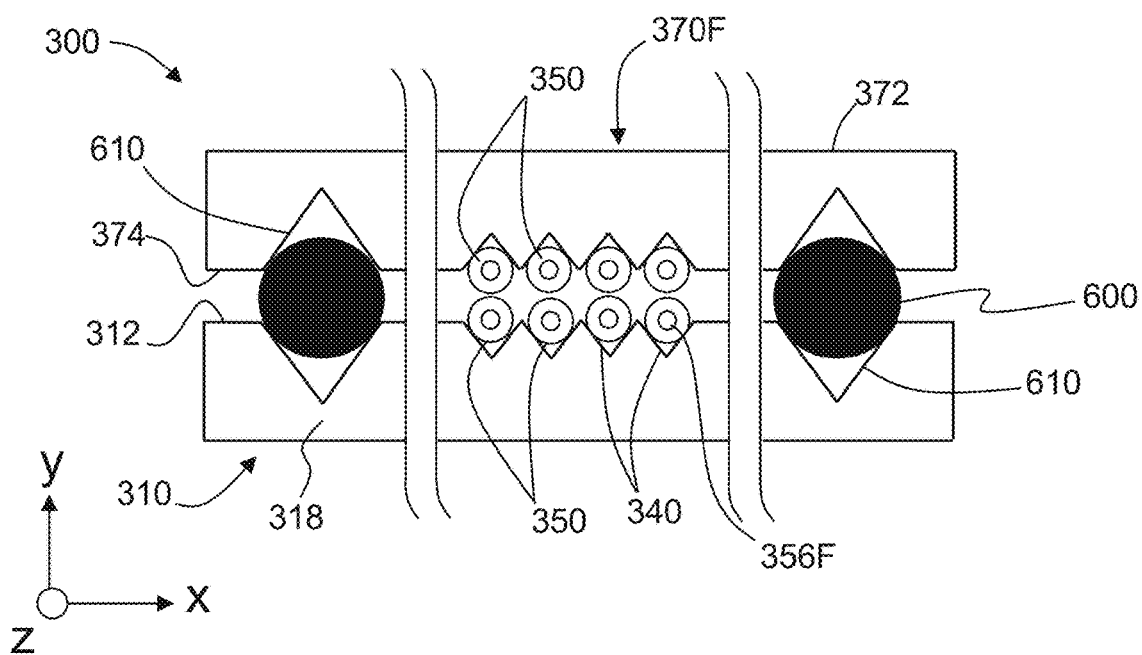

FIG. 20A is a partially exploded front-end view of an example of the fan-out assembly 300 of FIG. 19A, and FIG. 20B is the assembled view. The front fiber cap 370F includes SCF V-grooves 340 that passively align with those formed in the fan-out substrate 340 so when the front fiber cap 370F and substrate 310 are brought together (FIG. 20B), the 2×n arrangement of the SCFs 350 passively align with the 2×n arrangement of the cores 40 of the MCF 30. The alignment rods 600 are shown residing in alignment V-grooves 610 formed in the fan-out substrate 310, while further in an example the bottom surface 374 of the front fiber cap 370F includes corresponding alignment V-grooves 610, and the alignment rods 600 perform the passive alignment. In an example, the front fiber cap 370F can be identical to the front section 328 of the fan-out substrate 310 and in fact can be formed using a section of another identical fan-out substrate 310. In the example shown, the alignment rods 600 are sized to provide accurate and precise spacing between the top and bottom rows of SCFs 350 to match the vertical spacing of the cores in the 2×n MCF.

Figure 20C:
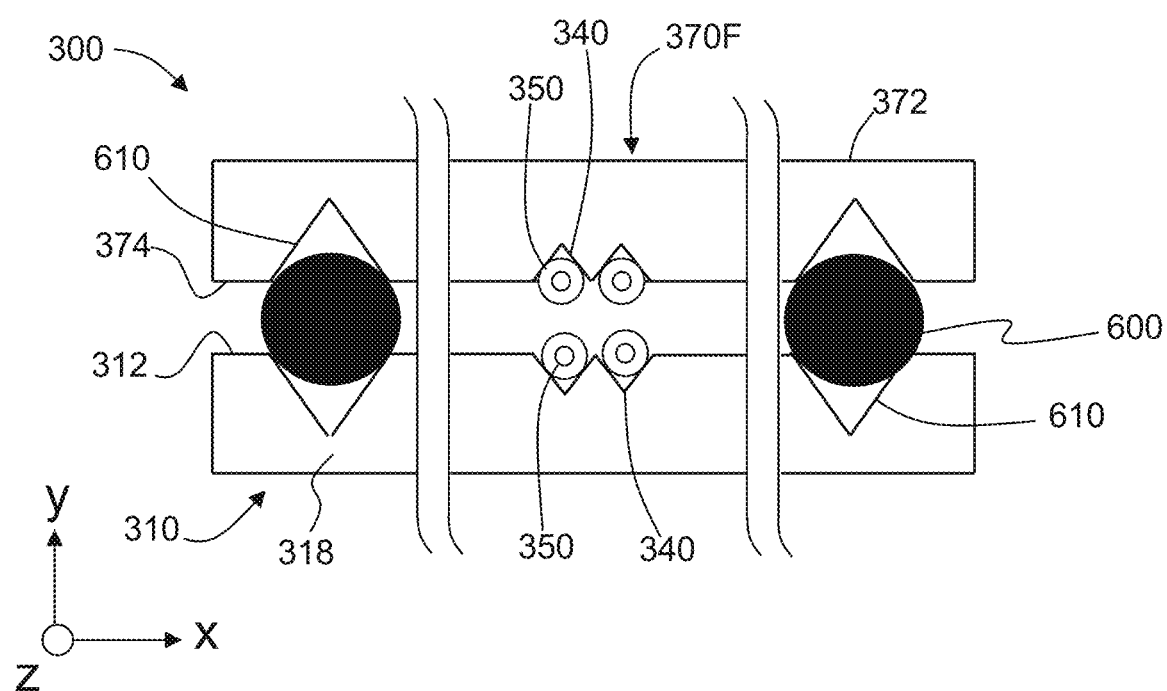
FIGS. 20C through 20E are front-end views of additional examples of the fan-out assembly of FIG. 19A, illustrating different configurations of SCFs in the front section of the fan-out assembly.

FIG. 20C is similar to FIG. 20B and illustrates an example where there are two SCF fibers 350 per row (n=2), and where the alignment rods 600 define the y-spacing between the SCF fibers in the two rows and illustrates an example where the fiber pitch P1 in the x-direction is different than that in the y-direction.

Figure 20D:
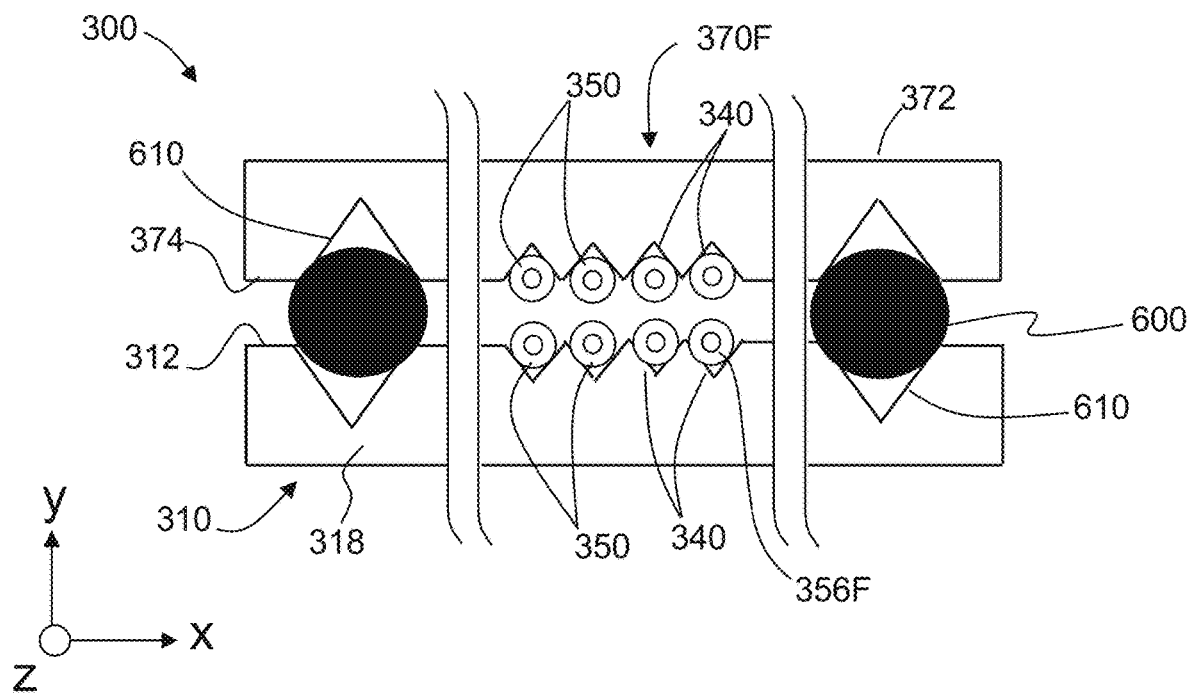

FIG. 20D is similar to FIG. 20C and shows a similar example for n=4.

Figure 20E:
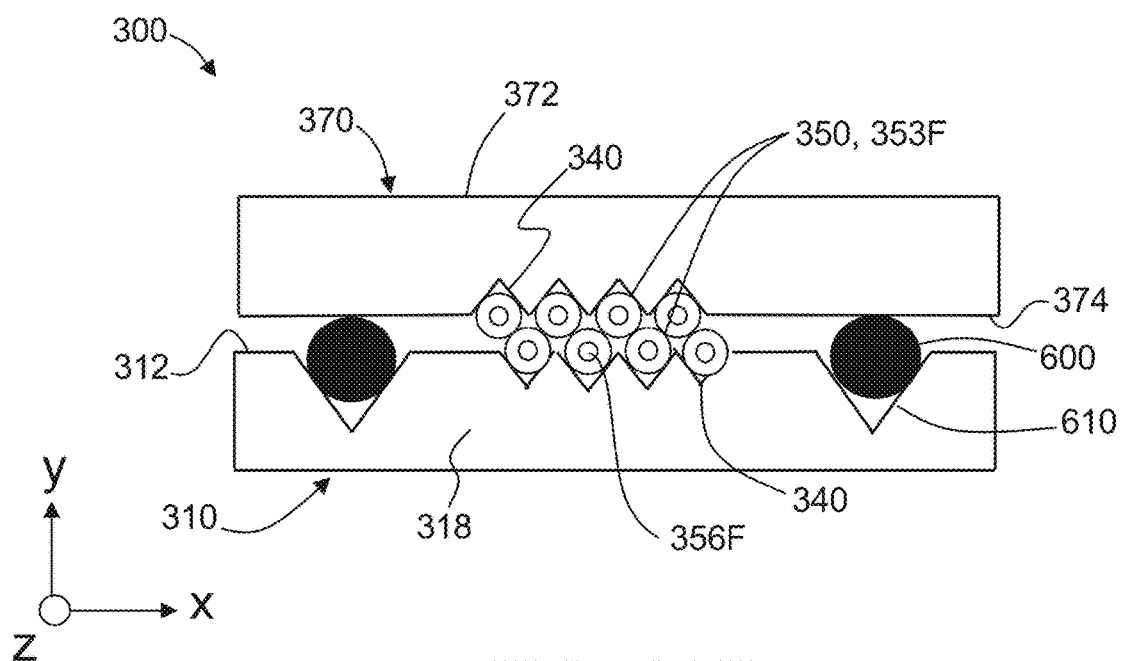

FIG. 20E is another close-up view of the front end 318 of the fan-out assembly 300 showing an offset configuration of the two rows of SCFs 350. In this configuration, the SCFs 350 themselves perform passive alignment by coming into contact so that the alignment rods 600 are optional.

Figure 21A:
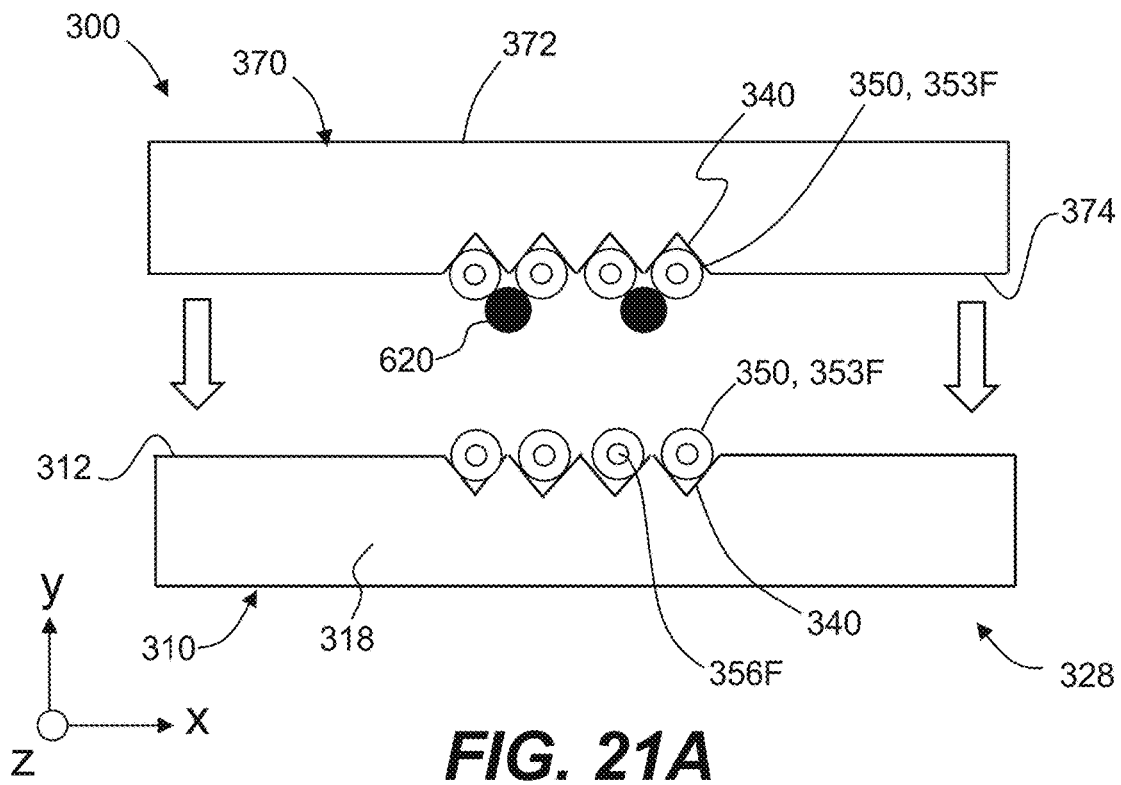
FIGS. 21A is a partially exploded front-end view and FIG. 21B is an assembled front-end view of a central portion of an example of the fan-out assembly of FIG. 19A, illustrating an example configuration of SCFs in the front section of the fan-out assembly that utilizes spacer rods to control the y-direction fiber spacing while also performing passive alignment.
Figure 21B:
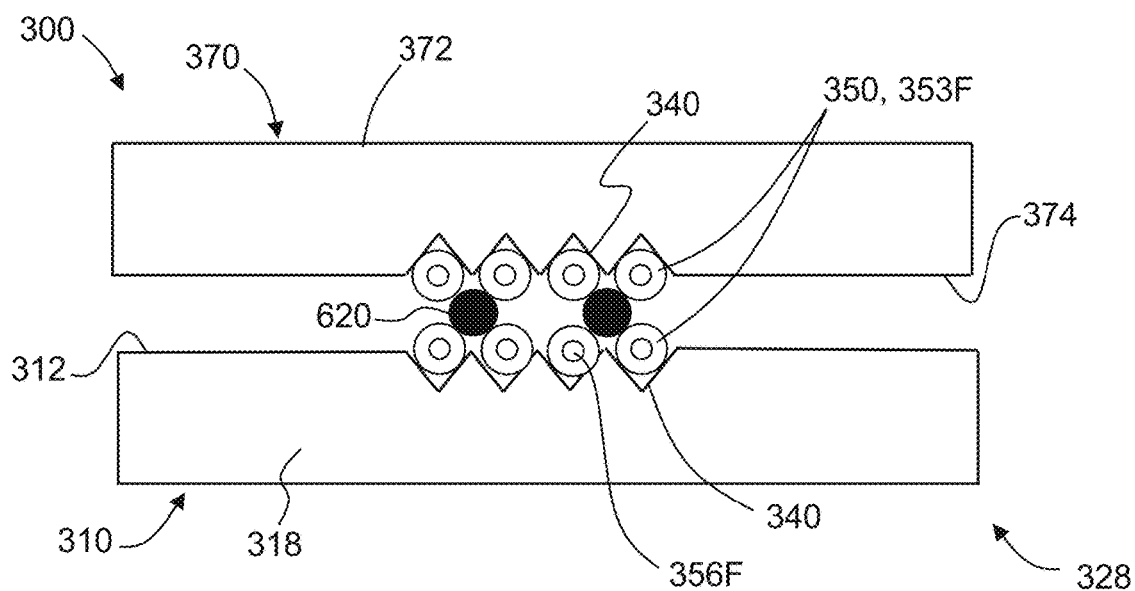

FIGS. 21A is a partially exploded view and FIG. 21B is an assembled view of the central portion 334 of the front end 318 of the fan-out assembly 300 showing an example of how spacer rods 620 can be disposed within the array of SCFs 350 in the front-end section 328 to perform passive alignment while controlling the y-direction spacing of the two rows of SCFs (i.e., defining a select row spacing or row pitch of a first n and a second n of the 2n SCFs 350). In an example, the spacer rods 620 are made of the same material as other parts of the fan-out assembly. In this example, the spacer rods 620 obviate the need for the outboard alignment rods 600.

Figure 21C:
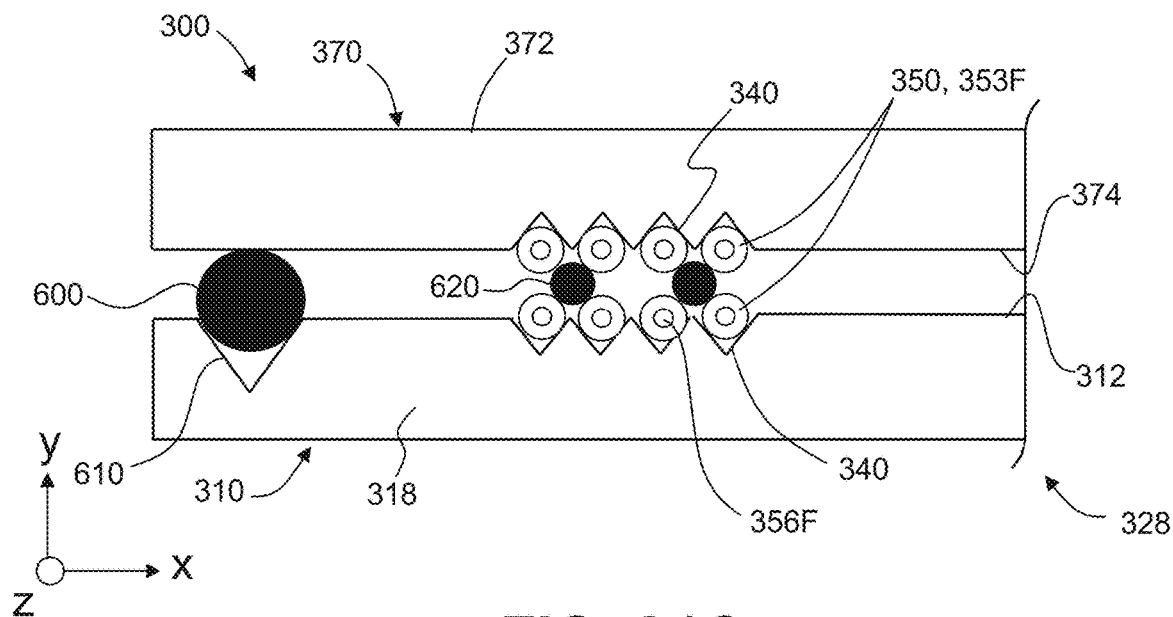
FIG. 21C is similar to FIG. 21B and shows the use of alignment rods for assembly passive alignment combined with the use of spacer rods that passively define a vertical spacing between rows of SCFs in the fan-out assembly.

FIG. 21C is similar to FIG. 21B and is a closer-up front-end view of the left-hand side of the fan-out assembly 300 showing the use of outboard alignment rods 600 in an alignment V-groove 610 for assembly passive alignment and spacer rods 620 for passively defining an SCF spacing in the vertical direction.

Figure 21D:
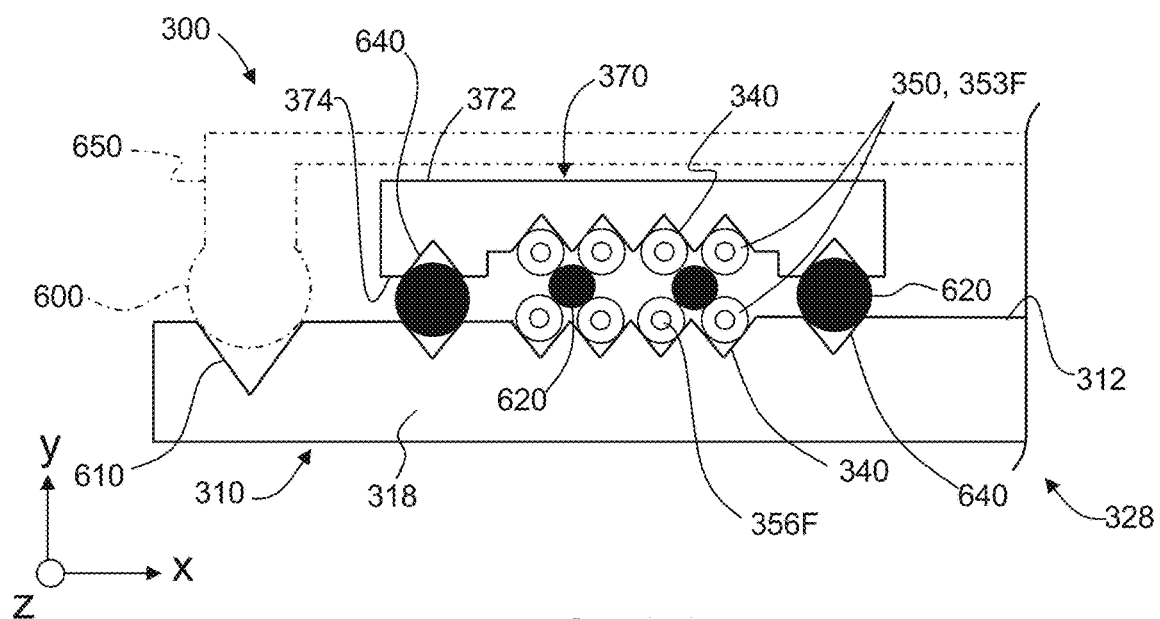
FIG. 21D is similar to FIG. 21C and shows an example where the alignment cap 650 is used as a precision fixture (shown in phantom) such as in the manner discussed above so that the alignment rods 600 are not part of the final assembly, and further shows optional spacer rods in V-grooves immediately outboard of the SCFs.

FIG. 21D is similar to FIG. 21C and shows an example where the alignment cap 650 is used as a precision fixture (shown in phantom) such as in the manner discussed above so that the alignment rods 600 are not part of the final assembly. Furthermore, the spacer rods 620 need only be part of the fan-out assembly 300 associated with the front/proximal section 328 of the fan-out substrate 310 and need not extends beyond the front/proximal end 318 of the fan-out substrate and only need to extend axially toward the back/distal end 320 of the fan-out substrate far enough to maintain the vertical SCF spacing. FIG. 21D also shows an example where optional additional spacer rods 620 are supported in spacer-rod V-grooves 640 at or near the outer edges of the fan-out cap 370 and outboard of the SCFs 350 as well as in the top surface 312 of the fan-out substrate 310. The optional additional spacer rods 620 also provide additional stability for the fan-out cap 370.

Fabrication and Assembly Methods

An example general fabrication and assembly method for the (1×n) to (1×n) fan-out configuration for the MCF fan-out apparatus 50 is as follows:

Place fiber(s) in corresponding fiber V-grooves; secure (e.g., bond) fiber caps over the corresponding fiber(s) in the fiber V-grooves; process the various fiber ends, i.e., either cleave or polish; and passively aligning the MCF assembly 100, the fan-out assembly 300 and optionally the SMF assembly to each other by securing (bonding) them to the alignment rods 600 while also securing the confronting surfaces of the corresponding substrates to each other.

A more detailed fabrication and assembly method for the (1×n) to (1×n) for the MCF fan-out apparatus 50 includes the following steps, which need not be carried in the order presented and some of which can also be employed in for the (2×n) to (1×2n) configuration.

1) Fabricate the fiber V-grooves 140, 340, and 540 in the corresponding MCF substrate 110, the fan-out substrate 310, and the SMF substrate 510 using precision machining, pressing, or photolithographic techniques known in the art. Fabricate the alignment-rod V-grooves 610 in each of the substrates 110, 310, and 510.

2) Form the MCF assembly 100 by stripping a section of MCF 30 to form the bare glass section 33 and insert the bare glass section 33 into the MCF V-groove 140 with the correct orientation so that the MCF cores 40 reside at the back (distal) end 120 of the MCF substrate 110 with the common line CL aligned in the x-direction (see FIG. 5E) and optionally in the plane of the top surface 112. Condition the fiber ends via polishing or precision cleaving using for example either laser cleaving or mechanical cleaving. Add flow restrictors 94, which in an example can also serve as supports for the cap 170. Add securing material 90 to fiber V-grooves 140 prior to adding the MCF 30 but do not cure the securing material. Add cap 170 but do not apply downward pressure yet.

3) Form the fan-out assembly 300 by inserting the SCFs 350 into the fiber V-grooves 340, e.g., into the front fiber V-grooves 340F first since it is the narrow-pitch end of the fan-out substrate 310. Add securing material 90 to the front fiber V-grooves 340F before adding the SCFs 350 and add securing material 90 atop the SCFs. Place front SCF cap 370F on the front bare glass sections 353 in the front fiber V-grooves 340F and apply pressure to ensure SCFs 350 properly seated in the front fiber V-grooves 340F. Cure the securing material 90 to secure the SCFs 350 and the front SCF cap 370F to the fan-out substrate 310. Repeat this process for the bare glass sections 353B and the back fiber V-grooves 340F and the back SCF cap 370B. Polish end faces 356 (FIG. 7B) of the SCFs 350. Apply a thin protective curable coating over the SCFs in the central section 340. Polish the front and back ends of the fan-out assembly 300 to an optical finish.

4) Load alignment rods 600 into the alignment V-grooves 610 of the fan-out assembly 300. Place an alignment cap 650 over the front and back SCF caps 370F and 370B and secure with securing material 90 to fix the alignment rods 600, which extend frontwards and backwards from the fan-out assembly 300 so that they can later engage the alignment V-grooves 610 of the other substrate(s).

5) Form the SMF assembly 500 by placing SMFs 550 into the fiber V-grooves 540, along with securing material 90, and place the SMF cap 570 over the SMFs 550 but do not secure. At this point, the SMF fiber ends can be polished or precision cleaving if not done so already or if re-polishing or re-cleaving is called for.

6) Bring the SMF assembly 500 and the fan-out assembly 300 together so that the alignment rods 600 that extend in the back direction from the fan-out assembly 300 reside in the alignment V-grooves 610 of the SMF substrate 510. Apply securing material 90 to either the back end 320 of the fan-out substrate 310 or the front end 528 of the SMF substrate 510 and optionally to the confronting surfaces of the respective caps 370 and 570. Interface the fan-out assembly 300 and the SMF assembly 500 by moving the confronting ends 320 and 528 of the fan-out assembly 300 and the SMF assembly 500 into close optical contact and press the SMF cap 570 down onto the SMF fibers 550 so that the SMF fibers 550 properly sit in the fiber V-grooves 540, i.e., are kinematically supported therein. Cure the securing material 90, e.g., by irradiating with UV radiation.

7) Interface the MCF assembly 100 and the fan-out assembly 300 by bringing the MCF assembly 100 and the fan-out assembly 300 together (back end 120 to front end 318) so that the alignment rods 600 that extend in the front direction from the fan-out assembly 300 reside in the alignment V-grooves 610 of the MCF substrate 110. Apply securing material 90 to either the back end 120 of the MCF substrate 110 or the front end 318 of the fan-out substrate 310 and optionally to the confronting surfaces of the respective MCF cap 170 and SCF cap 370. Move the confronting ends 120 and 318 into close optical contact and press the MCF cap 170 down onto the MCF 30 so that it properly sits in the MCF V-groove 140, i.e., is kinematically supported therein. Cure the securing material 90, e.g., by irradiating with UV radiation, to form the completed MCF fan-out apparatus 50.

8) Enclose the MCF fan-out apparatus 50 in a mechanical package (not shown), which can include strain-relief features for the various fibers.

As noted above, it may be preferred to process all of the fiber end faces (e.g., polishing or precision cleaving) prior to bringing the different assemblies 100, 300 (and optionally 500) together.

In an example, the alignment cap 650 of FIG. 14A can be used as a precision fixture for assembling the MCF assembly 100, the fan-out assembly 300, and the SMF assembly 500 and can then be removed once the MCF fan-out apparatus 50 is formed. In an example, the precision fixture 650 can include a release film (not shown) that prevents the securing material from adhering to it so that the precision fixture 650 be removed after the securing material is cured, as shown in FIG. 14C.

In an example, the precision fixture 650 can be placed in a stable location with the integrated alignment rods 600 facing upwards. The MCF substrate 110, the fan-out substrate 310, and the SMF substrate 510 can be placed in order on the precision fixture so that the integrated alignment rods reside in the respective alignment V-grooves 610 of each of the substrates. This places the three substrates in general axial and lateral alignment. The securing material 90 can be added to the confronting surfaces (ends) of adjacent substrates. The substrates can then be axially pressed together to minimize the thickness of the material between adjacent substrates and within the optical path while applying pressure from above to keep the integrated alignment rods 600 properly seated in the corresponding alignment V-grooves 610, thereby placing the three substrates in close axial and lateral alignment. Structural support members 700 can then be added that run the length of the three substrates. As noted above, the structural support members 700 need not be precisely dimensioned and can comprise glass, ceramic, metal of polymer bars, for example. The securing material can then be cured and the resulting assembly can be removed from the precision fixture 650.

Another example fabrication process can proceed as follows: first the "fiber" caps 170, 370 and 570 are pressed down onto their corresponding fibers in their corresponding fiber V-grooves and cured in place using securing material 90. Then, the various fiber ends are polished. Then the MCF, fan-out, and SMF assemblies 100, 300 and 500 are passively aligned with each other by placing two parallel alignment rods 600 in the alignment V-grooves 610 of each assembly and bonding the MCF, fan-out, and SMF assemblies together at least at their confronting substrate ends, and possibly additionally by bonding the alignment rod 600 (or other structural support member 700) to each MCF, fan-out, or SMF substrate. If necessary, one or more alignment caps 650 can be employed in the process as described above.

Another example fabrication process for the (2×n) to (1×2n) configuration can proceed as follows: A first group of n SCF fibers 350 attached to the n proximal end SCF V-grooves 340F of the fan-out substrate 310. Then alignment rods 600 are placed in the SCF fan-out substrate alignment grooves 610. Then a second group of n SCF fibers is attached to the proximal end SCF V-grooves 340B in the SCF proximal cap, for a total of 2n SCF fibers. Then the SCF proximal cap 370F is placed over the proximal end section 328 of the fan-out substrate 310, aligned by the alignment rods located in V-grooves 610, or alternatively by small diameter precision rods that are interposed between the upper and lower n-fiber arrays (as shown in FIG. 21B), or by direct contact and alignment of the upper and lower n-fiber arrays (as shown in FIG. 21C). Then the 2n SCF fibers 350 are arranged in the 2n distal end V-grooves 340B of the SCF fan-out substrate 310 in the distal end section 330. In an example, a guide or jig can be used to help with proper interdigitation of the SCF fibers to form the 1×2n configuration. Then a SCF distal cap 370B is placed over the 2n SCF fibers (distal bare glass sections 353B) at the SCF fan-out substrate distal end section 330 and bonded in place using securing material 90.

Another example fabrication process for the (2×n) to (1×2n) configuration can proceed as follows: Place proximal fibers in proximal V-grooves for separate upper and lower substrate; Bond proximal fibers to proximal V-grooves while pressing them into V-grooves; Align upper and lower substrates to each other by bonding them to large alignment rods (FIGS. 20A-20D) small alignment rods (FIGS. 20A-20B), or fibers in array (FIG. 20E); Place 2n distal fiber(s) in distal V-grooves; Bond cap over fiber(s) in distal V-grooves: Note that this implies that the upper substrate may be shorter than the lower substrate along the A2 axis to provide clearance for the cap, or alternatively the upper substrate may include a recess to provide clearance for the cap; Polish proximal and distal fiber ends:

Note that in some cases the alignment rods may interfere with fiber end polishing once the assemblies are interfaced, passively aligned and secured to one another. In this case, inboard and outboard alignment rods can be employed, where the inboard rods are used to align the upper and lower fan-out substrates (i.e., fan-out substrate 310 and V-grooved fan-out cap 370), and the outboard alignment rods are used to align the MCF, 1×n fan-out, and SMF assemblies 110, 310 and 510.

Also, in an example, the upper fan-out substrate could be made narrower (in the up/down direction in FIG. 8A) so that it would provide only two alignment grooves, while the lower fan-out substrate would provide four alignment grooves, allowing a second pair of alignment rods to be placed in the outboard alignment grooves after aligning the upper and lower substrates using the inboard alignment rods.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:
1. A passively aligned fan-out assembly, comprising:
a fan-out substrate having a main axis, a proximal end, a distal end, and a first surface that is substantially planar and includes a plurality of proximal fiber V-grooves, a plurality of distal fiber V-grooves, and at least two outboard alignment V-grooves between which the plurality of proximal fiber V-grooves and the plurality of distal fiber V-grooves reside, wherein:
the proximal fiber V-grooves and the distal fiber V-grooves extend parallel to the main axis adjacent the proximal end and the distal end, respectively,
the proximal fiber V-grooves have a proximal-end pitch P2P at the proximal end that is between 20 microns and 45 microns, and the distal fiber V-grooves have a distal-end pitch P2D at the distal end that is greater than the proximal-end pitch P2P;
a plurality of small-clad fibers each having respective proximal bare glass sections supported in the proximal fiber V-grooves and distal bare glass sections supported in the distal fiber V-grooves, such that the plurality of small-clad fibers are arranged with the proximal-end pitch P2P at the proximal end and the distal-end pitch P2D at the distal end;
at least two alignment rods respectively supported by the at least two outboard alignment V-grooves, wherein the at least two alignment rods extend beyond the proximal end of the fan-out substrate; and
at least one cap disposed above the first surface of the fan-out substrate for securing the proximal bare glass sections and the distal bare glass sections into their respective proximal fiber V-grooves and distal fiber V-grooves and for securing the at least two alignment rods into their respective at least two outboard alignment V-grooves.

2. The passively aligned fan-out assembly according to claim 1, wherein the at least one cap comprises:
at least one fiber cap that engages the proximal and distal bare glass sections of the small-clad fibers; and
an alignment cap that engages the at least two alignment rods.

3. The passively aligned fan-out assembly according to claim 1, wherein the at least one cap comprises a proximal fiber cap that engages the proximal bare glass sections of the plurality of small-clad fibers and a distal fiber cap that engages the distal bare glass sections of the plurality of small-clad fibers.

4. The passively aligned fan-out assembly according to claim 3, wherein the proximal fiber cap and the distal fiber cap respectively include first and second surfaces respectively having a plurality of additional proximal fiber V-grooves and a plurality additional distal fiber V-grooves that respectively engage the proximal bare glass sections and the distal bare glass sections of the plurality of small-clad fibers.

5. The passively aligned fan-out assembly according to claim 1, wherein the at least one cap comprises a single cap that engages both the proximal and distal bare glass sections of the plurality of the small-clad fibers and the at least two alignment rods.

6. The passively aligned fan-out assembly according to claim 1, wherein the distal end pitch P2D is between 127 microns and 250 microns.

7. A multicore fiber fan-out apparatus, comprising:
a fan-out substrate having a main axis, a proximal end, a distal end, and a first surface that is substantially planar, wherein the first surface includes a plurality of proximal fiber V-grooves having a proximal-end pitch P2P at the proximal end, a plurality of distal fiber V-grooves that having a distal-end pitch P2D at the distal end, and at least two outboard alignment V-grooves between which the plurality of proximal fiber V-grooves and the plurality of distal fiber V-grooves reside;
a plurality of small-clad fibers each having respective proximal bare glass sections supported in the proximal fiber V-grooves and distal bare glass sections supported in the distal fiber V-grooves, such that the plurality of small-clad fibers are arranged with the proximal-end pitch P2P at the proximal end and the distal-end pitch P2D at the distal end;
at least two alignment rods respectively supported by the at least two outboard alignment V-grooves, wherein the at least two alignment rods extend beyond the proximal end of the fan-out substrate;
at least one cap disposed above the first surface of the fan-out substrate for securing the proximal bare glass sections and the distal bare glass sections into their respective proximal fiber V-grooves and distal fiber V-grooves and for securing the at least two alignment rods into their respective at least two outboard alignment V-grooves; and
a multicore fiber (MCF) assembly comprising:
a multicore fiber that comprises a plurality of cores having a pitch P1 equal to the proximal-end pitch P2P of the proximal fiber V-grooves; and
a multicore fiber substrate having a multicore fiber V-groove that supports the multicore fiber, wherein the multicore fiber substrate also includes at least two alignment features receiving and supporting the at least two alignment rods to establish passive alignment between the plurality of cores of the multicore fiber and the proximal bare glass sections of the plurality of small-clad fibers.

8. The multicore fiber fan-out apparatus according to claim 7, wherein the proximal-end pitch P2P of the proximal fiber V-grooves is between 20 microns and 45 microns.

9. The multicore fiber fan-out apparatus according to claim 8, wherein the distal end pitch P2D is between 127 microns and 250 microns.

10. The multicore fiber fan-out apparatus according to claim 7, wherein the at least two alignment features comprise at least two alignment V-grooves formed in a surface of the multicore fiber substrate, and wherein the at least two alignment V-grooves are disposed outboard and on opposite sides of the multicore fiber.

11. The multicore fiber fan-out apparatus according to claim 7, further comprising a multicore fiber cap disposed above the multicore fiber substrate for securing the multicore fiber.

12. The multicore fiber fan-out apparatus according to claim 7, wherein the at least one cap extends over at least a portion of the multicore fiber substrate and engages the at least two alignment rods received and supported in the at least two alignment features of the multicore fiber substrate.

13. The multicore fiber fan-out apparatus according to claim 7, further comprising a plurality of single mode fibers respectively optically coupled to the distal bare glass sections of the plurality of small-clad fibers.

14. The multicore fiber fan-out apparatus according to claim 13, further comprising:
a single mode fiber substrate having a plurality of single mode fiber V-grooves that support the plurality of single mode fibers, wherein the single mode fiber substrate also includes at least two alignment V-grooves receiving the at least two alignment rods to establish passive alignment between the plurality of single mode fibers and the distal bare glass sections of the plurality of small-clad fibers.

15. The multicore fiber fan-out apparatus according to claim 14, wherein the at least one cap extends over at least a portion of the single mode fiber substrate and engages the at least two alignment rods received and supported in the at least two alignment V-grooves of the single mode fiber substrate.

16. The multicore fiber fan-out apparatus according to claim 7, wherein:

the multicore fiber comprises n cores in a 1×n configuration at an end face of the multicore fiber; and the plurality of small-clad fibers are supported in the proximal fiber V-grooves of the fan-out substrate in a 1×n configuration and in the distal fiber V-grooves of the fan-out substrate in a 1×n configuration.

17. The multicore fiber fan-out apparatus according to claim 16, wherein:

the at least one cap comprises proximal small-clad fiber V-grooves;

the multicore fiber comprises 2n cores that have a 2×n configuration at an end face of the multicore fiber; and the plurality of small-clad fibers are supported in: i) the proximal fiber V-grooves of the fan-out substrate and the proximal small-clad fiber V-grooves of the at least one cap in a 2×n configuration at the proximal end of the fanout substrate, and ii) the distal fiber V-grooves of the fan-out substrate in a 1×2n configuration at the distal end of the fanout substrate.

18. A passively aligned fan-out apparatus, comprising:

a multicore fiber assembly comprising a multicore fiber supported in a multicore fiber V-groove of a multicore fiber substrate, wherein the multicore fiber substrate has a first main axis and a distal end and further comprises a first pair of outboard alignment V-grooves on opposite sides of the first main axis, wherein the multicore fiber comprises cores with a core pitch P1 at an end face of the multicore fiber, and wherein the end face of the multicore fiber resides at the distal end of the multicore fiber substrate;

a fan-out assembly comprising small-clad fibers supported in small-clad fiber V-grooves of a fan-out substrate that has a second main axis and proximal and distal ends, the small-clad fiber V-grooves causing the small-clad fibers to have a proximal-end pitch P2P substantially the same as the core pitch P1 and a distal-end pitch P2D that is greater than the proximal-end pitch P2P, the fan-out substrate further comprising a second pair of outboard alignment V-grooves opposite sides of the second main axis, wherein the proximal end of the fan-out substrate is interfaced with the distal end of the multicore fiber substrate so that the first and second main axes are coaxial and so that the first pair of outboard alignment V-grooves are axially aligned with the second pair of outboard alignment V-grooves; and first and second alignment rods respectively supported in the axially aligned first and second pairs of outboard alignment V-grooves so that the cores of the multicore fiber are passively optically aligned with the small-clad fibers at the proximal end of the fan-out substrate.

19. The passively aligned fan-out apparatus according to claim 18, further comprising one or more rigid structural elements, wherein each rigid structural element is secured to the MCF assembly and the fan-out assembly.

20. The passively aligned fan-out apparatus according to claim 19, further comprising single mode fibers respectively optically coupled to the distal ends of the small-clad fibers.

21. The multicore fiber fan-out apparatus according to claim 20, further comprising:

a single mode fiber substrate including proximal and distal ends and single mode fiber V-grooves that support the single mode fibers, wherein the single mode fiber substrate also includes a third pair of outboard alignment V-grooves axially aligned with the first and second pairs of outboard alignment V-grooves, and wherein the first and second alignment rods are additionally supported by the third pair of outboard alignment V-grooves so that the small-clad fibers at distal end of the fan-out substrate are passively aligned with the single mode fibers at the proximal end of the single mode fiber substrate.

22. The multicore fiber fan-out apparatus according to claim 18 wherein the fan-out substrate comprises a central section having no small-clad fiber V-grooves, and wherein the central section comprises securing features that secure portions of the small-clad fibers to the fan-out substrate maintain an S-shape bend in one or more of the small-clad fibers.

23. The multicore fiber fan-out apparatus according to claim 22, wherein end sections of the small-clad fibers in the small-clad fiber V-grooves comprise bare glass sections, and wherein middle sections of the small-clad fibers in the central section comprise coated sections.

24. The multicore fiber fan-out apparatus according to claim 23, further comprising:

at least one cap disposed above the fan-out substrate for securing the bare glass sections of the small-clad fibers into the small-clad fiber V-grooves, wherein the at least one cap engages the pair of alignment rods for securing the alignment rods in the first and second pairs of alignment V-grooves.

* * * * *